US012748291B2

(12) United States Patent
Chen et al.

(10) Patent No.: US 12,748,291 B2
(45) Date of Patent: Sep. 29, 2026

(54) IMAGING SYSTEM LENS ASSEMBLY, IMAGING APPARATUS AND ELECTRONIC DEVICE

(71) Applicant: LARGAN PRECISION CO., LTD., Taichung City (TW)

(72) Inventors: Shih-Han Chen, Taichung City (TW); Cheng-Yu Tsai, Taichung City (TW); Hsin-Hsuan Huang, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 444 days.

(21) Appl. No.: 18/474,335

(22) Filed: Sep. 26, 2023

(65) Prior Publication Data

US 2024/0118526 A1 Apr. 11, 2024

(30) Foreign Application Priority Data

Sep. 30, 2022 (TW) .................................. 111137398

(51) Int. Cl.
*G02B 17/08* (2006.01)
*G02B 13/00* (2006.01)

(52) U.S. Cl.
CPC ..... *G02B 17/0856* (2013.01); *G02B 13/0045* (2013.01)

(58) Field of Classification Search
CPC ............ G02B 17/0856; G02B 17/0808; G02B 17/0892; G02B 13/0045; G02B 13/007;
(Continued)

(56) References Cited

U.S. PATENT DOCUMENTS

| | | | |
|---|---|---|---|
| 5,841,574 A | 11/1998 | Willey | |
| 2013/0010376 A1 | 1/2013 | Hatakeyama | |

(Continued)

FOREIGN PATENT DOCUMENTS

| | | | | |
|---|---|---|---|---|
| CN | 106908936 A | | 6/2017 | |
| CN | 108254859 A | * | 7/2018 | ......... G02B 17/0808 |

(Continued)

OTHER PUBLICATIONS

CN108254859 (Year: 2017).*

*Primary Examiner* — Travis S Fissel
(74) *Attorney, Agent, or Firm* — McClure, Qualey & Rodack, LLP

(57) ABSTRACT

An imaging system lens assembly includes a first lens group and a second lens group. The first lens group includes a first catadioptric lens element and a second catadioptric lens element, the second lens group includes at least one lens element. Each of an object-side surface and an image-side surface of the first catadioptric lens element and the second catadioptric lens element includes a central region and a peripheral region. The peripheral region of the object-side surface of the first catadioptric lens element includes a first refracting surface. The peripheral region of the image-side surface of the second catadioptric lens element includes a first reflecting surface. The central region of the object-side surface of the first catadioptric lens element includes a second reflecting surface. The central region of the image-side surface of the second catadioptric lens element includes a last refracting surface.

27 Claims, 29 Drawing Sheets

1

(58) Field of Classification Search
CPC .............. G02B 13/004; G02B 13/0015; G02B 13/0065; G02B 13/18; G11B 2007/13725
See application file for complete search history.

(56) References Cited

U.S. PATENT DOCUMENTS

| | | | |
|---|---|---|---|
| 2014/0098277 | A1 | 4/2014 | Nagamatsu |
| 2015/0177496 | A1 | 6/2015 | Marks |
| 2019/0187446 | A1 | 6/2019 | Dai |
| 2020/0041773 | A1 | 2/2020 | Kim |
| 2021/0364740 | A1 | 11/2021 | Nitta |
| 2021/0396979 | A1 | 12/2021 | Nitta |
| 2023/0087877 | A1 | 3/2023 | Zhao et al. |

FOREIGN PATENT DOCUMENTS

| | | | |
|---|---|---|---|
| CN | 106873134 | B | 1/2019 |
| CN | 113740999 | A | 12/2021 |
| CN | 113759536 | A | 12/2021 |
| CN | 113933975 | A | 1/2022 |
| CN | 113960757 | A | 1/2022 |
| CN | 114002814 | A | 2/2022 |
| CN | 114072715 | A | 2/2022 |
| JP | S5811913 | A | 1/1983 |

* cited by examiner

3

5

IMAGING SYSTEM LENS ASSEMBLY, IMAGING APPARATUS AND ELECTRONIC DEVICE

RELATED APPLICATIONS

This application claims priority to Taiwan Application Serial Number 111137398, filed Sep. 30, 2022, which is herein incorporated by reference.

BACKGROUND

Technical Field

The present disclosure relates to an imaging system lens assembly and an imaging apparatus. More particularly, the present disclosure relates to an imaging system lens assembly and an imaging apparatus with compact size applicable to the electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a need for a miniaturized optical lens assembly with high image quality that can overcome the aforementioned difficulties.

Further, with recent demands of compact electronic devices, conventional photographing modules are unable to satisfy both requirements of a high-end specification and compactness, especially features like a large aperture or a micro lens assembly with a wider field of view. Due to demands of higher specifications in zoom lens assemblies (such as increasing the zoom ratio, etc.), conventional telephoto lens assemblies cannot satisfy the requirements (due to an excessive total track length, overly small aperture, poor image quality or lack of compactness), so that the present disclosure provides an optical lens assembly capable of achieving an ultrathin catadioptric optical design under the telephoto specification.

SUMMARY

According to one aspect of the present disclosure, an imaging system lens assembly includes two lens groups, the two lens groups are, in order from an object side to an image side along a light path, a first lens group and a second lens group. The first lens group includes a first catadioptric lens element and a second catadioptric lens element, the second lens group includes at least one lens element. Each of the first catadioptric lens element and the second catadioptric lens element has an object-side surface facing towards the object side and an image-side surface facing towards the image side. The object-side surface of the first catadioptric lens element includes a central region and a peripheral region, and the image-side surface of the first catadioptric lens element includes a central region and a peripheral region. The object-side surface of the second catadioptric lens element includes a central region and a peripheral region, and the image-side surface of the second catadioptric lens element includes a central region and a peripheral region. The peripheral region of the object-side surface of the first catadioptric lens element preferably includes a first refracting surface. The peripheral region of the image-side surface of the second catadioptric lens element preferably includes a first reflecting surface. The central region of the object-side surface of the first catadioptric lens element preferably includes a second reflecting surface. The central region of the image-side surface of the second catadioptric lens element preferably includes a last refracting surface. When an axial distance between the second reflecting surface and an image surface is TL, and a maximum image height of the imaging system lens assembly is ImgH, the following condition preferably is satisfied: $TL/ImgH<6.0$.

According to another aspect of the present disclosure, an imaging apparatus includes the imaging system lens assembly according to the aforementioned aspect and an image sensor disposed on the image surface of the imaging system lens assembly.

According to another aspect of the present disclosure, an electronic device includes the imaging apparatus according to the aforementioned aspect.

According to another aspect of the present disclosure, an imaging system lens assembly includes two lens groups, the two lens groups are, in order from an object side to an image side along a light path, a first lens group and a second lens group. The first lens group includes a first catadioptric lens element and a second catadioptric lens element, the second lens group includes at least one lens element. Each of the first catadioptric lens element and the second catadioptric lens element has an object-side surface facing towards the object side and an image-side surface facing towards the image side. The object-side surface of the first catadioptric lens element includes a central region and a peripheral region, and the image-side surface of the first catadioptric lens element includes a central region and a peripheral region. The object-side surface of the second catadioptric lens element includes a central region and a peripheral region, and the image-side surface of the second catadioptric lens element includes a central region and a peripheral region. The peripheral region of the object-side surface of the first catadioptric lens element preferably includes a first refracting surface. The peripheral region of the image-side surface of the second catadioptric lens element preferably includes a first reflecting surface. The central region of the object-side surface of the first catadioptric lens element preferably includes a second reflecting surface. The central region of the image-side surface of the second catadioptric lens element preferably includes a last refracting surface. The second catadioptric lens element has the object-side surface being convex in a paraxial region thereof.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
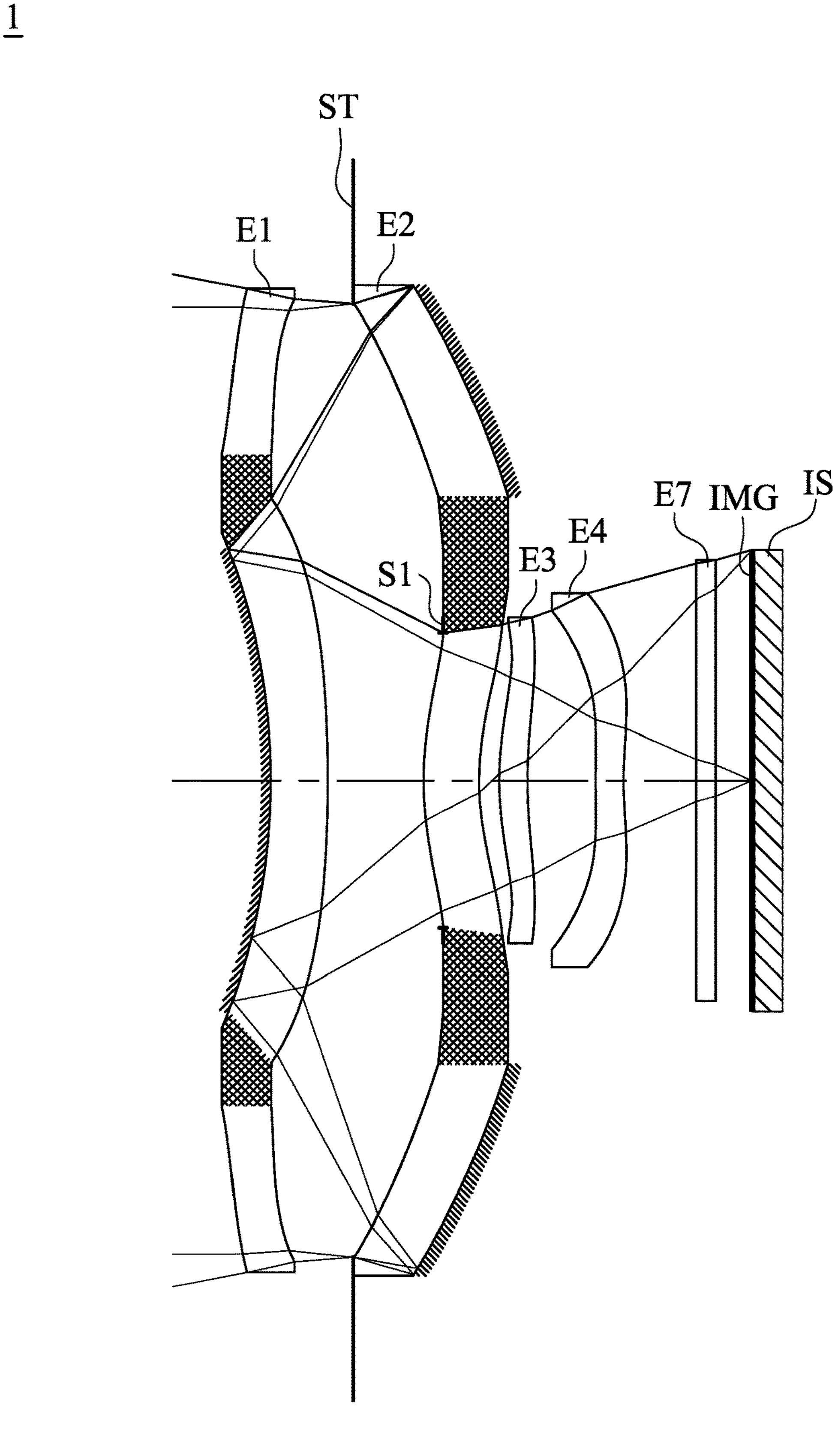
FIG. 1 is a schematic view of an imaging apparatus according to the 1st embodiment of the present disclosure.

An imaging system lens assembly includes two lens groups, the two lens groups are, in order from an object side to an image side along a light path, a first lens group and a second lens group. The first lens group includes a first catadioptric lens element and a second catadioptric lens element, the second lens group includes at least one lens element. Each of the first catadioptric lens element and the second catadioptric lens element has an object-side surface facing towards the object side and an image-side surface facing towards the image side. The object-side surface of the first catadioptric lens element includes a central region and a peripheral region, and the image-side surface of the first catadioptric lens element includes a central region and a peripheral region. The object-side surface of the second catadioptric lens element includes a central region and a peripheral region, and the image-side surface of the second catadioptric lens element includes a central region and a peripheral region. Therefore, the space utilization of the imaging system lens assembly can be improved under the split-plot design of the lens element in different heights.

The peripheral region of the object-side surface of the first catadioptric lens element includes a first refracting surface. The peripheral region of the image-side surface of the second catadioptric lens element includes a first reflecting surface. The central region of the object-side surface of the first catadioptric lens element includes a second reflecting surface. The central region of the image-side surface of the second catadioptric lens element includes a last refracting surface. Therefore, it is favorable for eliminating the need of disposing an additional reflector so as to reduce the required quantity of components and the manufacturing costs. The configuration of the reflecting surface in different lens elements can enhance the design flexibility of the reflecting region and decrease the assembling tolerance.

When an axial distance between the second reflecting surface and an image surface is TL, and a maximum image height of the imaging system lens assembly is ImgH, the following condition is satisfied: $TL/ImgH<6.0$. Therefore, it is favorable for balancing the total track length and the image height of the imaging system lens assembly so as to satisfy the need of compactness. Moreover, the following condition can be satisfied: $0.1<TL/ImgH<5.0$. Further, the following condition can be satisfied: $0.5<TL/ImgH<4.0$. Moreover, the following condition can be satisfied: $1.0<TL/ImgH<3.0$. Further, the following condition can be satisfied: $1.5<TL/ImgH<2.5$.

The second catadioptric lens element has the object-side surface being convex in a paraxial region thereof. Therefore, it is favorable for converging the light from the second reflecting surface so as to increase the amount of the incident light.

The lens element of the second lens group closest to the object side has the object-side surface being convex in the paraxial region thereof. Therefore, it is favorable for enhancing the symmetry of the imaging system lens assembly so as to improve the image quality.

The peripheral region of the object-side surface of the second catadioptric lens element being concave, so that it is favorable for the first reflecting surface receiving wider range of the light.

When a central curvature radius of the second reflecting surface is RM2, and a central curvature radius of the object-side surface of the second catadioptric lens element is R9, the following condition is satisfied: $RM2/R9<-0.3$. Therefore, it is favorable for converging the light so as to compress the volume of the lens element by effectively balancing the light refraction ability of the second reflecting surface and the central region of the object-side surface of the second catadioptric lens element. Moreover, the following condition can be satisfied: $-10.0<RM2/R9<-0.5$. Further, the following condition can be satisfied: $-5.0<RM2/R9<-0.6$. Moreover, the following condition can be satisfied: $-2.5<RM2/R9<-1.0$.

When the central curvature radius of the second reflecting surface is RM2, and a central curvature radius of the object-side surface of the lens element of the second lens group closest to the object side is R11, the following condition is satisfied: $-10.0<(RM2+R11)/(RM2-R11)<-0.01$. Therefore, it is favorable for maintaining the light traveling direction from the second reflecting surface into the second lens group so as to enhance the symmetry of the imaging system lens assembly and improve the image quality. Moreover, the following condition can be satisfied: $-5.0<(RM2+R11)/(RM2-R11)<-0.02$. Further, the following condition can be satisfied: $-1.0<(RM2+R11)/(RM2-R11)<-0.025$.

When a central thickness of the first catadioptric lens element is CT1, a central thickness of the second catadioptric lens element is CT2, and the axial distance between the second reflecting surface and the image surface is TL, the following condition is satisfied: $0<(CT1+CT2)/TL<0.3$. Therefore, it is favorable for controlling the path length of light between the first reflecting surface and the second reflecting surface so as to increase the space utilization and compress the volume of the imaging system lens assembly. Moreover, the following condition can be satisfied: $0.1<(CT1+CT2)/TL<0.29$. Further, the following condition can be satisfied: $0.15<(CT1+CT2)/TL<0.28$.

When a half of a maximum field of view of the imaging system lens assembly is HFOV, the following condition is satisfied: 7.0 degrees<HFOV<20.0 degrees. Therefore, it is favorable for capturing detailed images from afar so as to achieve the telephoto function. Moreover, the following condition can be satisfied: 8.0 degrees<HFOV<15.0 degrees. Further, the following condition can be satisfied: 8.5 degrees<HFOV<12.0 degrees.

When an f-number of the imaging system lens assembly is Fno, the following condition is satisfied: $1.3<Fno<2.5$. Therefore, it is favorable for balancing illumination and depth of field of the imaging system lens assembly and increasing the amount of the incident light so as to improve the image quality. Moreover, the following condition can be satisfied: $1.4<Fno<2.2$. Further, the following condition can be satisfied: $1.5<Fno<2.0$.

At least one surface of the at least one lens element of the second lens group can include at least one inflection point. Therefore, it is favorable for correcting and compensating aberrations on the peripheral image. Moreover, at least one surface of the lens element of the second lens group closest to the object side can include at least one inflection point. Therefore, it is favorable for enhancing the ability of the second lens group to correct the peripheral aberration.

When the central thickness of the first catadioptric lens element is CT1, and the axial distance between the second reflecting surface and the image surface is TL, the following condition is satisfied: $0.06<CT1/TL<0.15$. Therefore, it is favorable for controlling the thickness of the first catadioptric lens element so as to provide better size reduction of the imaging system lens assembly. Moreover, the following condition can be satisfied: $0.1<CT1/TL<0.14$.

The imaging system lens assembly can further include an aperture stop disposed between the first catadioptric lens element and the second catadioptric lens element. Therefore, the imaging range and the angle of the incident light on the image surface can be limited so as to provide telephoto photographic functionality with high image brightness, simultaneously. Moreover, the aperture stop can be disposed between the peripheral region of the first catadioptric lens element and the peripheral region of the second catadioptric lens element.

When a maximum effective radius of the peripheral region of the object-side surface of the first catadioptric lens element is YR1o, a minimum effective radius of the peripheral region of the object-side surface of the first catadioptric lens element is YR1i, a maximum effective radius of the peripheral region of the image-side surface of the second catadioptric lens element is YM1o, and a minimum effective radius of the peripheral region of the image-side surface of the second catadioptric lens element is YM1i, the following condition is satisfied: $0.5<(YR1o-YR1i)/(YM1o-YM1i)<1.2$. Therefore, it is favorable for balancing the entrance pupil of the first catadioptric lens element and the range of the light received by the first reflecting surface. Moreover, the following condition can be satisfied: $0.6<(YR1o-YR1i)/(YM10-YM1i)<1.0$. Further, the following condition can be satisfied: $0.7<(YR1o-YR1i)/(YM1o-YM1i)<0.95$.

When a maximum effective radius of the central region of the object-side surface of the first catadioptric lens element is YM2, and a maximum effective radius of the central region of the image-side surface of the second catadioptric lens element is YRL, the following condition is satisfied: $1.0<YM2/YRL<2.0$. Therefore, it is favorable for maintaining the entrance pupil of the second lens group and eliminating the stray light in the peripheral region by balancing the ratio of the effective radius of the second reflecting surface and the last refracting surface. Moreover, the following condition can be satisfied: $1.2<YM2/YRL<1.8$.

When the minimum effective radius of the peripheral region of the object-side surface of the first catadioptric lens element is YR1i, the maximum effective radius of the central region of the image-side surface of the second catadioptric lens element is YRL, and an axial distance between the image-side surface of the first catadioptric lens element and the object-side surface of the second catadioptric lens element is T12, the following condition is satisfied: $0.60<(YR1i-YRL)/T12<8.0$. Therefore, it is favorable for controlling the incident light with larger incident angle directly enters the image surface so as to prevent the image ghosting. Moreover, the following condition can be satisfied: $1.0<(YR1i-YRL)/T12<7.0$. Further, the following condition can be satisfied: $1.5<(YR1i-YRL)/T12<5.5$.

The first catadioptric lens element is made of plastic material. Therefore, it is favorable for manufacturing the lens element and correcting aberrations by enhancing the design flexibility of the shape of the first catadioptric lens element.

When an Abbe number of a lens element is V, and a refractive index of the lens element is N, at least one lens element of the imaging system lens assembly satisfies the following condition: $V/N<12.0$. Therefore, it is favorable for correcting chromatic aberration of the imaging system lens assembly. Moreover, at least two lens elements of the imaging system lens assembly satisfy the following condition: $V/N<12.0$.

Each of the object-side surface and the image-side surface of the first catadioptric lens element can include a light blocking area between the central region and the peripheral region thereof. Therefore, it is favorable for preventing the external light entering the imaging system from the non-effective light path area so as to reduce the generation of unnecessary light spots that affect the image quality. In detail, the light blocking area can include a matt film layer or an optical coating. The matt film layer can be a coating layer composed of metal layer and oxide layer. The optical coating can be a black ink spraying layer formed by a fast-drying ink based on epoxy resin and acrylic ester polymer, a dark coating layer having a light-absorbing ability formed by chemical vapor deposition, photoresistive coating layer. The optical coating has a property of being easily coated and adhered to the surface of elements, so that it is favorable for mass production.

Each of the object-side surface and the image-side surface of the second catadioptric lens element can include a light blocking area between the central region and the peripheral region thereof. Therefore, it is favorable for preventing the stray light formed in the non-effective optical path area after the light is reflected multiple times so as to reduce the generation of unnecessary light spots that affect the image quality.

The peripheral region of the image-side surface of the first catadioptric lens element can have a concave shape. Therefore, it is favorable for receiving light in a larger range into the imaging system lens assembly so as to enhance the image illuminances.

The second catadioptric lens element has the image-side surface being concave in the paraxial region thereof. Therefore, it is favorable for avoiding the effect of the aberration correction in the peripheral region of the image side of the imaging system lens assembly by balancing and adjusting the light which passes through the reflecting region.

The lens element of the second lens group closest to the image surface has negative refractive power. Therefore, it is favorable for effectively correcting the angle of incident light on the image surface so as to prevent distortion.

When a central curvature radius of the image-side surface of the first catadioptric lens element is R8, and a central curvature radius of the object-side surface of the second catadioptric lens element is R9, the following condition is satisfied: $0.85<(R8-R9)/(R8+R9)$. Therefore, it is favorable for ensuring the object-side surface of the second catadioptric lens element with stronger light refraction ability so as to increase the image size and reduce the spherical aberration of the center and the adjacent field of view. Moreover, the following condition can be satisfied: $0.95<(R8-R9)/(R8+R9)<5.0$. Further, the following condition can be satisfied: $1.05<(R8-R9)/(R8+R9)<3.0$.

When an axial distance between the last refracting surface and the image surface is TRLI, and the maximum image height of the imaging system lens assembly is ImgH, the following condition is satisfied: $1.0<TRLI/ImgH<2.1$. Therefore, it is favorable for controlling the volume and the image height of the second lens group so as to increase the image size and reduce the total track length. Moreover, the following condition can be satisfied: $1.1<TRLI/ImgH<1.8$.

When an axial distance between the image-side surface of the lens element closest to the image surface of the second lens group and the image surface is BL, and the maximum image height of the imaging system lens assembly is ImgH, the following condition can be satisfied: $0.01<BL/ImgH<1.0$. Therefore, it is favorable for controlling the relationship between the back focal length and the image height so as to effectively reduce the total track length of the imaging system lens assembly. Moreover, the following condition can be satisfied: $0.1<BL/ImgH<0.6$.

When the maximum image height of the imaging system lens assembly is ImgH, and a focal length of the imaging system lens assembly is f, the following condition is satisfied: $0.01<ImgH/f<0.30$. Therefore, it is favorable for controlling the field of view of the imaging system lens assembly so as to achieve a telephoto configuration and meet various application fields. Moreover, the following condition can be satisfied: $0.1<ImgH/f<0.25$.

When the focal length of the imaging system lens assembly is f, and the axial distance between the second reflecting surface and the image surface is TL, the following condition is satisfied: $0.2<TL/f<0.7$. Therefore, it is favorable for achieving an ultra-thin optical system under a telephoto specification so as to compress the volume of the imaging system lens assembly. Moreover, the following condition can be satisfied: $0.25<TL/f<0.6$. Further, the following condition can be satisfied: $0.3<TL/f<0.5$.

The second lens group can include at least two lens elements, so that it is favorable for improving the image quality. Moreover, the second lens group can include at least three lens elements.

When a displacement in parallel with a central axis from an axial vertex on the object-side surface of the lens element closest to the image surface of the second lens group to a maximum optical effective radius position on the object-side surface of the lens element closest to the image surface of the second lens group is SagLNR1, and a central thickness of the lens element closest to the image surface of the second lens group is CTN, the following condition can be satisfied: $-5.0<SagLNR1/CTN<-0.3$. Therefore, it is favorable for correcting peripheral aberration of the imaging system lens assembly and controlling the thickness of the lens element. Moreover, the following condition can be satisfied: $-3.0<SagLNR1/CTN<-0.8$.

When the maximum effective radius of the peripheral region of the object-side surface of the first catadioptric lens element is YR1o, and the maximum image height of the imaging system lens assembly is ImgH, the following condition can be satisfied: $1.80<YR1o/ImgH<3.10$. Therefore, it is favorable for receiving a wide range of the amount of the incident light so as to maintain sufficient image illuminances by balancing the ratio of the first refracting surface to the image surface. Moreover, the following condition can be satisfied: $1.90<YR1o/ImgH<2.50$.

When the maximum effective radius of the peripheral region of the object-side surface of the first catadioptric lens element is YR1o, and the minimum effective radius of the peripheral region of the object-side surface of the first catadioptric lens element is YR1i, the following condition is satisfied: $1.0<YR1o/YR1i<2.0$. Therefore, it is favorable for effectively controlling the ratio of the light transmission area of the first refracting surface so as to maintain sufficient image brightness and also avoid the stray light. Moreover, the following condition can be satisfied: $1.2<YR1o/YR1i<1.8$. Further, the following condition can be satisfied: $1.3<YR1o/YR1i<1.6$.

When the maximum effective radius of the peripheral region of the image-side surface of the second catadioptric lens element is YM1o, and the minimum effective radius of the peripheral region of the image-side surface of the second catadioptric lens element is YM1 i, the following condition is satisfied: $1.0<YM1o/YM1i<2.0$. Therefore, it is favorable for balancing the reflected light range of the first reflecting surface so as to ensure the lens assembly can receive enough light for reflection. Moreover, the following condition can be satisfied: $1.3<YM1o/YM1i<1.95$. Further, the following condition can be satisfied: $1.5<YM1o/YM1i<1.9$.

When a minimum Abbe number of all of the lens elements of the imaging system lens assembly is Vmin, the following condition is satisfied: $5.0<Vmin<24.0$. Therefore, it is favorable for ensuring sufficient capability of controlling light rays with proper lens materials of the imaging system lens assembly so as to balance focus positions of light at different wavelengths and prevent overlapped images. Moreover, the following condition can be satisfied: $10.0<Vmin<20.0$.

According to the present disclosure, the aforementioned features and conditions can be utilized in numerous combinations so as to achieve corresponding effects.

According to the present disclosure, the effective optical path area is defined based on the incident light passing through the imaging system lens assembly from the object side and then imaging on the image surface. In detail, the effective optical path area can be in order along an optical path to the image surface, the peripheral region of the object-side surface of the first catadioptric lens element, the peripheral region of the image-side surface of the first catadioptric lens element, the peripheral region of the object-side surface of the second catadioptric lens element, the peripheral region of the image-side surface of the second catadioptric lens element, the peripheral region of the object-side surface of the second catadioptric lens element, the central region of the image-side surface of the first catadioptric lens element, the central region of the object-side surface of the first catadioptric lens element, the central region of the image-side surface of the first catadioptric lens element, the central region of the object-side surface of the second catadioptric lens element, the central region of the image-side surface of the second catadioptric lens element, an effective diameter area of the second lens group.

According to the present disclosure, the f-number Fno of the imaging system lens assembly is an equivalent f-number, the calculation of the equivalent f-number is listed as follow: $0.5\times f/(SQRT((Ro^2)-(Ri^2)))$; wherein the focal length of the imaging system lens assembly is f, a maximum light aperture radius of the incident light at an aperture position when the incident light incident in parallel with the central axis is Ro, a minimum light aperture radius of the incident light at the aperture position when the incident light incident in parallel with the central axis is Ri.

According to the imaging system lens assembly of the present disclosure, the lens elements thereof can be made of glass or plastic materials. When the lens elements are made of glass materials, the distribution of the refractive power of the imaging system lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the imaging system lens assembly. Therefore, the total track length of the imaging system lens assembly can also be reduced. The aspheric surfaces may be formed by a plastic injection molding method, a glass molding method or other manufacturing methods.

According to the imaging system lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for light in a wavelength range of 600 nm-800 nm in the imaging system lens assembly so as to reduce extra red light or infrared light, or the additives can have the absorption ability for light in a wavelength range of 350 nm-450 nm in the imaging system lens assembly so as to reduce blue light or ultraviolet light. Therefore, additives can prevent the image from interfering by light in a particular wavelength range. Furthermore, the additives can be homogeneously mixed with the plastic material, and the lens elements can be made by the injection molding method. Moreover, the additives can be coated on the lens surfaces to provide the aforementioned effects.

The imaging system lens assembly according to the present disclosure can include at least one optical lens element, an optical element or a carrier. A low reflection layer is disposed on at least one surface of at least one optical lens element, the optical element or the carrier, wherein the low reflection layer is favorable for effectively reducing the stray light formed by the reflection of light on the interface. The low reflection layer can be disposed on the non-optically effective area of the object-side surface or the image-side surface of the optical lens element, or can be disposed on the connecting surface between the object-side surface or the image-side surface; wherein the optical element can be at least one of a light blocking element, an annular spacer element, a barrel element, a cover glass, a blue glass, a filter or a color filter, a light path folding element, a prism or a mirror, etc.; wherein the carrier can be a lens group lens mount, a micro lens disposed on the image sensor, the peripheral of the image sensor substrate or a glass sheet for protecting the image sensor, etc.

According to the imaging system lens assembly of the present disclosure, when a surface of the lens element is aspheric, it indicates that entire optical effective region of the surface of the lens element or a part thereof is aspheric.

According to the imaging system lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the imaging system lens assembly of the present disclosure, if the lens element has positive refractive power or negative refractive power, or the focal length of the lens element, all can be referred to the refractive power, or the focal length, in the paraxial region of the lens element.

According to the imaging system lens assembly of the present disclosure, an inflection point is a point on a lens surface with a curvature changing from positive to negative or from negative to positive.

According to the imaging system lens assembly of the present disclosure, the image surface thereof, based on the corresponding image sensor, can be flat or curved. In particular, the image surface can be a concave curved surface facing towards the object side. Furthermore, the imaging system lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

According to the present disclosure, the imaging system lens assembly can include at least one stop, such as an aperture stop, a glare stop or a field stop, for eliminating stray light and thereby improving image resolution thereof.

According to the imaging system lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the imaging system lens assembly and the image surface can be obtained, and thereby obtains a telecentric effect and improves the image-sensing efficiency of the image sensor, such as CCD or CMOS. The middle stop is favorable for enlarging the field of view of the imaging system lens assembly and thereby provides a wider field of view for the same.

According to the imaging system lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incident light or the exposure time of the image can be controlled by the aperture control unit to enhance the image moderation ability. In addition, the aperture control unit can be the aperture stop of the imaging system lens assembly according to the present disclosure, so as to moderate the image quality by changing f-number such as changing the depth of field or the exposure speed.

According to the present disclosure, one or more optical elements may be suitably disposed on the imaging system lens assembly so as to limit the way light passes through the imaging system lens assembly. The optical elements can be a filter, a polarizer, etc., but is not limited thereto. The optical elements can be a monolithic component element, a composite component or a thin film, but is not limited thereto. The optical elements can be disposed between an object end, an image end or the lens element of the imaging system lens assembly so as to control the passage of specific light to meet application requirements.

According to the present disclosure, the imaging system lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned imaging system lens assembly and an image sensor is provided, wherein the image sensor is disposed on the image surface of the imaging system lens assembly. Therefore, it is favorable for eliminating the need of disposing an additional reflector so as to reduce the required quantity of components and the manufacturing costs. The configuration of the reflecting surface in different lens elements can enhance the design flexibility of the reflecting region and decrease the assembling tolerance. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
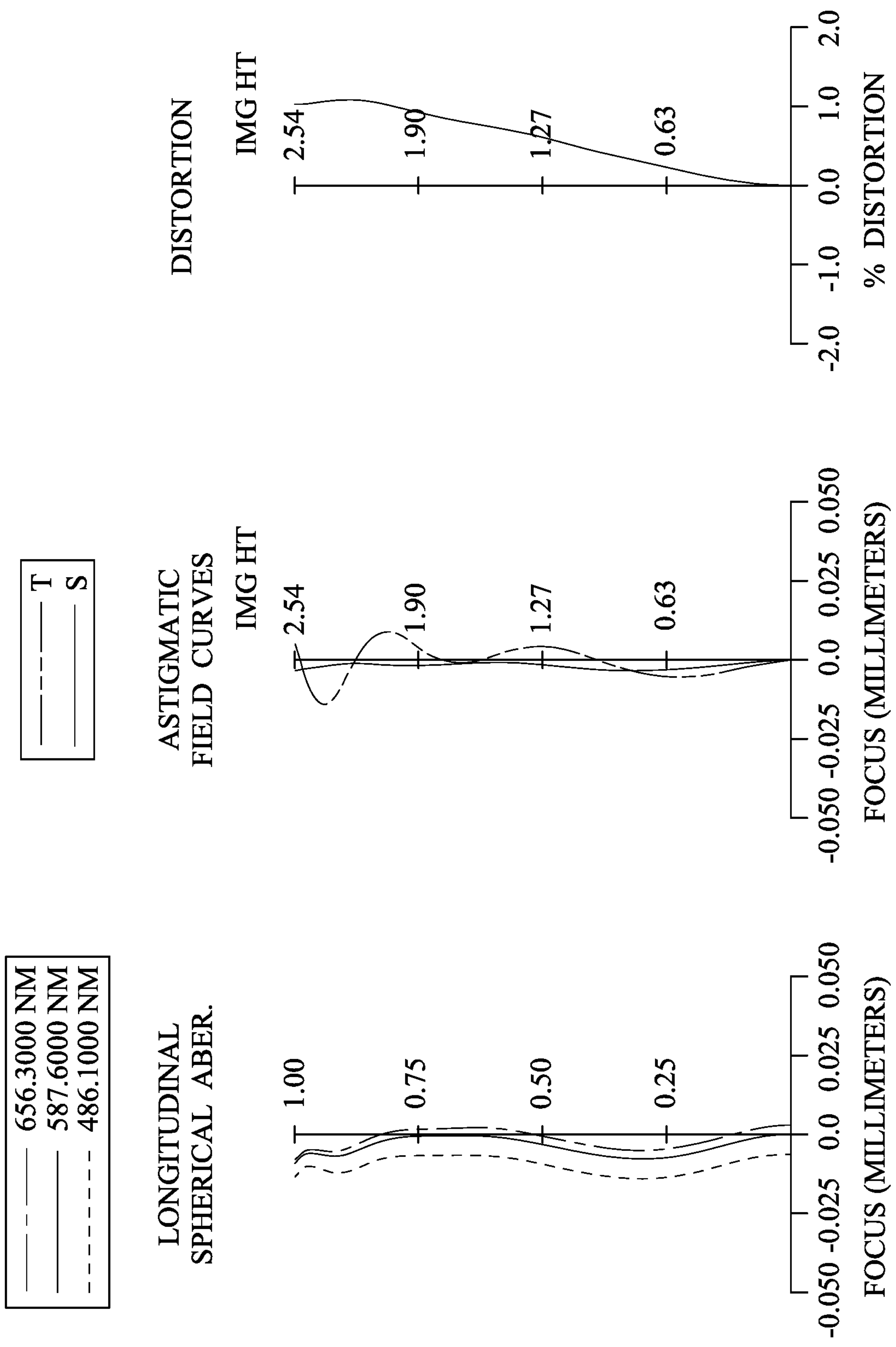
FIG. 2 shows, in order from left to right, spherical aberration curves, astigmatic field curves and a distortion curve of the imaging apparatus according to the 1st embodiment.

FIG. 1 is a schematic view of an imaging apparatus 1 according to the 1st embodiment of the present disclosure. FIG. 2 shows, in order from left to right, spherical aberration curves, astigmatic field curves and a distortion curve of the imaging apparatus 1 according to the 1st embodiment. As shown in FIG. 1, the imaging apparatus 1 according to the 1st embodiment includes an imaging system lens assembly (reference number is omitted) and an image sensor IS. The imaging system lens assembly includes, in order from an object side to an image side, a first lens element E1, an aperture stop ST, a stop S1, a second lens element E2, a third lens element E3, a fourth lens element E4, a filter E7 and an image surface IMG, wherein the image sensor IS is disposed on the image surface IMG of the imaging system lens assembly. The imaging system lens assembly includes four lens elements (E1, E2, E3, E4) without additional one or more lens elements inserted between the first lens element E1 and the fourth lens element E4. The first lens element E1 and the second lens element E2 belong to a first lens group, and the third lens element E3, the fourth lens element E4 belong to a second lens group.

Figure 21:
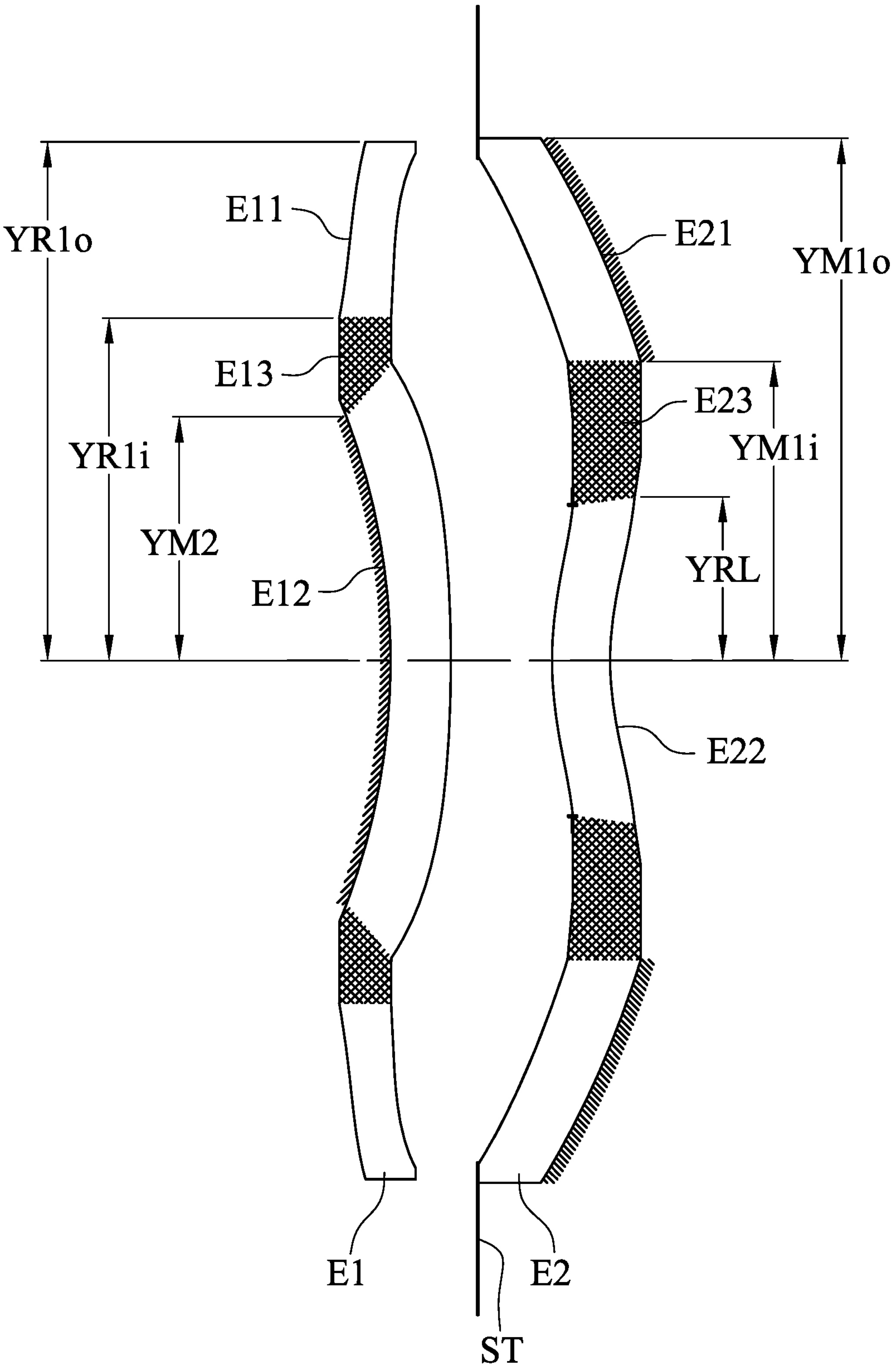
FIG. 21 is a schematic view of a first lens element and a second lens element according to the 1st embodiment of FIG. 1.

FIG. 21 is a schematic view of the first lens element E1 and the second lens element E2 according to the 1st embodiment of FIG. 1. As shown in FIG. 21, the first lens element E1 is a first catadioptric lens element, and has an object-side surface facing towards the object side and an image-side surface facing towards the image side. The object-side surface of the first catadioptric lens element includes a central region and a peripheral region, and the image-side surface of the first catadioptric lens element includes a central region and a peripheral region. The peripheral region of the object-side surface of the first catadioptric lens element includes a first refracting surface E11. The central region of the object-side surface of the first catadioptric lens element includes a second reflecting surface E12. Each of the object-side surface and the image-side surface of the first catadioptric lens element includes a light blocking area E13 between the central region and the peripheral region thereof. In detail, the first lens element E1 is made of a plastic material, and has the peripheral region of the object-side surface (i.e. the first refracting surface E11) being convex, the central region of the object-side surface (i.e. the second reflecting surface E12) being concave, the peripheral region of the image-side surface being concave, the central region of the image-side surface being convex, and all being aspheric.

The second lens element E2 is a second catadioptric lens element, and has an object-side surface facing towards the object side and an image-side surface facing towards the image side. The object-side surface of the second catadioptric lens element includes a central region and a peripheral region, and the image-side surface of the second catadioptric lens element includes a central region and a peripheral region. The peripheral region of the image-side surface of the second catadioptric lens element includes a first reflecting surface E21. The central region of the image-side surface of the second catadioptric lens element includes a last refracting surface E22. Each of the object-side surface and the image-side surface of the second catadioptric lens element includes a light blocking area E23 between the central region and the peripheral region thereof. In detail, the second lens element E2 is made of a plastic material, and has the peripheral region of the object-side surface being concave, the central region of the object-side surface being convex, the peripheral region of the image-side surface (i.e. the first reflecting surface E21) being convex, the central region of the image-side surface (i.e. the last refracting surface E22) being concave, and all being aspheric.

Figure 22:
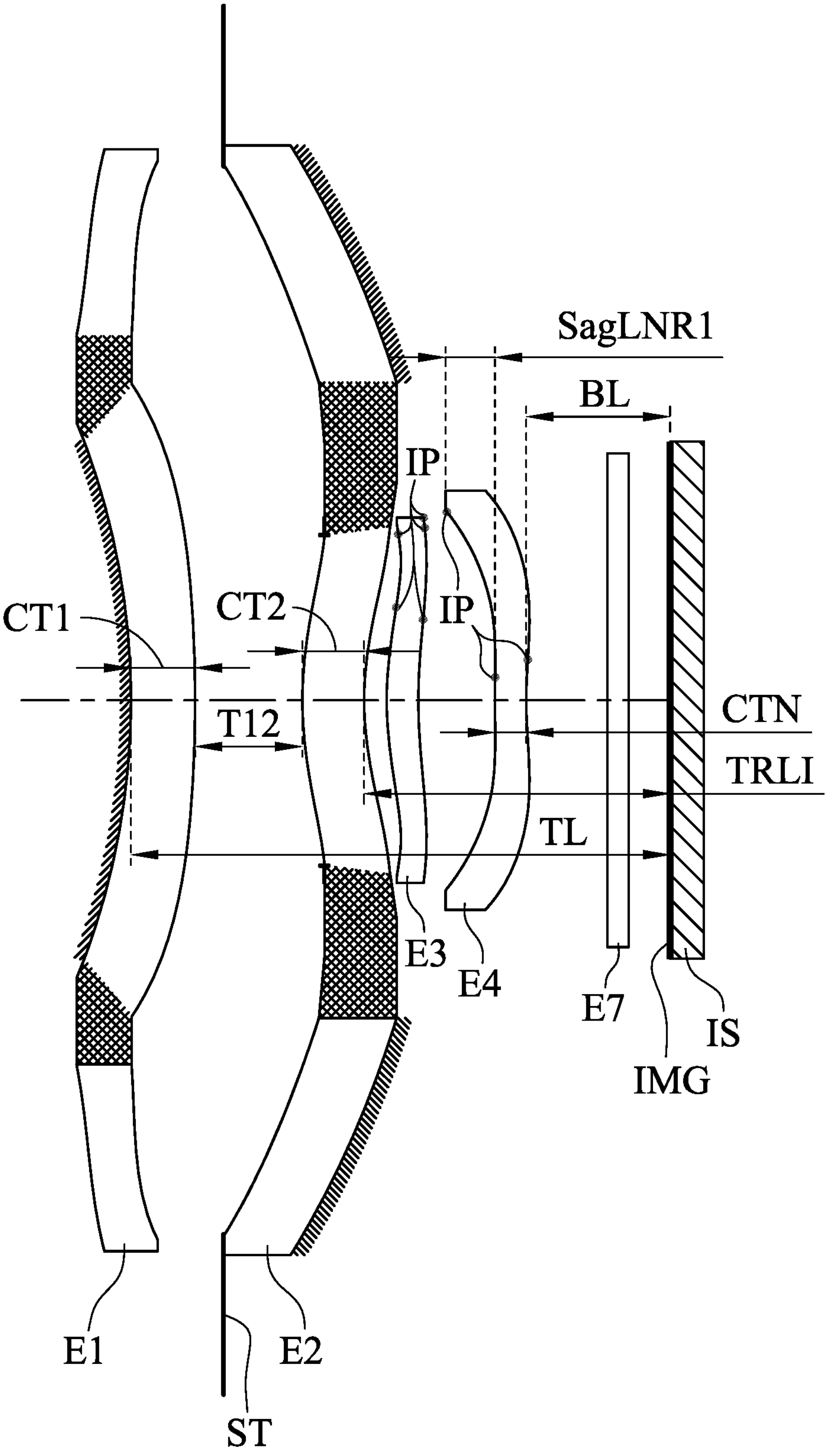
FIG. 22 is a schematic view of partial parameters and the inflection points of a third lens element according to the 1st embodiment of FIG. 1.

The third lens element E3 with positive refractive power has the object-side surface being convex in a paraxial region thereof and the image-side surface being concave in a paraxial region thereof. The third lens element E3 is made of a plastic material, and has the object-side surface and the image-side surface being both aspheric. Further, FIG. 22 is a schematic view of partial parameters and the inflection points IP of the third lens element E3 according to the 1st embodiment of FIG. 1. As shown in FIG. 22, the object-side surface of the third lens element E3 includes two inflection points IP (as shown in FIG. 22), and the image-side surface of the third lens element E3 includes three inflection points IP (as shown in FIG. 22).

The fourth lens element E4 with negative refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes two inflection points IP (as shown in FIG. 22), and the image-side surface of the fourth lens element E4 includes one inflection point IP (as shown in FIG. 22).

The filter E7 is made of a glass material, which is located between the fourth lens element E4 and the image surface IMG in order, and will not affect the focal length of the imaging system lens assembly.

The equation of the aspheric surface profiles of the aforementioned lens elements of the 1st embodiment is expressed as follows:

$$X(Y)=(Y^2/R)/(1+sqrt(1-(1+k)\times(Y/R)^2))+\sum_i(Ai)\times(Y^i);$$

wherein,

X is the displacement in parallel with an axial distance from the intersection point of the aspheric surface and the axial distance to a point at a distance of Y from the axial distance on the aspheric surface;

Y is the vertical distance from the point on the aspheric surface to the axial distance;

R is the curvature radius;

k is the conic coefficient; and

Ai is the i-th aspheric coefficient.

In the imaging system lens assembly according to the 1st embodiment, when a focal length of the imaging system lens assembly is f, an f-number of the imaging system lens assembly is Fno, and half of a maximum field of view of the imaging system lens assembly is HFOV, these parameters have the following values: f=13.04 mm; Fno=1.68; and HFOV=10.9 degrees.

In the imaging system lens assembly according to the 1st embodiment, when an axial distance between the second reflecting surface E12 and the image surface IMG is TL, a maximum image height of the imaging system lens assembly is ImgH, the focal length of the imaging system lens assembly is f, and an axial distance between the image-side surface of the lens element of the second lens group closest to the image surface IMG (i.e. the fourth lens element E4) is BL, the following conditions are satisfied: TL/ImgH=2.09; TL/f=0.41; ImgH/f=0.19; and BL/ImgH=0.56.

In the imaging system lens assembly according to the 1st embodiment, when a central curvature radius of the image-side surface of the first catadioptric lens element (i.e. the first lens element E1) is R8, and a central curvature radius of the object-side surface of the second catadioptric lens element (i.e. the second lens element E2) is R9, the following condition is satisfied: (R8−R9)/(R8+R9)=1.64.

In the imaging system lens assembly according to the 1st embodiment, when the central curvature radius of the second reflecting surface E12 is RM2, and a central curvature radius of the object-side surface of the lens element of the second lens group closest to the object side (i.e. the third lens element E3) is R11, the following condition is satisfied: (RM2+R11)/(RM2−R11)=0.35.

In the imaging system lens assembly according to the 1st embodiment, when the central curvature radius of the second reflecting surface E12 is RM2, and the central curvature radius of the object-side surface of the second catadioptric lens element (i.e. the second lens element E2) is R9, the following condition is satisfied: RM2/R9=−1.88.

In the imaging system lens assembly according to the 1st embodiment, when a central thickness of the first catadioptric lens element (i.e. the first lens element E1) is CT1, a central thickness of the second catadioptric lens element (i.e. the second lens element E2) is CT2, and the axial distance between the second reflecting surface E12 and the image surface IMG is TL, the following conditions are satisfied: CT1/TL=0.12; and (CT1+CT2)/TL=0.23.

In the imaging system lens assembly according to the 1st embodiment, when an axial distance between the last refracting surface E22 and the image surface IMG is TRLI, and the maximum image height of the imaging system lens assembly is ImgH, the following condition is satisfied: TRLI/ImgH=1.19.

In the imaging system lens assembly according to the 1st embodiment, when a maximum effective radius of the peripheral region of the object-side surface of the first catadioptric lens element (i.e. the first lens element E1) is YR1o, a minimum effective radius of the peripheral region of the object-side surface of the first catadioptric lens element (i.e. the first lens element E1) is YR1i, a maximum effective radius of the peripheral region of the image-side surface of the second catadioptric lens element (i.e. the second lens element E2) is YM1o, a minimum effective radius of the peripheral region of the image-side surface of the second catadioptric lens element (i.e. the second lens element E2) is YM1i, a maximum effective radius of the central region of the object-side surface of the first catadioptric lens element (i.e. the first lens element E1) is YM2, and a maximum effective radius of the central region of the image-side surface of the second catadioptric lens element (i.e. the second lens element E2) is YRL, and an axial distance between the image-side surface of the first catadioptric lens element (i.e. the first lens element E1) and the object-side surface of the second catadioptric lens element (i.e. the second lens element E2) is T12, the following conditions are satisfied: YR10=5.42 mm; YR1i=3.58 mm; YM1o=5.46 mm; YM1 i=3.13 mm; YM2=2.55 mm; YRL=1.71 mm; YR1o/ImgH=2.13; (YR1i−YRL)/T12=1.77; YM2/YRL=1.49; (YR1o−YR1i)/(YM1o−YM1i)=0.79; YR1o/YR1i=1.51; and YM1o/YM1i=1.75.

In the imaging system lens assembly according to the 1st embodiment, when a displacement in parallel with a central axis from an axial vertex on the object-side surface of the lens element closest to the image surface IMG (i.e. the fourth lens element E4) of the second lens group to a maximum optical effective radius position on the object-side surface of the lens element closest to the image surface IMG (i.e. the fourth lens element E4) of the second lens group is SagLNR1, and a central thickness of the lens element closest to the image surface IMG (i.e. the fourth lens element E4) of the second lens group is CTN, the following condition is satisfied: SagLNR1/CTN=−1.58.

In the imaging system lens assembly according to the 1st embodiment, when an Abbe number of the first lens element E1 is V1, an Abbe number of the second lens element E2 is V2, an Abbe number of the third lens element E3 is V3, an Abbe number of the fourth lens element E4 is V4, a minimum among Abbe numbers of all lens elements of the imaging system lens assembly is Vmin, a refractive index of the first lens element E1 is N1, a refractive index of the second lens element E2 is N2, a refractive index of the third lens element E3 is N3, and a refractive index of the fourth lens element E4 is N4, the following conditions are satisfied: Vmin=28.3; V1/N1=36.51; V2/N2=23.88; V3/N3=17.83; and V4/N4=17.83; in the 1st embodiment, Vmin=V3=V4.

The detailed optical data of the 1st embodiment are shown in Table 1A and the aspheric surface data are shown in Table 1B below.

TABLE 1A

1st Embodiment
f = 13.04 mm, Fno = 1.68, HFOV = 10.9 deg.

| Surface # | | Curvature Radius | Thickness | Material | Index | Abbe # | Refractive/ reflective Mode | Focal Length |
|---|---|---|---|---|---|---|---|---|
| 0 | Object | Plano | Infinity | | | | Refract | |
| 1 | Lens 1 peripheral area | 8.9345 ASP | 0.827 | Plastic | 1.534 | 56.0 | Refract | — |
| 2 | | 15.5938 ASP | 1.150 | | | | Refract | |
| 3 | Ape. Stop | Plano | 1.442 | | | | Refract | |
| 4 | Lens 2 peripheral area | −9.3981 ASP | 0.734 | Plastic | 1.566 | 37.4 | Refract | — |
| 5 | | −10.3898 ASP | −0.734 | Plastic | 1.566 | 37.4 | Reflect | — |
| 6 | | −9.3981 ASP | −1.723 | | | | Refract | |
| 7 | Lens 1 central area | −15.7602 ASP | −0.630 | Plastic | 1.534 | 56.0 | Refract | — |
| 8 | | −7.2133 ASP | 0.630 | Plastic | 1.534 | 56.0 | Reflect | — |
| 9 | | −15.7602 ASP | 1.272 | | | | Refract | |
| 10 | Stop | Plano | −0.215 | | | | Refract | |
| 11 | Lens 2 central area | 3.8383 ASP | 0.607 | Plastic | 1.566 | 37.4 | Refract | — |
| 12 | | 3.1215 ASP | 0.222 | | | | Refract | |
| 13 | Lens 3 | 3.5011 ASP | 0.313 | Plastic | 1.587 | 28.3 | Refract | 15.82 |
| 14 | | 5.4322 ASP | 0.752 | | | | Refract | |
| 15 | Lens 4 | 9.6154 ASP | 0.308 | Plastic | 1.587 | 28.3 | Refract | −11.56 |
| 16 | | 3.9326 ASP | 0.800 | | | | Refract | |
| 17 | Filter | Plano | 0.210 | Glass | 1.517 | 64.2 | Refract | — |
| 18 | | Plano | 0.406 | | | | Refract | |
| 19 | Image | Plano | — | | | | | |

Reference wavelength is 587.6 nm (d-line).
Effective radius of Surface 10 (stop S1) is 1.626 mm.

TABLE 1B

Aspheric Coefficients

| Surface # | 1 | 2 | 4 | 5 | 6 |
|---|---|---|---|---|---|
| k= | 5.404850E−01 | −3.324930E+01 | −9.838600E−01 | −5.563490E−01 | −9.838600E−01 |
| A4= | −1.256189E−03 | −5.607271E−05 | 1.618271E−04 | 3.849465E−05 | 1.618271E−04 |
| A6= | 4.207181E−06 | −3.899441E−05 | 9.147209E−06 | 8.414920E−07 | 9.147209E−06 |
| A8= | −3.247302E−06 | 2.217994E−07 | −1.272581E−06 | −3.386170E−07 | −1.272581E−06 |
| A10= | 1.611279E−07 | 6.562066E−08 | 5.345277E−08 | 1.334179E−08 | 5.345277E−08 |
| A12= | −2.034044E−09 | −9.085191E−10 | −8.888432E−10 | −1.991510E−10 | −8.888432E−10 |

| Surface # | 7 | 8 | 9 | 11 | 12 |
|---|---|---|---|---|---|
| k= | −4.293880E+00 | −3.159560E+00 | −4.293880E+00 | −6.275280E+00 | −1.585570E+01 |
| A4= | −2.636051E−03 | −3.800215E−04 | −2.636051E−03 | −4.104762E−03 | 2.949266E−02 |
| A6= | −3.839248E−05 | −1.676948E−04 | −3.839248E−05 | −4.614793E−03 | −3.506590E−02 |
| A8= | −7.246190E−06 | 5.303099E−06 | −7.246190E−06 | 3.073406E−03 | 2.293503E−02 |
| A10= | 2.359466E−07 | 2.475843E−06 | 2.359466E−07 | −1.543610E−03 | −9.633230E−03 |
| A12= | 4.678989E−10 | −1.870276E−07 | 4.678989E−10 | 3.513441E−04 | 1.944668E−03 |
| A14= | | | | −2.962499E−05 | −1.274027E−04 |

| Surface # | 13 | 14 | 15 | 16 |
|---|---|---|---|---|
| k= | −9.760600E−01 | −8.419810E+01 | −5.426150E+01 | −2.632200E+01 |
| A4= | −3.907278E−02 | 1.871712E−02 | −1.803340E−01 | −1.246536E−01 |
| A6= | −1.131772E−03 | −3.852403E−02 | 1.547389E−01 | 9.604601E−02 |
| A8= | 5.390934E−03 | 3.234616E−02 | −1.233062E−01 | −6.860579E−02 |
| A10= | −1.377745E−04 | −1.549019E−02 | 6.873524E−02 | 3.388603E−02 |
| A12= | −2.877634E−03 | 3.523155E−03 | −2.361271E−02 | −1.064218E−02 |
| A14= | 1.240012E−03 | −2.673139E−04 | 4.678382E−03 | 2.053847E−03 |
| A16= | −1.468782E−04 | −7.077668E−06 | −4.866064E−04 | −2.346525E−04 |
| A18= | | | 2.058483E−05 | 1.448913E−05 |
| A20= | | | | −3.698460E−07 |

Table 1A shows the detailed optical data of FIG. 1 of the 1st embodiment, wherein the curvature radius, thickness and the focal length are shown in millimeters (mm), Surface numbers 0-19 represent the surfaces sequentially arranged from the object side to the image side, the Index is the refractive index measured at the Reference wavelength. Table 1B shows the aspheric surface data of the 1st embodiment, wherein k represents the conic coefficient of the equation of the aspheric surface profiles, and A4-A20 represent the aspheric coefficients of each surface ranging from the 4th order to the 20th order. The tables presented below for each embodiment correspond to the schematic view and aberration curves of each embodiment, and term definitions of the tables are the same as those in Table 1A and Table 1B of the 1st embodiment. Therefore, an explanation in this regard will not be provided again.

2nd Embodiment

Figure 3:
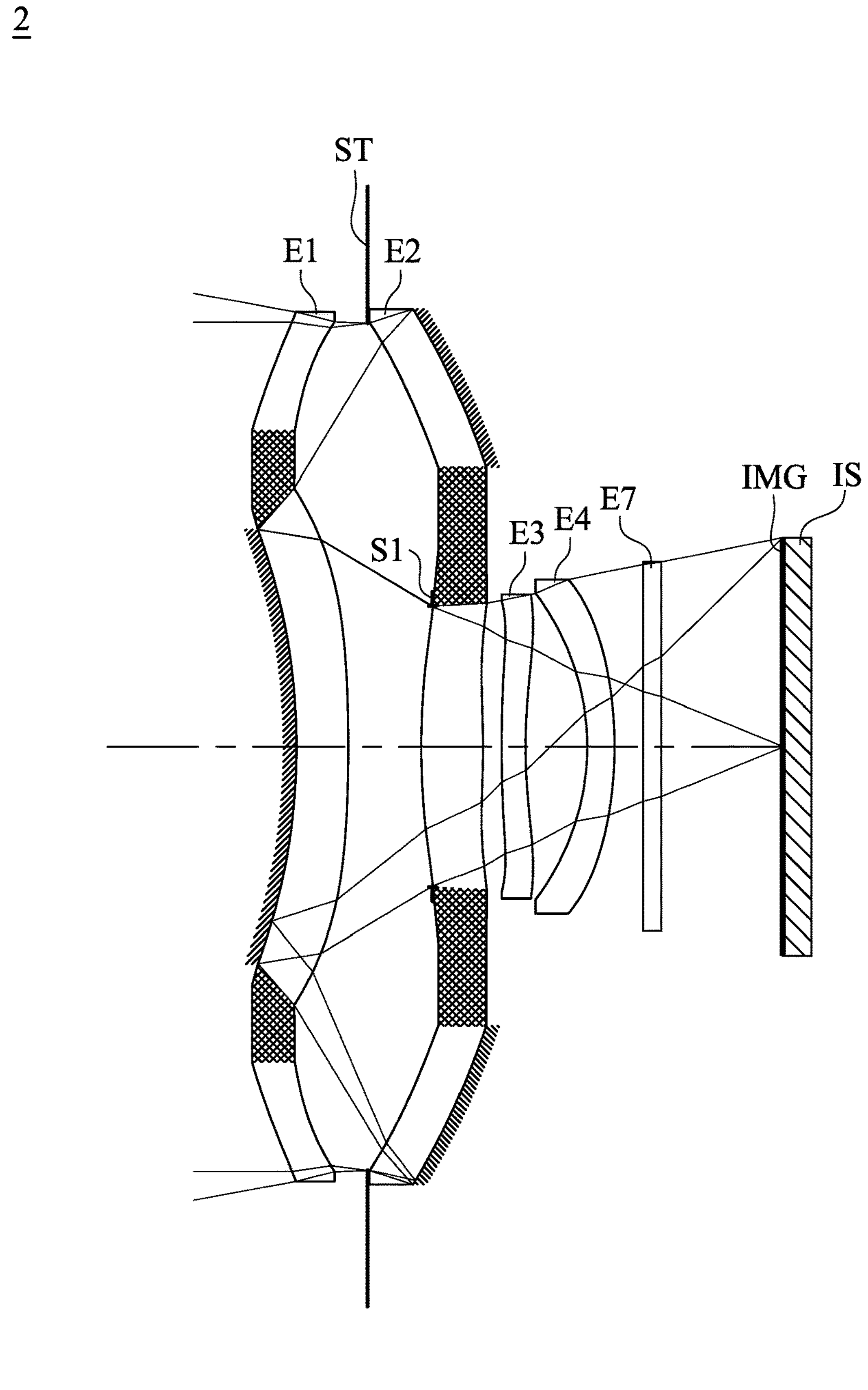
FIG. 3 is a schematic view of an imaging apparatus according to the 2nd embodiment of the present disclosure.
Figure 4:
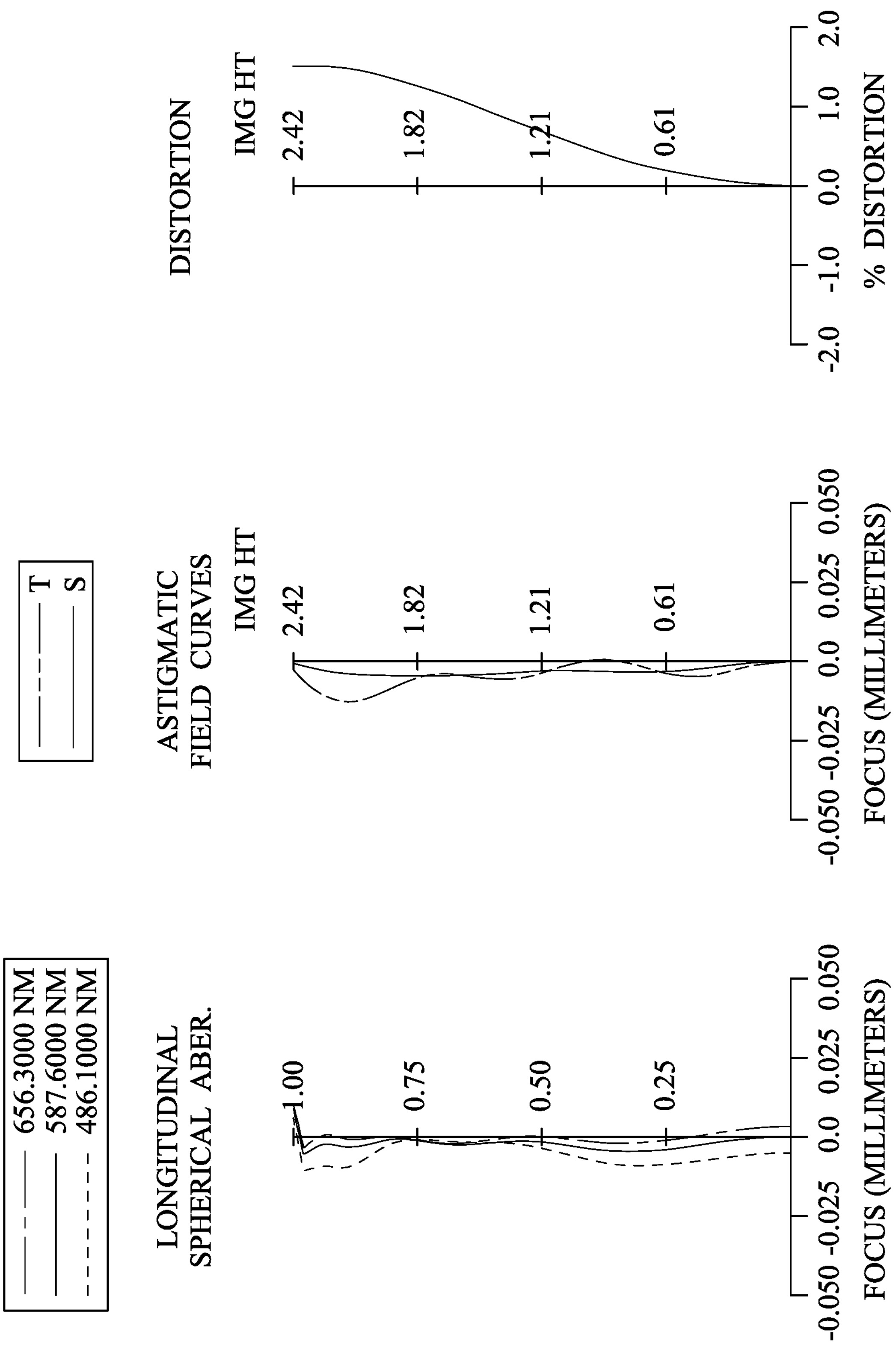
FIG. 4 shows, in order from left to right, spherical aberration curves, astigmatic field curves and a distortion curve of the imaging apparatus according to the 2nd embodiment.

FIG. 3 is a schematic view of an imaging apparatus 2 according to the 2nd embodiment of the present disclosure. FIG. 4 shows, in order from left to right, spherical aberration curves, astigmatic field curves and a distortion curve of the imaging apparatus 2 according to the 2nd embodiment. As shown in FIG. 3, the imaging apparatus 2 according to the 2nd embodiment includes an imaging system lens assembly (reference number is omitted) and an image sensor IS. The imaging system lens assembly includes, in order from an object side to an image side, a first lens element E1, an aperture stop ST, a stop S1, a second lens element E2, a third lens element E3, a fourth lens element E4, a filter E7 and an image surface IMG, wherein the image sensor IS is disposed on the image surface IMG of the imaging system lens assembly. The imaging system lens assembly includes four lens elements (E1, E2, E3, E4) without additional one or more lens elements inserted between the first lens element E1 and the fourth lens element E4. The first lens element E1 and the second lens element E2 belong to a first lens group, and the third lens element E3, the fourth lens element E4 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being convex, and all being aspheric.

The third lens element E3 with negative refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens lens element E3 includes one inflection point.

The fourth lens element E4 with negative refractive power has the object-side surface being concave in a paraxial region thereof and the image-side surface being convex in a paraxial region thereof. The fourth lens element E4 is made of a plastic material, and has the object-side surface and the image-side surface being both aspheric.

The filter E7 is made of a glass material, which is located between the fourth lens element E4 and the image surface IMG in order, and will not affect the focal length of the imaging system lens assembly.

The detailed optical data of the 2nd embodiment are shown in Table 2A and the aspheric surface data are shown in Table 2B below.

TABLE 2A

2nd Embodiment
f = 12.95 mm, Fno = 1.94, HFOV = 10.4 deg.

| Surface # | | Curvature Radius | Thickness | Material | Index | Abbe # | Refractive/ reflective Mode | Focal Length |
|---|---|---|---|---|---|---|---|---|
| 0 | Object | Plano | Infinity | | | | Refract | |
| 1 | Lens 1 peripheral area | 8.4028 ASP | 0.859 | Plastic | 1.544 | 56.0 | Refract | — |
| 2 | | 17.0313 ASP | 1.143 | | | | Refract | |
| 3 | Ape. Stop | Plano | 1.385 | | | | Refract | |
| 4 | Lens 2 peripheral area | −9.2592 ASP | 0.510 | Plastic | 1.587 | 28.3 | Refract | — |
| 5 | | −10.1315 ASP | −0.510 | Plastic | 1.587 | 28.3 | Reflect | — |
| 6 | | −9.2592 ASP | −1.611 | | | | Refract | |
| 7 | Lens 1 central area | −20.9060 ASP | −0.600 | Plastic | 1.544 | 56.0 | Refract | — |
| 8 | | −7.7261 ASP | 0.600 | Plastic | 1.544 | 56.0 | Reflect | — |
| 9 | | −20.9060 ASP | 0.977 | | | | Refract | |
| 10 | Stop | Plano | −0.130 | | | | Refract | |
| 11 | Lens 2 central area | 8.9849 ASP | 0.710 | Plastic | 1.587 | 28.3 | Refract | — |
| 12 | | −9.0981 ASP | 0.216 | | | | Refract | |
| 13 | Lens 3 | 23.4561 ASP | 0.277 | Plastic | 1.669 | 19.5 | Refract | −12.49 |
| 14 | | 6.1317 ASP | 0.717 | | | | Refract | |
| 15 | Lens 4 | −2.8601 ASP | 0.316 | Plastic | 1.566 | 37.4 | Refract | −13.97 |
| 16 | | −4.6595 ASP | 0.333 | | | | Refract | |
| 17 | Filter | Plano | 0.210 | Glass | 1.517 | 64.2 | Refract | — |
| 18 | | Plano | 1.401 | | | | Refract | |
| 19 | Image | Plano | — | | | | | |

Reference wavelength is 587.6 nm (d-line).
Effective radius of Surface 10 (stop S1) is 1.626 mm.

TABLE 2B

Aspheric Coefficients

| Surface # | 1 | 2 | 4 | 5 | 6 |
|---|---|---|---|---|---|
| k= | −3.676950E−02 | −2.301070E+01 | −5.284730E−01 | −2.972370E−01 | −5.284730E−01 |
| A4= | −7.197608E−04 | 1.526631E−05 | 5.287671E−05 | −1.183692E−06 | 5.287671E−05 |
| A6= | −2.986243E−05 | −4.967878E−05 | −1.838251E−06 | 2.107606E−07 | −1.838251E−06 |
| A8= | −1.154791E−06 | 1.907996E−06 | −3.106853E−07 | −3.627328E−07 | −3.106853E−07 |
| A10= | 2.129405E−07 | 1.138925E−07 | 4.373322E−08 | 2.422457E−08 | 4.373322E−08 |
| A12= | −4.893437E−09 | −3.339602E−09 | −1.409227E−09 | −5.637576E−10 | −1.409227E−09 |

| Surface # | 7 | 8 | 9 | 11 | 12 |
|---|---|---|---|---|---|
| k= | 1.216540E+01 | −2.817360E−02 | 1.216540E+01 | 2.035390E+01 | 8.168320E+00 |
| A4= | −6.301991E−03 | −1.195835E−03 | −6.301991E−03 | −2.713732E−03 | 5.588059E−02 |
| A6= | 2.361917E−04 | −9.745561E−05 | 2.361917E−04 | −7.350397E−04 | −2.599890E−02 |
| A8= | −1.414447E−06 | 5.194437E−05 | −1.414447E−06 | 1.505851E−03 | 1.906313E−02 |
| A10= | −3.263116E−06 | −4.959527E−06 | −3.263116E−06 | −1.458757E−03 | −9.230017E−03 |
| A12= | 2.629353E−07 | 1.759816E−07 | 2.629353E−07 | 3.513441E−04 | 1.944668E−03 |
| A14= | | | | −2.962499E−05 | −1.274027E−04 |

| Surface # | 13 | 14 | 15 | 16 |
|---|---|---|---|---|
| k= | 5.137840E+01 | −9.900000E+01 | −3.163560E+01 | −9.557890E+01 |
| A4= | 2.806922E−02 | 3.679494E−02 | −1.438151E−01 | −9.381104E−02 |
| A6= | −2.898978E−02 | −5.169257E−02 | 1.504442E−01 | 9.071158E−02 |
| A8= | 1.396833E−02 | 3.640555E−02 | −1.252301E−01 | −6.862191E−02 |
| A10= | −1.363893E−03 | −1.596370E−02 | 6.917109E−02 | 3.391823E−02 |
| A12= | −2.877634E−03 | 3.523155E−03 | −2.361271E−02 | −1.064218E−02 |

TABLE 2B-continued

| Aspheric Coefficients | | | | |
|---|---|---|---|---|
| A14= | 1.240012E−03 | −2.673139E−04 | 4.678382E−03 | 2.053847E−03 |
| A16= | −1.468782E−04 | −7.077668E−06 | −4.866064E−04 | −2.346525E−04 |
| A18= | | | 2.058483E−05 | 1.448913E−05 |
| A20= | | | | −3.698460E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters in Table 2C can be calculated from Table 2A and Table 2B as the following values and satisfy the following conditions:

TABLE 2C

| 2nd Embodiment | | | |
|---|---|---|---|
| f [mm] | 12.95 | YM1i [mm] | 3.23 |
| Fno | 1.94 | YM2 [mm] | 2.51 |
| HFOV [deg.] | 10.4 | YRL [mm] | 1.66 |
| TL/ImgH | 2.33 | YR1o/ImgH | 2.08 |
| TL/f | 0.43 | (YR1i − YRL)/T12 | 2.35 |
| ImgH/f | 0.19 | YM2/YRL | 1.51 |
| BL/ImgH | 0.80 | (YR1o − YR1i)/(YM1o − YM1i) | 0.75 |
| (R8 − R9)/(R8 + R9) | 2.51 | YR1o/YR1i | 1.38 |
| (RM2 + R11)/(RM2 − R11) | −0.50 | YM1o/YM1i | 1.57 |
| RM2/R9 | −0.86 | SagLNR1/CTN | −1.90 |
| CT1/TL | 0.11 | Vmin | 19.5 |
| (CT1 + CT2)/TL | 0.23 | V1/N1 | 36.27 |
| TRLI/ImgH | 1.43 | V2/N2 | 17.83 |
| YR1o [mm] | 5.03 | V3/N3 | 11.68 |
| YR1i [mm] | 3.65 | V4/N4 | 23.88 |
| YM1o [mm] | 5.07 | | |

3rd Embodiment

Figure 5:
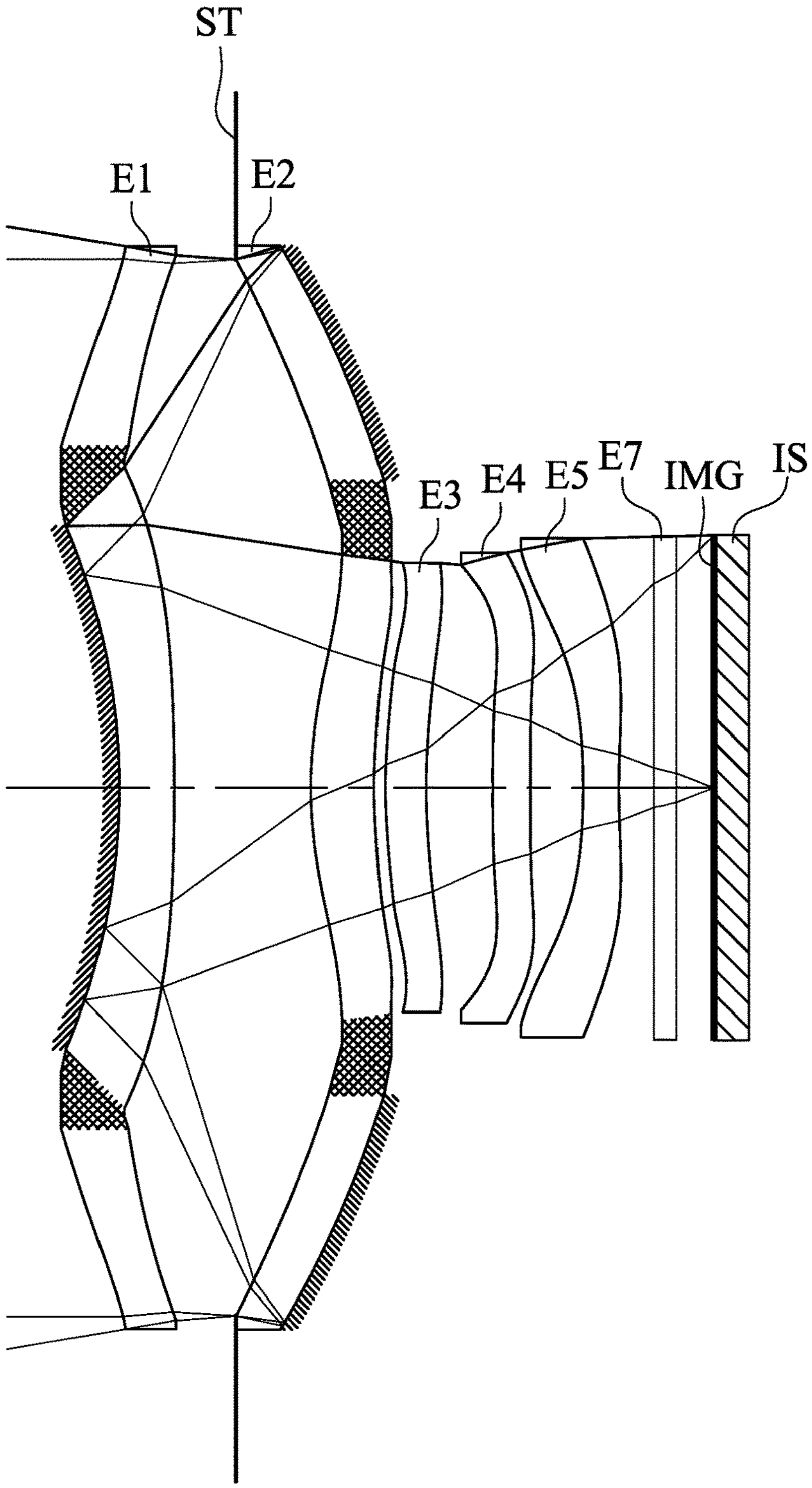
FIG. 5 is a schematic view of an imaging apparatus according to the 3rd embodiment of the present disclosure.
Figure 6:
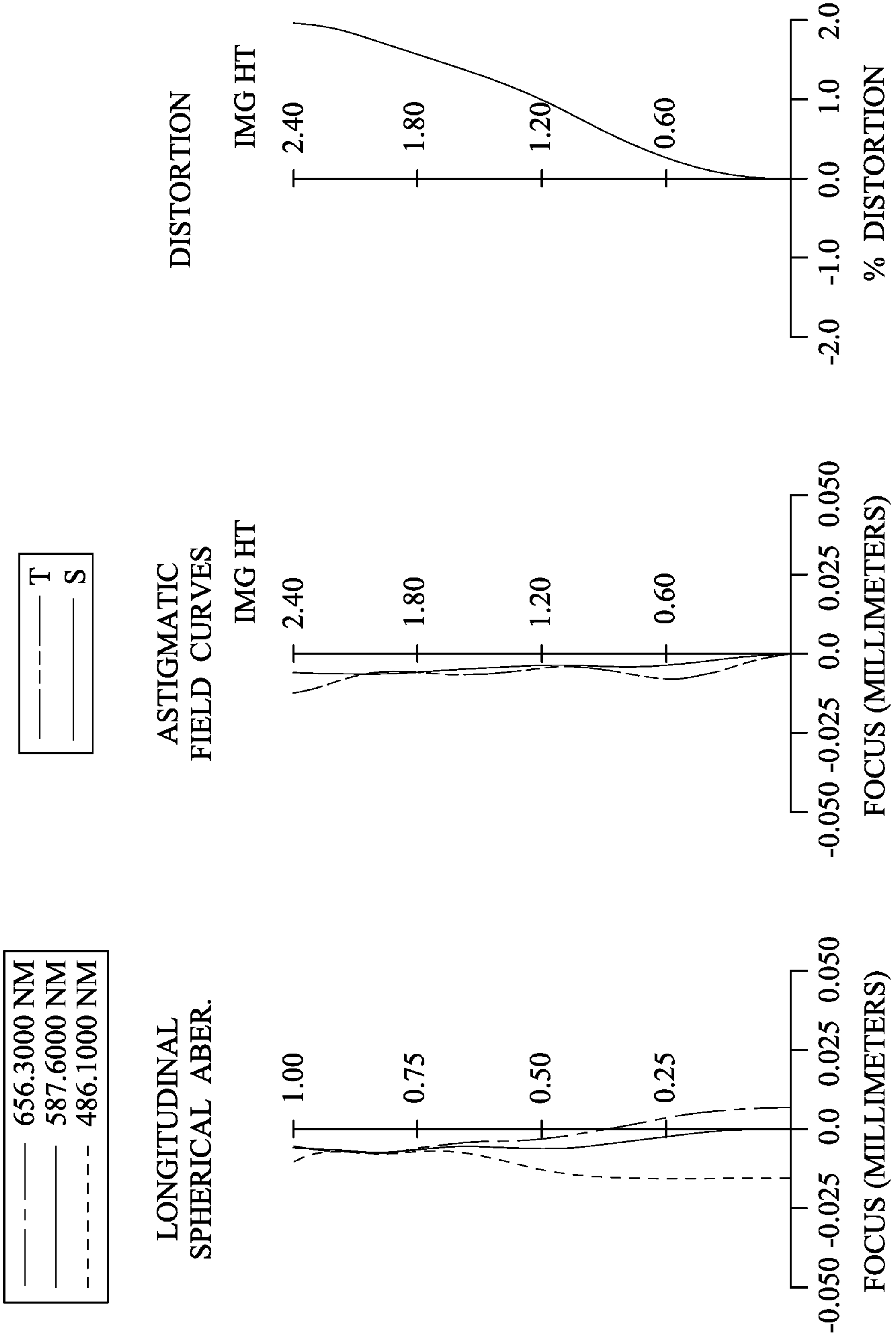
FIG. 6 shows, in order from left to right, spherical aberration curves, astigmatic field curves and a distortion curve of the imaging apparatus according to the 3rd embodiment.

FIG. 5 is a schematic view of an imaging apparatus 3 according to the 3rd embodiment of the present disclosure. FIG. 6 shows, in order from left to right, spherical aberration curves, astigmatic field curves and a distortion curve of the imaging apparatus 3 according to the 3rd embodiment. As shown in FIG. 5, the imaging apparatus 3 according to the 3rd embodiment includes an imaging system lens assembly (reference number is omitted) and an image sensor IS. The imaging system lens assembly includes, in order from an object side to an image side, a first lens element E1, an aperture stop ST, a second lens element E2, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with positive refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes one inflection point.

The fourth lens element E4 with positive refractive power has the object-side surface being convex in a paraxial region thereof and the image-side surface being convex in a paraxial region thereof. The fourth lens element E4 is made of a plastic material, and has the object-side surface and the image-side surface being both aspheric. Further, the object-side surface of the fourth lens element E4 includes two inflection points, and the image-side surface of the fourth lens element E4 includes three inflection points.

The fifth lens element E5 with negative refractive power has the object-side surface being concave in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes one inflection point, and the image-side surface of the fifth lens element E5 includes one inflection point.

The filter E7 is made of a glass material, which is located between the fifth lens element E5 and the image surface IMG in order, and will not affect the focal length of the imaging system lens assembly.

The detailed optical data of the 3rd embodiment are shown in Table 3A and the aspheric surface data are shown in Table 3B below.

TABLE 3A

| 3rd Embodiment<br>f = 14.00 mm, Fno = 1.80, HFOV = 9.6 deg. | | | | | | | | |
|---|---|---|---|---|---|---|---|---|
| Surface # | | Curvature Radius | Thickness | Material | Index | Abbe # | Refractive/ reflective Mode | Focal Length |
| 0 | Object | Plano | Infinity | | | | Refract | |
| 1 | Lens 1 peripheral area | 9.8400 ASP | 0.900 | Plastic | 1.545 | 56.1 | Refract | — |
| 2 | | 20.8505 ASP | 1.264 | | | | Refract | |
| 3 | Ape. Stop | Plano | 1.340 | | | | Refract | |
| 4 | Lens 2 peripheral area | −9.2957 ASP | 0.499 | Plastic | 1.566 | 37.4 | Refract | — |
| 5 | | −10.0144 ASP | −0.499 | Plastic | 1.566 | 37.4 | Reflect | — |
| 6 | | −9.2957 ASP | −1.927 | | | | Refract | |
| 7 | Lens 1 central area | −26.5554 ASP | −0.523 | Plastic | 1.545 | 56.1 | Refract | — |
| 8 | | −6.4899 ASP | 0.523 | Plastic | 1.545 | 56.1 | Reflect | — |
| 9 | | −26.5554 ASP | 1.300 | | | | Refract | |
| 10 | Lens 2 central area | 4.2110 ASP | 0.600 | Plastic | 1.566 | 37.4 | Refract | — |
| 11 | | 5.2768 ASP | 0.104 | | | | Refract | |
| 12 | Lens 3 | 4.6117 ASP | 0.390 | Plastic | 1.660 | 20.4 | Refract | 23.80 |
| 13 | | 6.3095 ASP | 0.633 | | | | Refract | |
| 14 | Lens 4 | 39.6713 ASP | 0.360 | Plastic | 1.660 | 20.4 | Refract | 34.18 |
| 15 | | −52.1021 ASP | 0.503 | | | | Refract | |
| 16 | Lens 5 | −7.3312 ASP | 0.340 | Plastic | 1.669 | 19.5 | Refract | −5.74 |
| 17 | | 8.2198 ASP | 0.333 | | | | Refract | |
| 18 | Filter | Plano | 0.210 | Glass | 1.517 | 64.2 | Refract | — |
| 19 | | Plano | 0.357 | | | | Refract | |
| 20 | Image | Plano | — | | | | | |

Reference wavelength is 587.6 nm (d-line).

TABLE 3B

| Aspheric Coefficients | | | | | |
|---|---|---|---|---|---|
| Surface # | 1 | 2 | 4 | 5 | 6 |
| k= | 8.440000E−01 | 9.903100E+00 | −4.411840E−01 | −2.232590E−01 | −4.411840E−01 |
| A4= | −4.551988E−04 | −3.080571E−04 | 1.435864E−04 | 3.141114E−05 | 1.435864E−04 |
| A6= | −1.489807E−05 | −1.144616E−05 | −1.362070E−05 | −4.346818E−06 | −1.362070E−05 |
| A8= | 6.054944E−07 | 1.470355E−06 | 1.427746E−06 | 2.851377E−07 | 1.427746E−06 |
| A10= | 1.137002E−08 | −2.103269E−08 | −5.824659E−08 | −9.682309E−09 | −5.824659E−08 |
| A12= | −9.165792E−10 | −2.977444E−10 | 8.738889E−10 | 9.636748E−11 | 8.738889E−10 |
| Surface # | 7 | 8 | 9 | 10 | 11 |
| k= | −9.900000E+01 | −1.398040E+00 | −9.900000E+01 | −1.000000E+00 | −5.934290E+01 |
| A4= | −5.424422E−03 | −7.976159E−04 | −5.424422E−03 | −9.502712E−03 | −3.283934E−02 |
| A6= | 3.941046E−04 | −3.214041E−05 | 3.941046E−04 | −8.826256E−04 | 3.672352E−02 |
| A8= | −4.989492E−05 | −5.749712E−06 | −4.989492E−05 | 1.263618E−03 | −1.256762E−02 |
| A10= | 4.268455E−06 | 2.648853E−06 | 4.268455E−06 | −8.049485E−04 | 1.308046E−03 |
| A12= | −1.676033E−07 | −2.103772E−07 | −1.676033E−07 | 1.748671E−04 | 4.643747E−05 |
| A14= | | | | −1.216534E−05 | −9.885732E−06 |
| Surface # | 12 | 13 | 14 | 15 | 16 |
| k= | −6.096840E+00 | −6.457310E+00 | 3.784130E+00 | 9.000000E+01 | 4.295750E+00 |
| A4= | −9.077186E−02 | −3.518035E−02 | 2.443098E−02 | 3.966318E−02 | −4.187985E−02 |
| A6= | 9.059308E−02 | 4.028764E−02 | −1.958540E−03 | −6.209025E−03 | 2.191331E−02 |
| A8= | −4.592863E−02 | −2.660064E−02 | −1.027143E−02 | −9.755956E−03 | −1.707715E−02 |
| A10= | 1.458408E−02 | 1.021851E−02 | 4.352538E−03 | 4.473472E−03 | 8.964402E−03 |
| A12= | −3.036034E−03 | −2.336273E−03 | −9.498723E−04 | −8.140276E−04 | −2.538180E−03 |

TABLE 3B-continued

| Aspheric Coefficients | | | | | |
|---|---|---|---|---|---|
| A14= | 3.615706E−04 | 2.875353E−04 | 1.317046E−04 | 5.506767E−05 | 3.946818E−04 |
| A16= | −1.798945E−05 | −1.444723E−05 | −1.141616E−05 | 1.762291E−06 | −3.174935E−05 |
| A18= | | | 5.149848E−07 | −2.784143E−07 | 1.026892E−06 |

| Surface # | 17 |
|---|---|
| k= | −5.303630E+01 |
| A4= | −4.947719E−02 |
| A6= | 1.930437E−02 |
| A8= | −1.133264E−02 |
| A10= | 4.908549E−03 |
| A12= | −1.228339E−03 |
| A14= | 1.744329E−04 |
| A16= | −1.315575E−05 |
| A18= | 4.081044E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters in Table 3C can be calculated from Table 3A and Table 3B as the following values and satisfy the following conditions:

TABLE 3C

| 3rd Embodiment | | | |
|---|---|---|---|
| f [mm] | 14.00 | YM1i [mm] | 2.93 |
| Fno | 1.80 | YM2 [mm] | 2.49 |
| HFOV [deg.] | 9.6 | YRL [mm] | 2.16 |
| TL/ImgH | 2.36 | YR1o/ImgH | 2.15 |
| TL/f | 0.40 | (YR1i − YRL)/T12 | 0.84 |
| ImgH/f | 0.17 | YM2/YRL | 1.15 |
| BL/ImgH | 0.38 | (YR1o − YR1i)/(YM1o − YM1i) | 0.85 |
| (R8 − R9)/(R8 + R9) | 1.38 | YR1o/YR1i | 1.59 |
| (RM2 + R11)/(RM2 − R11) | 0.17 | YM1o/YM1i | 1.76 |
| RM2/R9 | −1.54 | SagLNR1/CTN | −1.74 |
| CT1/TL | 0.09 | Vmin | 19.5 |
| (CT1 + CT2)/TL | 0.20 | V1/N1 | 36.31 |
| TRLI/ImgH | 1.35 | V2/N2 | 23.88 |
| YR1o [mm] | 5.15 | V3/N3 | 12.29 |
| YR1i [mm] | 3.25 | V4/N4 | 12.29 |
| YM1o [mm] | 5.15 | V5/N5 | 11.68 |

4th Embodiment

Figure 7:
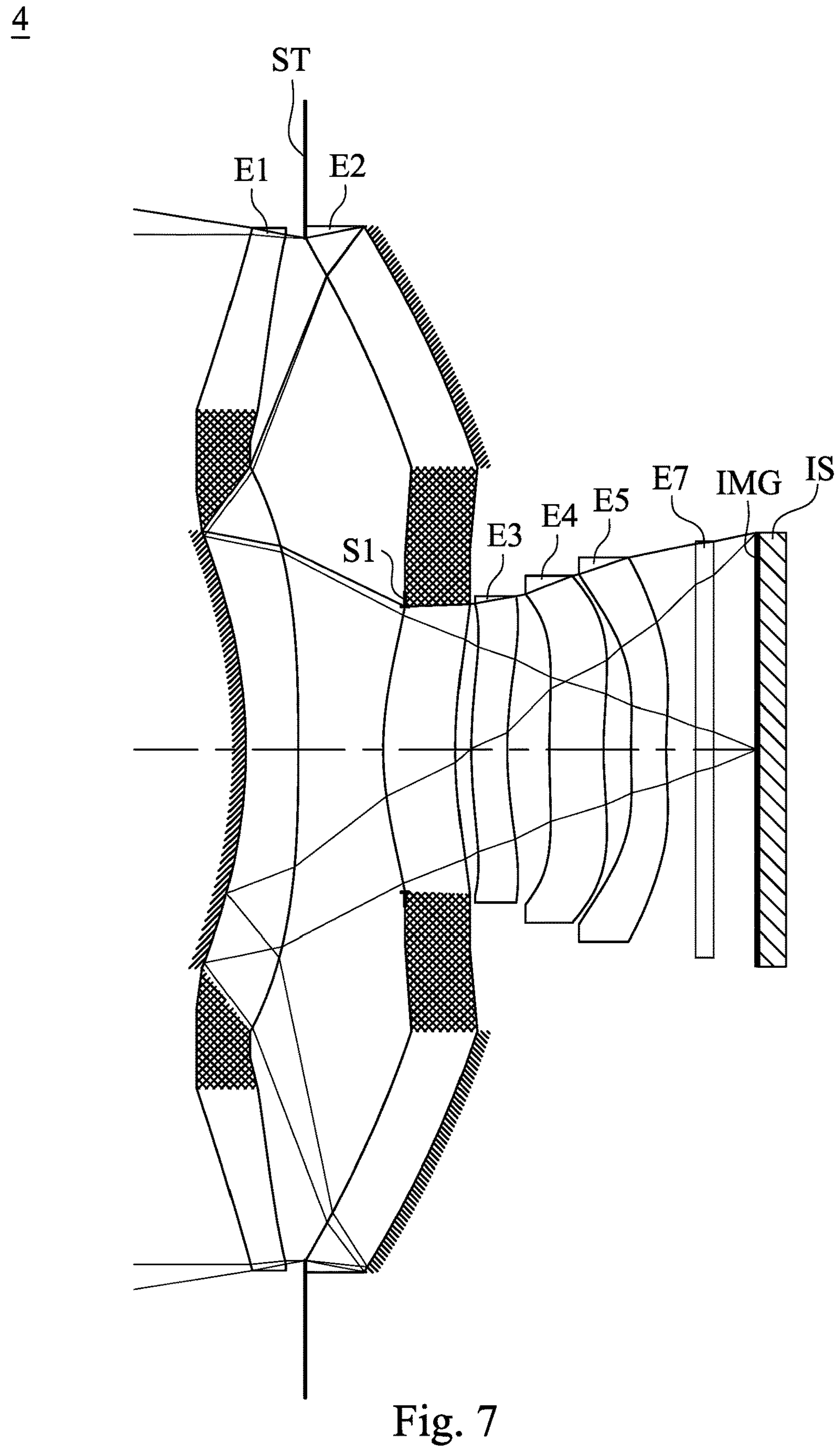
FIG. 7 is a schematic view of an imaging apparatus according to the 4th embodiment of the present disclosure.
Figure 8:
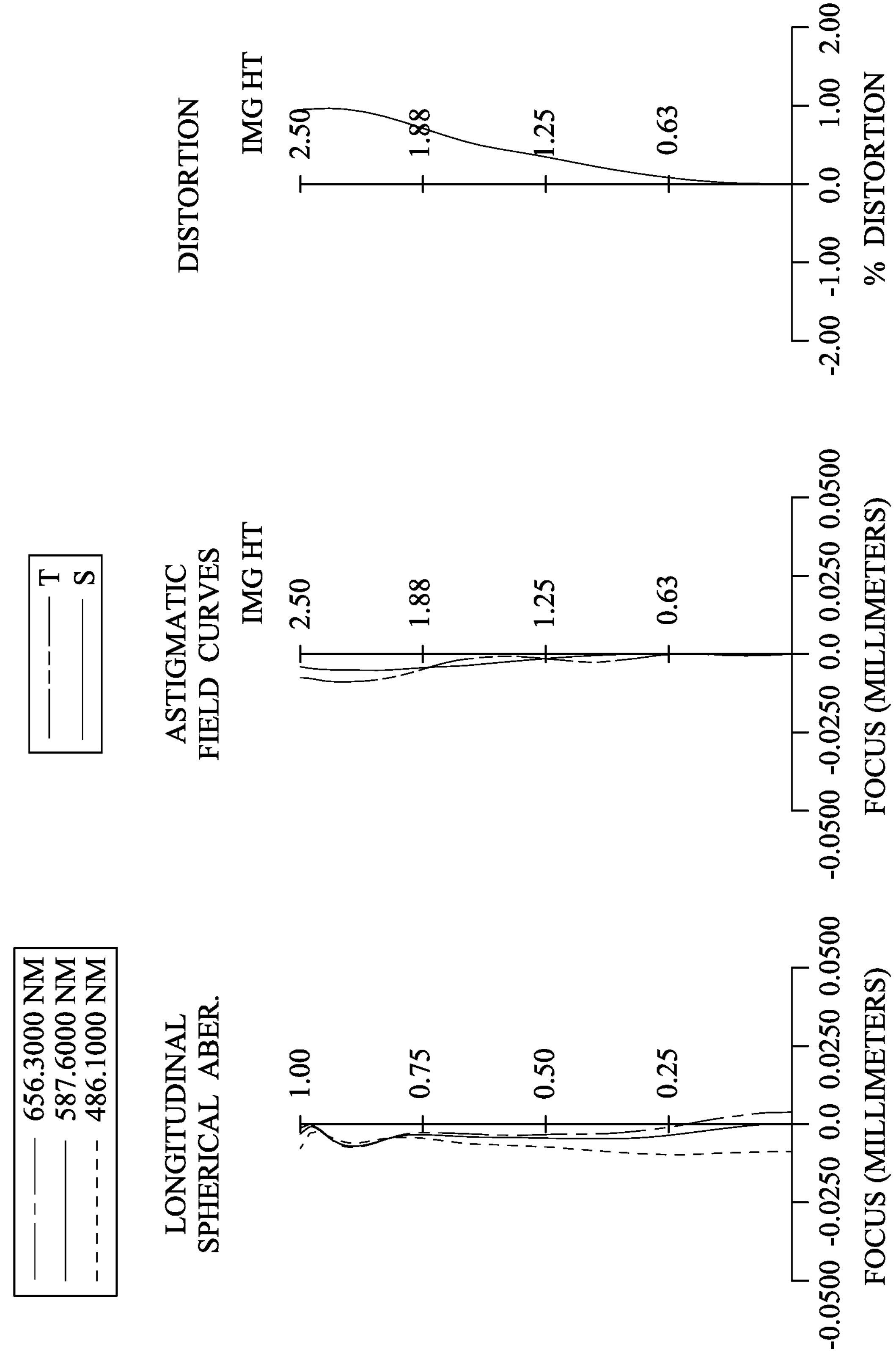
FIG. 8 shows, in order from left to right, spherical aberration curves, astigmatic field curves and a distortion curve of the imaging apparatus according to the 4th embodiment.

FIG. 7 is a schematic view of an imaging apparatus 4 according to the 4th embodiment of the present disclosure. FIG. 8 shows, in order from left to right, spherical aberration curves, astigmatic field curves and a distortion curve of the imaging apparatus 4 according to the 4th embodiment. As shown in FIG. 7, the imaging apparatus 4 according to the 4th embodiment includes an imaging system lens assembly (reference number is omitted) and an image sensor IS. The imaging system lens assembly includes, in order from an object side to an image side, a first lens element E1, an aperture stop ST, a stop S1, a second lens element E2, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with negative refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes one inflection point.

The fourth lens element E4 with negative refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes two inflection points, and the image-side surface of the fourth lens element E4 includes two inflection points.

The fifth lens element E5 with negative refractive power has the object-side surface being convex in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes two inflection points, and the image-side surface of the fifth lens element E5 includes one inflection point.

The filter E7 is made of a glass material, which is located between the fifth lens element E5 and the image surface IMG in order, and will not affect the focal length of the imaging system lens assembly.

The detailed optical data of the 4th embodiment are shown in Table 4A and the aspheric surface data are shown in Table 4B below.

TABLE 4A

| 4th Embodiment<br>f = 15.66 mm, Fno = 1.76, HFOV = 9.0 deg. | | | | | | | | |
|---|---|---|---|---|---|---|---|---|
| Surface # | | Curvature Radius | Thickness | Material | Index | Abbe # | Refractive/ reflective Mode | Focal Length |
| 0 | Object | Plano | Infinity | | | | Refract | |
| 1 | Lens 1 peripheral area | 9.9853 ASP | 1.062 | Plastic | 1.534 | 56.0 | Refract | — |
| 2 | | 19.0091 ASP | 0.900 | | | | Refract | |
| 3 | Ape. Stop | Plano | 1.773 | | | | Refract | |
| 4 | Lens 2 peripheral area | −9.6476 ASP | 0.729 | Plastic | 1.566 | 37.4 | Refract | — |
| 5 | | −10.1968 ASP | −0.729 | Plastic | 1.566 | 37.4 | Reflect | — |
| 6 | | −9.6476 ASP | −1.854 | | | | Refract | |
| 7 | Lens 1 central area | −42.2370 ASP | −0.605 | Plastic | 1.534 | 56.0 | Refract | — |
| 8 | | −6.1453 ASP | 0.605 | Plastic | 1.534 | 56.0 | Reflect | — |
| 9 | | −42.2370 ASP | 1.231 | | | | Refract | |
| 10 | Stop | Plano | −0.250 | | | | Refract | |
| 11 | Lens 2 central area | 3.8514 ASP | 0.832 | Plastic | 1.566 | 37.4 | Refract | — |
| 12 | | 6.2703 ASP | 0.180 | | | | Refract | |
| 13 | Lens 3 | 6.1425 ASP | 0.415 | Plastic | 1.669 | 19.5 | Refract | −37.91 |
| 14 | | 4.8110 ASP | 0.487 | | | | Refract | |
| 15 | Lens 4 | 10.7973 ASP | 0.625 | Plastic | 1.534 | 56.0 | Refract | −16.79 |
| 16 | | 4.8009 ASP | 0.318 | | | | Refract | |
| 17 | Lens 5 | 7.6923 ASP | 0.406 | Plastic | 1.544 | 56.0 | Refract | −28.76 |
| 18 | | 5.0613 ASP | 0.333 | | | | Refract | |
| 19 | Filter | Plano | 0.210 | Glass | 1.517 | 64.2 | Refract | — |
| 20 | | Plano | 0.502 | | | | Refract | |
| 21 | Image | Plano | — | | | | | |

Reference wavelength is 587.6 nm (d-line).
Effective radius of Surface 10 (stop S1) is 1.646 mm.

TABLE 4B

| Aspheric Coefficients | | | | | |
|---|---|---|---|---|---|
| Surface # | 1 | 2 | 4 | 5 | 6 |
| k= | 7.019970E−01 | −6.354680E−01 | −3.573190E−01 | −4.679780E−01 | −3.573190E−01 |
| A4= | −3.334239E−04 | −1.592018E−04 | −2.516448E−05 | −2.294957E−06 | −2.516448E−05 |
| A6= | −6.418359E−06 | −3.295425E−06 | 1.800573E−05 | 4.491609E−06 | 1.800573E−05 |
| A8= | −2.133521E−07 | −1.721417E−07 | −8.492954E−07 | −1.626866E−07 | −8.492954E−07 |
| A10= | 2.253042E−09 | 6.623327E−09 | 1.768944E−08 | 2.100409E−09 | 1.768944E−08 |
| A12= | 3.613945E−11 | −5.683649E−12 | −1.306668E−10 | −6.062798E−12 | −1.306668E−10 |
| Surface # | 7 | 8 | 9 | 11 | 12 |
| k= | −8.597320E+01 | −2.559830E+00 | −8.597320E+01 | −6.628270E−01 | −1.334910E+01 |
| A4= | −7.105898E−03 | −2.284223E−04 | −7.105898E−03 | −1.282839E−02 | 9.428903E−03 |
| A6= | 6.359563E−04 | −1.747771E−04 | 6.359563E−04 | −3.336753E−03 | −2.048903E−02 |
| A8= | −5.141145E−05 | 6.011972E−05 | −5.141145E−05 | 2.943200E−03 | 1.913233E−02 |
| A10= | 2.808652E−06 | −7.633660E−06 | 2.808652E−06 | −1.444578E−03 | −9.232502E−03 |
| A12= | −9.106823E−08 | 3.139242E−07 | −9.106823E−08 | 3.501030E−04 | 1.945640E−03 |
| A14= | | | | −2.957485E−05 | −1.274679E−04 |
| Surface # | 13 | 14 | 15 | 16 | 17 |
| k= | 1.715780E+00 | −4.349310E+01 | −8.005910E+01 | −7.735120E+01 | −9.900000E+01 |
| A4= | −8.996981E−03 | 3.582174E−02 | −3.497530E−02 | −2.767130E−02 | −1.748860E−01 |

TABLE 4B-continued

| Aspheric Coefficients | | | | | |
|---|---|---|---|---|---|
| A6= | −1.956233E−02 | −5.013119E−02 | 2.260303E−02 | 7.578798E−03 | 1.356857E−01 |
| A8= | 1.336867E−02 | 3.552170E−02 | −3.614358E−02 | −1.792594E−02 | −1.149984E−01 |
| A10= | −1.442728E−03 | −1.584715E−02 | 3.092401E−02 | 1.366150E−02 | 6.776797E−02 |
| A12= | −2.877642E−03 | 3.522929E−03 | −1.606291E−02 | −5.780749E−03 | −2.361466E−02 |
| A14= | 1.239999E−03 | −2.672864E−04 | 4.752551E−03 | 1.527291E−03 | 4.678394E−03 |
| A16= | −1.468778E−04 | −7.077977E−06 | −7.361465E−04 | −2.634616E−04 | −4.866068E−04 |
| A18= | | | 4.719156E−05 | 2.832884E−05 | 2.058482E−05 |
| A20= | | | | −1.412529E−06 | |

| Surface # | 18 |
|---|---|
| k= | 2.356810E+00 |
| A4= | −1.602417E−01 |
| A6= | 1.013752E−01 |
| A8= | −6.777891E−02 |
| A10= | 3.374021E−02 |
| A12= | −1.064338E−02 |
| A14= | 2.053883E−03 |
| A16= | −2.346526E−04 |
| A18= | 1.448913E−05 |
| A20= | −3.698464E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters in Table 4C can be calculated from Table 4A and Table 4B as the following values and satisfy the following conditions:

TABLE 4C

| 4th Embodiment | | | |
|---|---|---|---|
| f [mm] | 15.66 | YM1i [mm] | 3.25 |
| Fno | 1.76 | YM2 [mm] | 2.52 |
| HFOV [deg.] | 9.0 | YRL [mm] | 1.67 |
| TL/ImgH | 2.36 | YR1o/ImgH | 2.40 |
| TL/f | 0.38 | (YR1i − YRL)/T12 | 2.28 |
| ImgH/f | 0.16 | YM2/YRL | 1.51 |
| BL/ImgH | 0.42 | (YR1o − YR1i)/(YM1o − YM1i) | 0.75 |
| (R8 − R9)/(R8 + R9) | 1.20 | YR1o/YR1i | 1.54 |
| (RM2 + R11)/(RM2 − R11) | 0.00 | YM1o/YM1i | 1.86 |
| RM2/R9 | −1.60 | SagLNR1/CTN | −1.48 |
| CT1/TL | 0.10 | Vmin | 19.5 |
| (CT1 + CT2)/TL | 0.24 | V1/N1 | 36.51 |
| TRLI/ImgH | 1.39 | V2/N2 | 23.88 |
| YR1o [mm] | 6.01 | V3/N3 | 11.68 |
| YR1i [mm] | 3.91 | V4/N4 | 36.51 |
| YM1o [mm] | 6.03 | V5/N5 | 36.27 |

5th Embodiment

Figure 9:
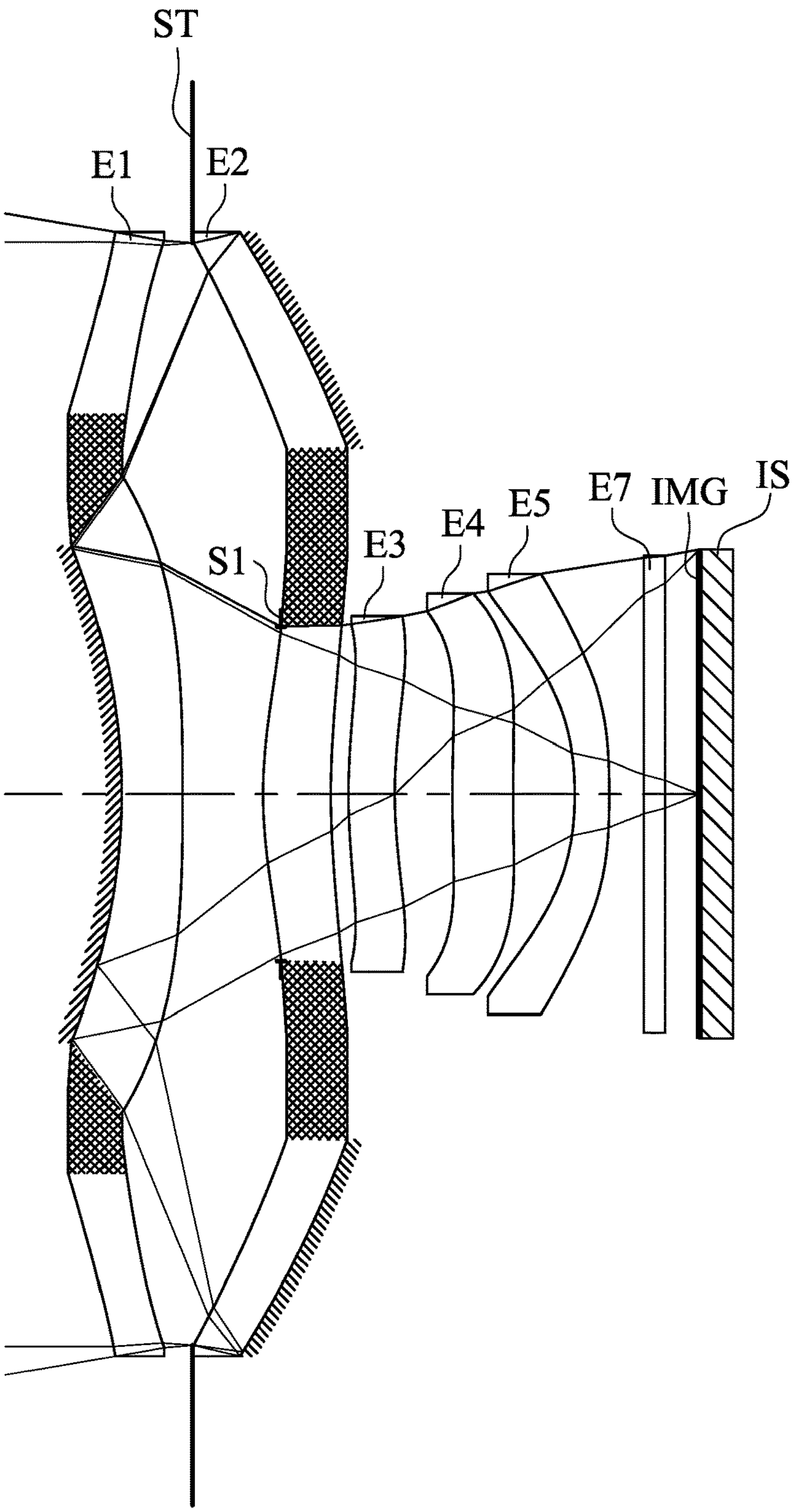
FIG. 9 is a schematic view of an imaging apparatus according to the 5th embodiment of the present disclosure.
Figure 10:
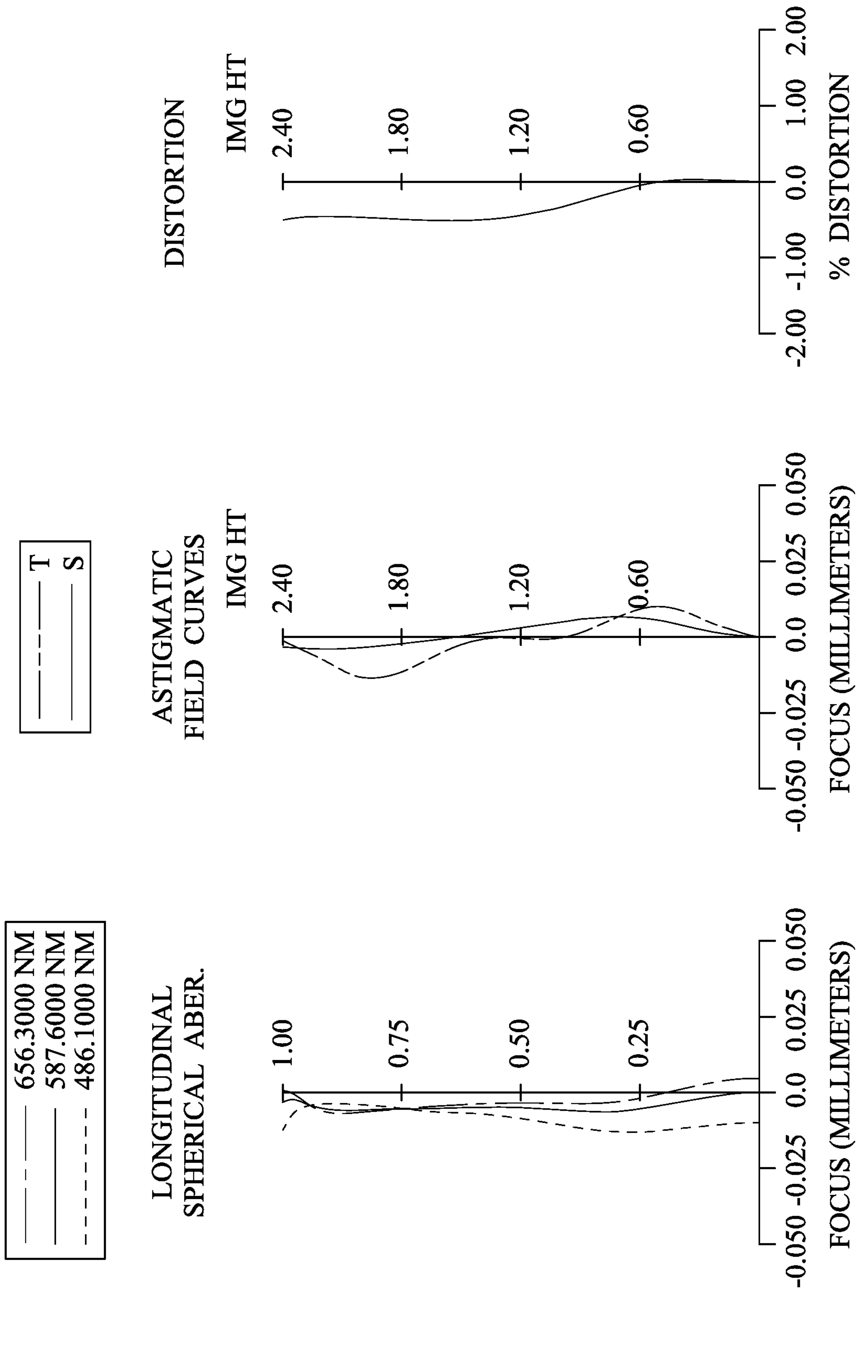
FIG. 10 shows, in order from left to right, spherical aberration curves, astigmatic field curves and a distortion curve of the imaging apparatus according to the 5th embodiment.

FIG. 9 is a schematic view of an imaging apparatus 5 according to the 5th embodiment of the present disclosure. FIG. 10 shows, in order from left to right, spherical aberration curves, astigmatic field curves and a distortion curve of the imaging apparatus 5 according to the 5th embodiment. As shown in FIG. 9, the imaging apparatus 5 according to the 5th embodiment includes an imaging system lens assembly (reference number is omitted) and an image sensor IS. The imaging system lens assembly includes, in order from an object side to an image side, a first lens element E1, an aperture stop ST, a stop S1, a second lens element E2, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with negative refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes one inflection point.

The fourth lens element E4 with positive refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes one inflection point, and the image-side surface of the fourth lens element E4 includes one inflection point.

The fifth lens element E5 with negative refractive power has the object-side surface being concave in a paraxial region thereof and the image-side surface being convex in a paraxial region thereof. The fifth lens element E5 is made of a plastic material, and has the object-side surface and the image-side surface being both aspheric. Further, the object-side surface of the fifth lens element E5 includes one inflection point.

The filter E7 is made of a glass material, which is located between the fifth lens element E5 and the image surface IMG in order, and will not affect the focal length of the imaging system lens assembly.

The detailed optical data of the 5th embodiment are shown in Table 5A and the aspheric surface data are shown in Table 5B below.

TABLE 5A

5th Embodiment
f = 14.34 mm, Fno = 1.81, HFOV = 9.6 deg.

| Surface # | | Curvature Radius | Thickness | Material | Index | Abbe # | Refractive/ reflective Mode | Focal Length |
|---|---|---|---|---|---|---|---|---|
| 0 | Object | Plano | Infinity | | | | Refract | |
| 1 | Lens 1 peripheral area | 10.5615 ASP | 0.900 | Plastic | 1.545 | 56.1 | Refract | — |
| 2 | | 25.1792 ASP | 0.930 | | | | Refract | |
| 3 | Ape. Stop | Plano | 1.541 | | | | Refract | |
| 4 | Lens 2 peripheral area | −9.2882 ASP | 0.601 | Plastic | 1.566 | 37.4 | Refract | — |
| 5 | | −9.5265 ASP | −0.601 | Plastic | 1.566 | 37.4 | Reflect | — |
| 6 | | −9.2882 ASP | −1.638 | | | | Refract | |
| 7 | Lens 1 central area | −38.3739 ASP | −0.600 | Plastic | 1.545 | 56.1 | Refract | — |
| 8 | | −6.0123 ASP | 0.600 | Plastic | 1.545 | 56.1 | Reflect | — |
| 9 | | −38.3739 ASP | 0.968 | | | | Refract | |
| 10 | Stop | Plano | −0.175 | | | | Refract | |
| 11 | Lens 2 central area | 4.6591 ASP | 0.668 | Plastic | 1.566 | 37.4 | Refract | — |
| 12 | | 9.4955 ASP | 0.172 | | | | Refract | |
| 13 | Lens 3 | 6.3890 ASP | 0.451 | Plastic | 1.660 | 20.4 | Refract | −38.09 |
| 14 | | 4.9512 ASP | 0.568 | | | | Refract | |
| 15 | Lens 4 | 13.1153 ASP | 0.600 | Plastic | 1.660 | 20.4 | Refract | 50.78 |
| 16 | | 21.1554 ASP | 0.606 | | | | Refract | |
| 17 | Lens 5 | −3.4315 ASP | 0.340 | Plastic | 1.669 | 19.5 | Refract | −7.78 |
| 18 | | −10.4781 ASP | 0.333 | | | | Refract | |
| 19 | Filter | Plano | 0.210 | Glass | 1.517 | 64.2 | Refract | — |
| 20 | | Plano | 0.340 | | | | Refract | |
| 21 | Image | Plano | — | | | | | |

Reference wavelength is 587.6 nm (d-line).
Effective radius of Surface 10 (stop S1) is 1.646 mm.

TABLE 5B

Aspheric Coefficients

| Surface # | 1 | 2 | 4 | 5 | 6 |
|---|---|---|---|---|---|
| k= | 8.734630E−01 | 9.292080E+00 | −5.195220E−01 | −4.061400E−01 | −5.195220E−01 |
| A4= | −3.188819E−04 | −3.578265E−05 | 3.161960E−05 | −1.539257E−05 | 3.161960E−05 |
| A6= | −9.423275E−06 | −2.927562E−06 | 1.620193E−05 | 4.612743E−06 | 1.620193E−05 |
| A8= | −1.607580E−07 | −1.336026E−07 | −8.876446E−07 | −1.760313E−07 | −8.876446E−07 |
| A10= | 4.323416E−10 | 9.741958E−09 | 1.889105E−08 | 1.524792E−09 | 1.889105E−08 |
| A12= | 7.516080E−11 | −6.729900E−11 | −1.056095E−10 | 1.764096E−11 | −1.056095E−10 |

| Surface # | 7 | 8 | 9 | 11 | 12 |
|---|---|---|---|---|---|
| k= | 8.998910E+01 | −2.190490E+00 | 8.998910E+01 | −1.000000E+00 | −7.736810E+01 |
| A4= | −7.643128E−03 | −5.434429E−04 | −7.643128E−03 | −1.428019E−02 | 1.312167E−02 |
| A6= | 6.585676E−04 | −1.854755E−04 | 6.585676E−04 | −3.490051E−03 | −2.073237E−02 |
| A8= | −5.558992E−05 | 7.869161E−05 | −5.558992E−05 | 3.001778E−03 | 1.876386E−02 |
| A10= | 3.238486E−06 | −1.094109E−05 | 3.238486E−06 | −1.407506E−03 | −9.070486E−03 |
| A12= | −1.193485E−07 | 5.121058E−07 | −1.193485E−07 | 3.501063E−04 | 1.945643E−03 |
| A14= | | | | −2.957478E−05 | −1.274678E−04 |

TABLE 5B-continued

| Aspheric Coefficients | | | | | |
|---|---|---|---|---|---|
| Surface # | 13 | 14 | 15 | 16 | 17 |
| k= | −1.859490E+01 | −4.741780E+01 | −9.616280E+01 | −2.840010E+01 | −6.309630E−01 |
| A4= | −5.846296E−03 | 2.774348E−02 | −2.094915E−02 | −2.544356E−02 | −1.127393E−01 |
| A6= | −1.469255E−02 | −4.647340E−02 | 9.386819E−03 | 5.668584E−03 | 1.206022E−01 |
| A8= | 1.085741E−02 | 3.456523E−02 | −3.004596E−02 | −1.660970E−02 | −1.124882E−01 |
| A10= | −1.043430E−03 | −1.572261E−02 | 3.002098E−02 | 1.344358E−02 | 6.757075E−02 |
| A12= | −2.877639E−03 | 3.522932E−03 | −1.606290E−02 | −5.780745E−03 | −2.361466E−02 |
| A14= | 1.239999E−03 | −2.672864E−04 | 4.752551E−03 | 1.527291E−03 | 4.678394E−03 |
| A16= | −1.468778E−04 | −7.077975E−06 | −7.361465E−04 | −2.634616E−04 | −4.866068E−04 |
| A18= | | | 4.719156E−05 | 2.832884E−05 | 2.058482E−05 |
| A20= | | | | −1.412529E−06 | |

| Surface # | 18 |
|---|---|
| k= | 5.527370E+00 |
| A4= | −1.133239E−01 |
| A6= | 9.275426E−02 |
| A8= | −6.679824E−02 |
| A10= | 3.371058E−02 |
| A12= | −1.064337E−02 |
| A14= | 2.053883E−03 |
| A16= | −2.346526E−04 |
| A18= | 1.448913E−05 |
| A20= | −3.698464E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters in Table 5C can be calculated from Table 5A and Table 5B as the following values and satisfy the following conditions:

TABLE 5C

| 5th Embodiment | | | |
|---|---|---|---|
| f [mm] | 14.34 | YM1i [mm] | 3.40 |
| Fno | 1.81 | YM2 [mm] | 2.44 |
| HFOV [deg.] | 9.6 | YRL [mm] | 1.66 |
| TL/ImgH | 2.37 | YR1o/ImgH | 2.30 |
| TL/f | 0.40 | (YR1i − YRL)/T12 | 2.61 |
| ImgH/f | 0.17 | YM2/YRL | 1.47 |
| BL/ImgH | 0.37 | (YR1o − YR1i)/(YM1o − YM1i) | 0.85 |
| (R8 − R9)/(R8 + R9) | 1.28 | YR1o/YR1i | 1.48 |
| (RM2 + R11)/(RM2 − R11) | −0.03 | YM1o/YM1i | 1.63 |
| RM2/R9 | −1.29 | SagLNR1/CTN | −2.52 |
| CT1/TL | 0.11 | Vmin | 19.5 |
| (CT1 + CT2)/TL | 0.22 | V1/N1 | 36.31 |
| TRLI/ImgH | 1.51 | V2/N2 | 23.88 |
| YR1o [mm] | 5.53 | V3/N3 | 12.29 |
| YR1i [mm] | 3.73 | V4/N4 | 12.29 |
| YM1o [mm] | 5.53 | V5/N5 | 11.68 |

6th Embodiment

Figure 11:
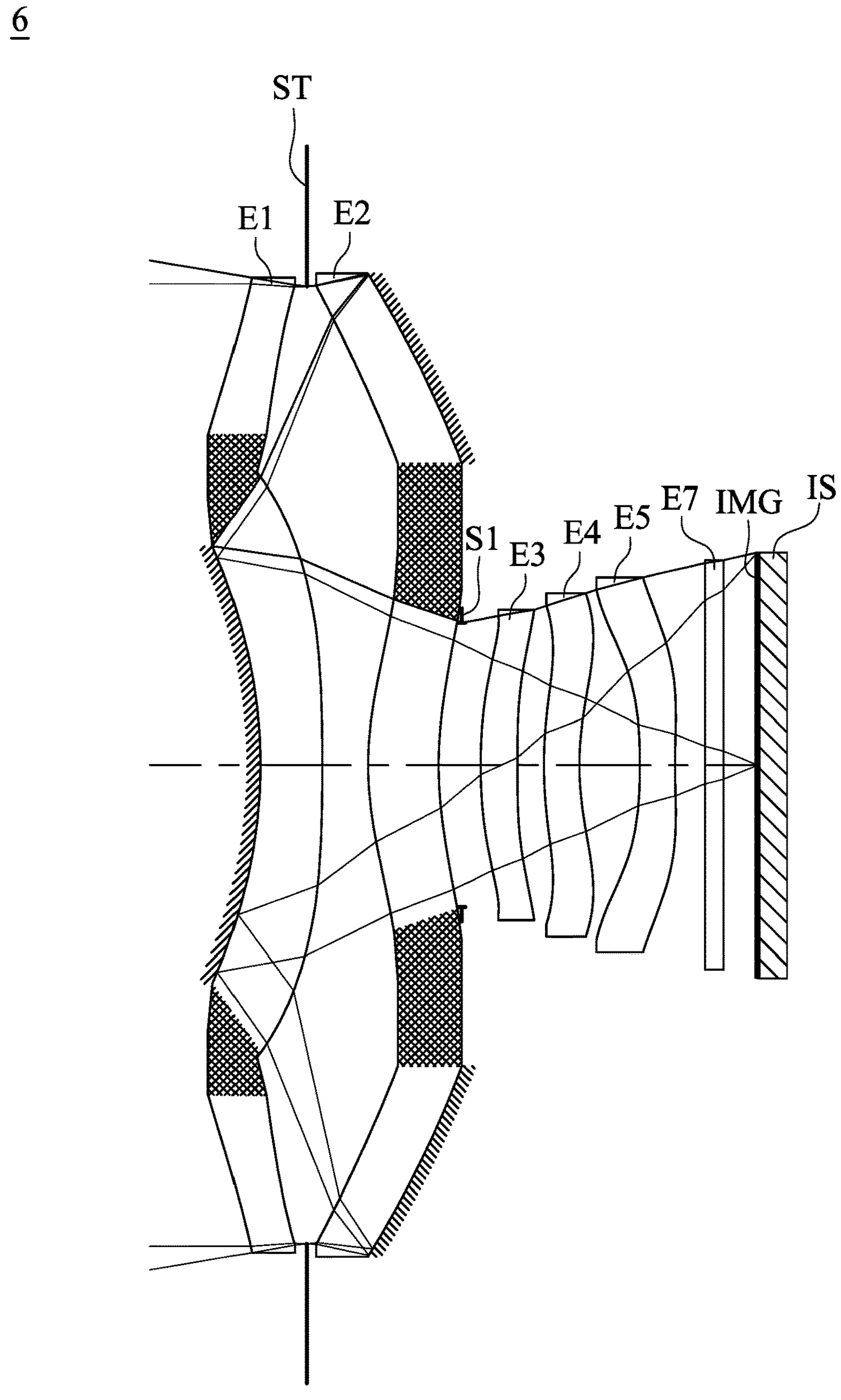
FIG. 11 is a schematic view of an imaging apparatus according to the 6th embodiment of the present disclosure.
Figure 12:
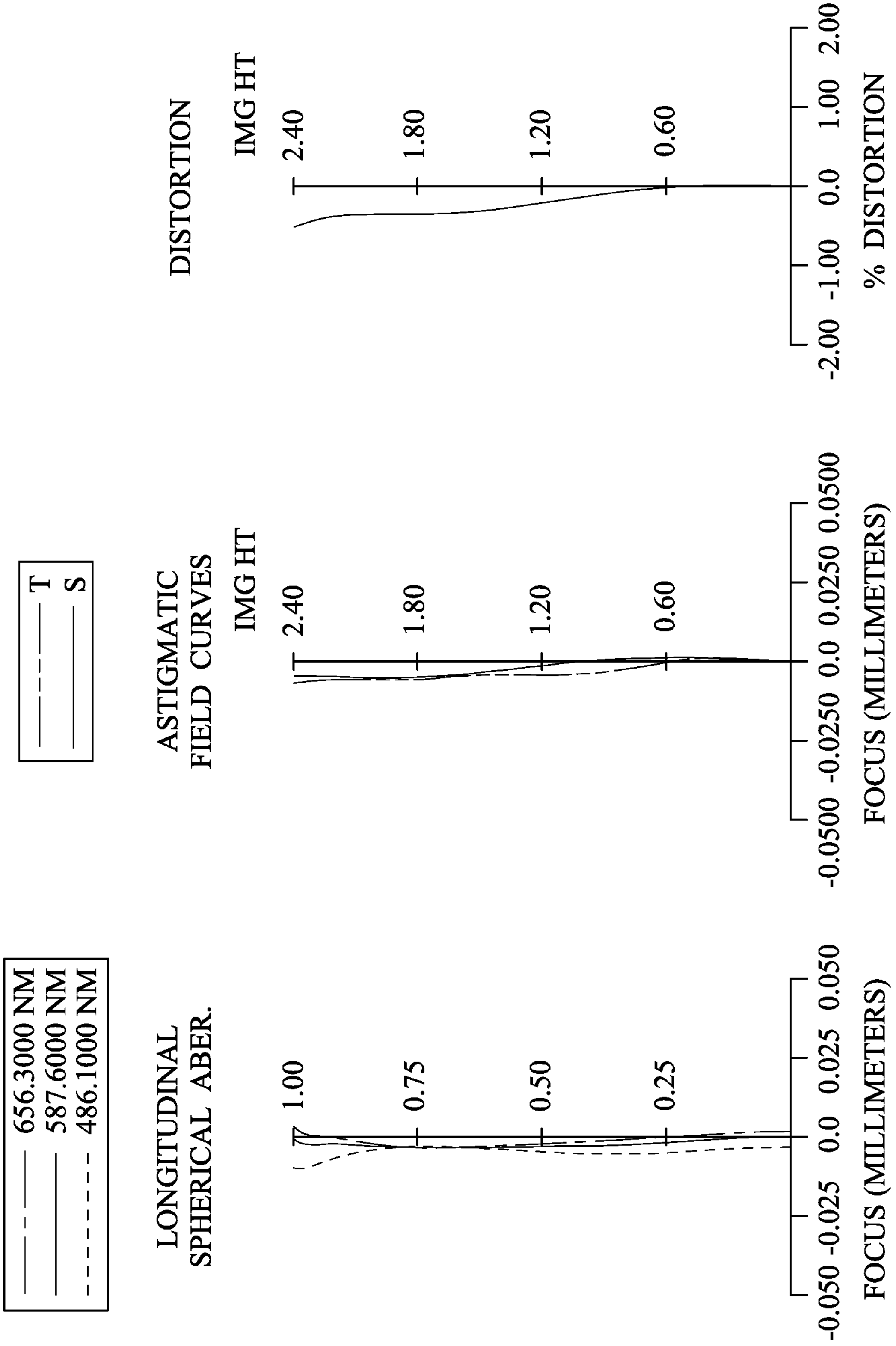
FIG. 12 shows, in order from left to right, spherical aberration curves, astigmatic field curves and a distortion curve of the imaging apparatus according to the 6th embodiment.

FIG. 11 is a schematic view of an imaging apparatus 6 according to the 6th embodiment of the present disclosure. FIG. 12 shows, in order from left to right, spherical aberration curves, astigmatic field curves and a distortion curve of the imaging apparatus 6 according to the 6th embodiment. As shown in FIG. 11, the imaging apparatus 6 according to the 6th embodiment includes an imaging system lens assembly (reference number is omitted) and an image sensor IS. The imaging system lens assembly includes, in order from an object side to an image side, a first lens element E1, an aperture stop ST, a second lens element E2, a stop S1, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with positive refractive power has the object-side surface being convex in a paraxial region thereof and the image-side surface being convex in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes two inflection points.

The fourth lens element E4 with negative refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes one inflection point, and the image-side surface of the fourth lens element E4 includes one inflection point.

The fifth lens element E5 with negative refractive power has the object-side surface being concave in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes one inflection point, and the image-side surface of the fifth lens element E5 includes two inflection points.

The filter E7 is made of a glass material, which is located between the fifth lens element E5 and the image surface IMG in order, and will not affect the focal length of the imaging system lens assembly.

The detailed optical data of the 6th embodiment are shown in Table 6A and the aspheric surface data are shown in Table 6B below.

TABLE 6A

6th Embodiment
f = 14.34 mm, Fno = 1.82, HFOV = 9.6 deg.

| Surface # | | Curvature Radius | Thickness | Material | Index | Abbe # | Refractive/ reflective Mode | Focal Length |
|---|---|---|---|---|---|---|---|---|
| 0 | Object | Plano | Infinity | | | | Refract | |
| 1 | Lens 1 peripheral area | 9.8900 ASP | 1.000 | Plastic | 1.545 | 56.1 | Refract | — |
| 2 | | 20.5765 ASP | 0.759 | | | | Refract | |
| 3 | Ape. Stop | Plano | 1.686 | | | | Refract | |
| 4 | Lens 2 peripheral area | −8.6270 ASP | 0.695 | Plastic | 1.534 | 56.0 | Refract | — |
| 5 | | −9.3009 ASP | −0.695 | Plastic | 1.534 | 56.0 | Reflect | — |
| 6 | | −8.6270 ASP | −1.509 | | | | Refract | |
| 7 | Lens 1 central area | −32.8469 ASP | −0.700 | Plastic | 1.545 | 56.1 | Refract | — |
| 8 | | −5.6804 ASP | 0.700 | Plastic | 1.545 | 56.1 | Reflect | — |
| 9 | | −32.8469 ASP | 0.517 | | | | Refract | |
| 10 | Stop | 3.6989 ASP | 0.800 | Plastic | 1.534 | 56.0 | Refract | |
| 11 | Lens 2 central area | 4.8873 ASP | 0.261 | | | | Refract | — |
| 12 | | Plano | 0.208 | | | | Refract | |
| 13 | Lens 3 | 7.2244 ASP | 0.417 | Plastic | 1.566 | 37.4 | Refract | 11.80 |
| 14 | | −87.1500 ASP | 0.300 | | | | Refract | |
| 15 | Lens 4 | 5.7468 ASP | 0.400 | Plastic | 1.669 | 19.5 | Refract | −13.12 |
| 16 | | 3.3762 ASP | 0.684 | | | | Refract | |
| 17 | Lens 5 | −10.2384 ASP | 0.399 | Plastic | 1.544 | 56.0 | Refract | −7.93 |
| 18 | | 7.5627 ASP | 0.333 | | | | Refract | |
| 19 | Filter | Plano | 0.210 | Glass | 1.517 | 64.2 | Refract | — |
| 20 | | Plano | 0.385 | | | | Refract | |
| 21 | Image | Plano | — | | | | | |

Reference wavelength is 587.6 nm (d-line).
Effective radius of Surface 12 (stop S1) is 1.605 mm.

TABLE 6B

Aspheric Coefficients

| Surface # | 1 | 2 | 4 | 5 | 6 |
|---|---|---|---|---|---|
| k= | 9.097050E−01 | 2.761110E+00 | −7.491590E−01 | −5.310580E−01 | −7.491590E−01 |
| A4= | −2.861180E−04 | −6.892739E−06 | 2.791688E−04 | 5.146344E−05 | 2.791688E−04 |
| A6= | −2.548284E−05 | −3.016848E−05 | −2.244378E−05 | −2.255324E−06 | −2.244378E−05 |
| A8= | 2.869007E−07 | 1.026144E−06 | 1.440351E−06 | 1.375617E−07 | 1.440351E−06 |
| A10= | 7.420410E−09 | −1.419073E−09 | −3.508187E−08 | −2.243461E−09 | −3.508187E−08 |
| A12= | −2.456708E−10 | −1.633993E−10 | 2.899447E−10 | −2.666610E−12 | 2.899447E−10 |

| Surface # | 7 | 8 | 9 | 10 | 11 |
|---|---|---|---|---|---|
| k= | 1.344110E+01 | −1.833930E+00 | 1.344110E+01 | −1.000000E+00 | 0.000000E+00 |
| A4= | −8.341291E−03 | −8.268273E−04 | −8.341291E−03 | −1.622838E−02 | 2.459304E−03 |
| A6= | 8.294829E−04 | −1.137530E−04 | 8.294829E−04 | −2.419419E−03 | −1.620971E−02 |

TABLE 6B-continued

| Aspheric Coefficients | | | | | |
|---|---|---|---|---|---|
| A8= | −7.872179E−05 | 5.777691E−05 | −7.872179E−05 | 2.072705E−03 | 7.228867E−03 |
| A10= | 4.406938E−06 | −7.735494E−06 | 4.406938E−06 | −6.435382E−04 | −2.820108E−04 |
| A12= | −1.305087E−07 | 3.506510E−07 | −1.305087E−07 | 1.006095E−04 | −7.937719E−04 |
| A14= | | | | −5.995469E−06 | 2.550387E−04 |
| A16= | | | | | −2.575676E−05 |
| Surface # | 13 | 14 | 15 | 16 | 17 |
| k= | 4.283130E+00 | 0.000000E+00 | 0.000000E+00 | 1.574460E−01 | 7.689200E−02 |
| A4= | 5.766093E−02 | 1.198131E−01 | 3.481386E−02 | −2.552381E−02 | −1.174257E−01 |
| A6= | −4.884182E−02 | −9.760245E−02 | −6.702590E−02 | −1.264824E−02 | 7.037878E−02 |
| A8= | 1.637536E−02 | 4.814122E−02 | 4.169009E−02 | 3.950964E−03 | −3.240699E−02 |
| A10= | −9.226365E−04 | −1.657277E−02 | −2.147817E−02 | −4.308209E−04 | 1.214230E−02 |
| A12= | −1.004514E−03 | 5.296705E−03 | 9.069229E−03 | 8.540299E−05 | −3.364486E−03 |
| A14= | 2.338880E−04 | −1.577961E−03 | −2.652157E−03 | −9.027860E−05 | 7.113429E−04 |
| A16= | −1.822532E−05 | 2.912109E−04 | 4.478766E−04 | 3.059682E−05 | −1.112794E−04 |
| A18= | | −2.206705E−05 | −3.213993E−05 | −3.615714E−06 | 1.092547E−05 |
| A20= | | | | 9.676856E−08 | −4.799312E−07 |

| Surface # | 18 |
|---|---|
| k= | 0.000000E+00 |
| A4= | −1.307005E−01 |
| A6= | 7.363577E−02 |
| A8= | −3.995068E−02 |
| A10= | 1.812297E−02 |
| A12= | −6.071429E−03 |
| A14= | 1.420396E−03 |
| A16= | −2.151835E−04 |
| A18= | 1.859001E−05 |
| A20= | −6.856148E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters in Table 6C can be calculated from Table 6A and Table 6B as the following values and satisfy the following conditions:

TABLE 6C

| 6th Embodiment | | | |
|---|---|---|---|
| f [mm] | 14.34 | YM1i [mm] | 3.40 |
| Fno | 1.82 | YM2 [mm] | 2.47 |
| HFOV [deg.] | 9.6 | YRL [mm] | 1.63 |
| TL/ImgH | 2.34 | YR1o/ImgH | 2.29 |
| TL/f | 0.39 | (YR1i − YRL)/T12 | 4.07 |
| ImgH/f | 0.17 | YM2/YRL | 1.52 |
| BL/ImgH | 0.39 | (YR1o − YR1i)/(YM1o − YM1i) | 0.82 |
| (R8 − R9)/(R8 + R9) | 1.25 | YR1o/YR1i | 1.48 |
| (RM2 + R11)/(RM2 − R11) | −0.12 | YM1o/YM1i | 1.63 |
| RM2/R9 | −1.54 | SagLNR1/CTN | −1.23 |
| CT1/TL | 0.12 | Vmin | 19.5 |
| (CT1 + CT2)/TL | 0.27 | V1/N1 | 36.31 |
| TRLI/ImgH | 1.50 | V2/N2 | 36.51 |
| YR1o [mm] | 5.50 | V3/N3 | 23.88 |
| YR1i [mm] | 3.73 | V4/N4 | 11.68 |
| YM1o [mm] | 5.55 | V5/N5 | 36.27 |

7th Embodiment

Figure 13:
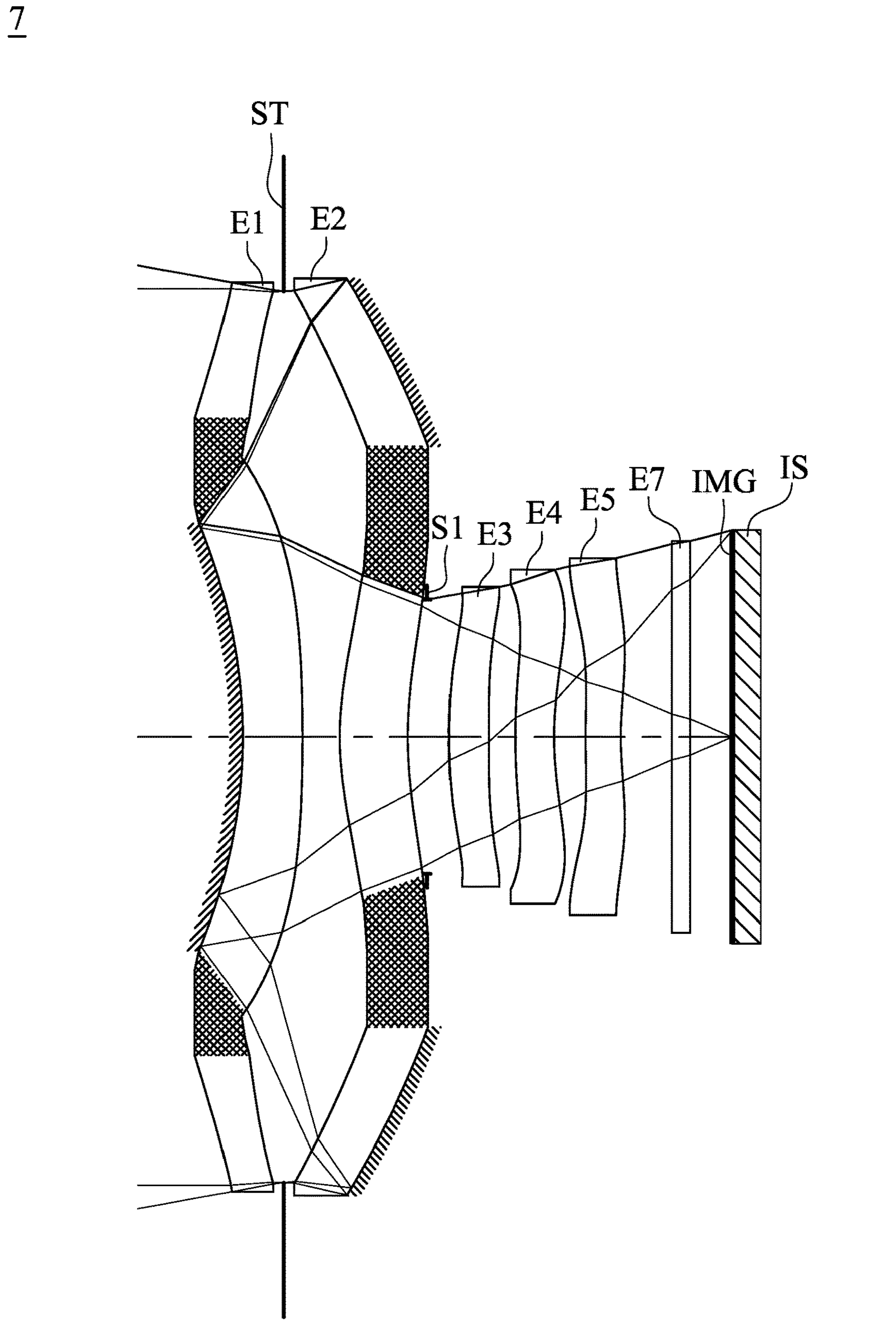
FIG. 13 is a schematic view of an imaging apparatus according to the 7th embodiment of the present disclosure.
Figure 14:
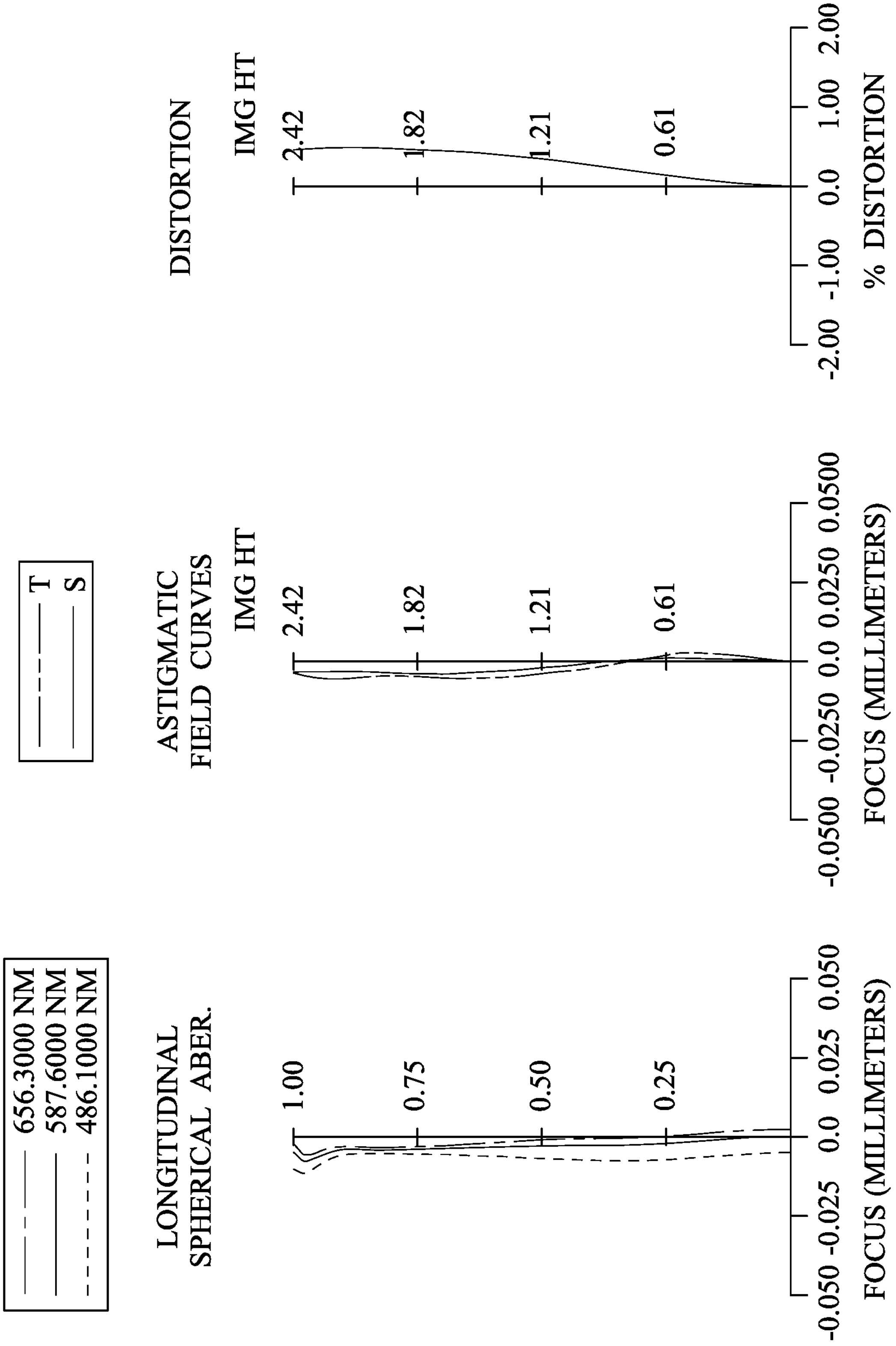
FIG. 14 shows, in order from left to right, spherical aberration curves, astigmatic field curves and a distortion curve of the imaging apparatus according to the 7th embodiment.

FIG. 13 is a schematic view of an imaging apparatus 7 according to the 7th embodiment of the present disclosure. FIG. 14 shows, in order from left to right, spherical aberration curves, astigmatic field curves and a distortion curve of the imaging apparatus 7 according to the 7th embodiment. As shown in FIG. 13, the imaging apparatus 7 according to the 7th embodiment includes an imaging system lens assembly (reference number is omitted) and an image sensor IS. The imaging system lens assembly includes, in order from an object side to an image side, a first lens element E1, an aperture stop ST, a second lens element E2, a stop S1, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with positive refractive power has the object-side surface being convex in a paraxial region thereof and the image-side surface being convex in a paraxial region thereof. The third lens element E3 is made of a plastic material, and has the object-side surface and the image-side surface being both aspheric. Further, the object-side surface of the third lens lens element E3 includes two inflection points.

The fourth lens element E4 with negative refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes one inflection point, and the image-side surface of the fourth lens element E4 includes one inflection point.

The fifth lens element E5 with negative refractive power has the object-side surface being convex in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes two inflection points, and the image-side surface of the fifth lens element E5 includes two inflection points.

The filter E7 is made of a glass material, which is located between the fifth lens element E5 and the image surface IMG in order, and will not affect the focal length of the imaging system lens assembly.

The detailed optical data of the 7th embodiment are shown in Table 7A and the aspheric surface data are shown in Table 7B below.

TABLE 7A

| 7th Embodiment<br>f = 13.33 mm, Fno = 1.81, HFOV = 10.2 deg. | | | | | | | | |
|---|---|---|---|---|---|---|---|---|
| Surface # | | Curvature Radius | Thickness | Material | Index | Abbe # | Refractive/ reflective Mode | Focal Length |
| 0 | Object | Plano | Infinity | | | | | |
| 1 | Lens 1 peripheral area | 9.6733 ASP | 1.000 | Plastic | 1.544 | 56.0 | Refract | — |
| 2 | | 20.8883 ASP | 0.697 | | | | Refract | |
| 3 | Ape. Stop | Plano | 1.631 | | | | Refract | |
| 4 | Lens 2 peripheral area | −8.5358 ASP | 0.682 | Plastic | 1.535 | 55.9 | Refract | — |
| 5 | | −9.3680 ASP | −0.682 | Plastic | 1.535 | 55.9 | Reflect | — |
| 6 | | −8.5358 ASP | −1.411 | | | | Refract | |
| 7 | Lens 1 central area | −27.3150 ASP | −0.700 | Plastic | 1.544 | 56.0 | Refract | — |
| 8 | | −6.1807 ASP | 0.700 | Plastic | 1.544 | 56.0 | Reflect | — |
| 9 | | −27.3150 ASP | 0.437 | | | | Refract | |
| 10 | Lens 2 central area | 3.8464 ASP | 0.800 | Plastic | 1.535 | 55.9 | Refract | |
| 11 | | 5.2145 ASP | 0.227 | | | | Refract | — |
| 12 | Stop | Plano | 0.253 | | | | Refract | |
| 13 | Lens 3 | 8.8192 ASP | 0.468 | Plastic | 1.587 | 28.3 | Refract | 11.81 |
| 14 | | −31.8471 ASP | 0.311 | | | | Refract | |
| 15 | Lens 4 | 10.6954 ASP | 0.454 | Plastic | 1.669 | 19.5 | Refract | −11.40 |
| 16 | | 4.3753 ASP | 0.370 | | | | Refract | |
| 17 | Lens 5 | 8.7368 ASP | 0.413 | Plastic | 1.534 | 56.0 | Refract | −13.26 |
| 18 | | 3.8477 ASP | 0.600 | | | | Refract | |
| 19 | Filter | Plano | 0.210 | Glass | 1.517 | 64.2 | Refract | — |
| 20 | | Plano | 0.496 | | | | Refract | |
| 21 | Image | Plano | — | | | | | |

Reference wavelength is 587.6 nm (d-line).
Effective radius of Surface 12 (stop S1) is 1.608 mm.

TABLE 7B

| Aspheric Coefficients | | | | | |
|---|---|---|---|---|---|
| Surface # | 1 | 2 | 4 | 5 | 6 |
| k= | 7.021190E−01 | 1.502760E+00 | −8.498910E−01 | −5.822780E−01 | −8.498910E−01 |
| A4= | −3.011116E−04 | −4.189654E−05 | 3.051910E−04 | 6.506101E−05 | 3.051910E−04 |
| A6= | −2.590709E−05 | −2.883205E−05 | −2.240532E−05 | −2.451362E−06 | −2.240532E−05 |
| A8= | 3.079741E−07 | 1.042156E−06 | 1.414393E−06 | 1.158169E−07 | 1.414393E−06 |

TABLE 7B-continued

| Aspheric Coefficients | | | | | |
|---|---|---|---|---|---|
| A10= | 6.715640E−09 | 2.067710E−09 | −3.709440E−08 | −2.526211E−09 | −3.709440E−08 |
| A12= | −2.434801E−10 | −2.401363E−10 | 2.945695E−10 | −2.666610E−12 | 2.945695E−10 |
| Surface # | 7 | 8 | 9 | 10 | 11 |
| k= | −5.441480E+01 | −2.409100E+00 | −5.441480E+01 | −2.041620E+00 | −5.065170E+00 |
| A4= | −8.230004E−03 | −6.363354E−04 | −8.230004E−03 | −1.729220E−02 | 3.160368E−03 |
| A6= | 8.086766E−04 | −1.624288E−04 | 8.086766E−04 | −2.920649E−03 | −1.680394E−02 |
| A8= | −7.834416E−05 | 5.321007E−05 | −7.834416E−05 | 2.626381E−03 | 7.671835E−03 |
| A10= | 4.670877E−06 | −6.728610E−06 | 4.670877E−06 | −7.004488E−04 | −3.141574E−04 |
| A12= | −1.504614E−07 | 2.878059E−07 | −1.504614E−07 | 1.006088E−04 | −7.937720E−04 |
| A14= | | | | −5.995473E−06 | 2.550386E−04 |
| A16= | | | | | −2.575676E−05 |
| Surface # | 13 | 14 | 15 | 16 | 17 |
| k= | 1.883980E+01 | 9.000000E+01 | 2.581840E+01 | 2.672040E+00 | −1.394270E+01 |
| A4= | 4.088513E−02 | 9.846544E−02 | 4.577171E−02 | −1.328916E−02 | −1.232080E−01 |
| A6= | −3.867481E−02 | −8.385740E−02 | −7.576417E−02 | −1.771469E−02 | 7.226969E−02 |
| A8= | 1.346717E−02 | 4.540662E−02 | 4.590002E−02 | 5.376385E−03 | −3.301044E−02 |
| A10= | −6.665540E−04 | −1.651201E−02 | −2.227098E−02 | −6.733409E−04 | 1.217574E−02 |
| A12= | −1.004515E−03 | 5.296706E−03 | 9.069226E−03 | 8.540979E−05 | −3.364496E−03 |
| A14= | 2.338880E−04 | −1.577961E−03 | −2.652157E−03 | −9.027859E−05 | 7.113429E−04 |
| A16= | −1.822532E−05 | 2.912109E−04 | 4.478766E−04 | 3.059682E−05 | −1.112794E−04 |
| A18= | | −2.206705E−05 | −3.213993E−05 | −3.615714E−06 | 1.092547E−05 |
| A20= | | | | 9.676856E−08 | −4.799312E−07 |

| Surface # | 18 |
|---|---|
| k= | −5.229990E+00 |
| A4= | −1.195753E−01 |
| A6= | 7.206671E−02 |
| A8= | −3.973798E−02 |
| A10= | 1.811042E−02 |
| A12= | −6.071413E−03 |
| A14= | 1.420396E−03 |
| A16= | −2.151835E−04 |
| A18= | 1.859001E−05 |
| A20= | −6.856148E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters in Table 7C can be calculated from Table 7A and Table 7B as the following values and satisfy the following conditions:

TABLE 7C

| 7th Embodiment | | | |
|---|---|---|---|
| f [mm] | 13.33 | YM1i [mm] | 3.40 |
| Fno | 1.81 | YM2 [mm] | 2.50 |
| HFOV [deg.] | 10.2 | YRL [mm] | 1.63 |
| TL/ImgH | 2.37 | YR1o/ImgH | 2.20 |
| TL/f | 0.43 | (YR1i − YRL)/T12 | 4.80 |
| ImgH/f | 0.18 | YM2/YRL | 1.53 |
| BL/ImgH | 0.54 | (YR1o − YR1i)/(YM1o − YM1i) | 0.81 |
| (R8 − R9)/(R8 + R9) | 1.33 | YR1o/YR1i | 1.43 |
| (RM2 + R11)/(RM2 − R11) | −0.18 | YM1o/YM1i | 1.58 |
| RM2/R9 | −1.61 | SagLNR1/CTN | −0.45 |
| CT1/TL | 0.12 | Vmin | 19.5 |
| (CT1 + CT2)/TL | 0.26 | V1/N1 | 36.27 |
| TRLI/ImgH | 1.57 | V2/N2 | 36.42 |
| YR1o [mm] | 5.32 | V3/N3 | 17.83 |
| YR1i [mm] | 3.73 | V4/N4 | 11.68 |
| YM1o [mm] | 5.37 | V5/N5 | 36.51 |

8th Embodiment

Figure 15:
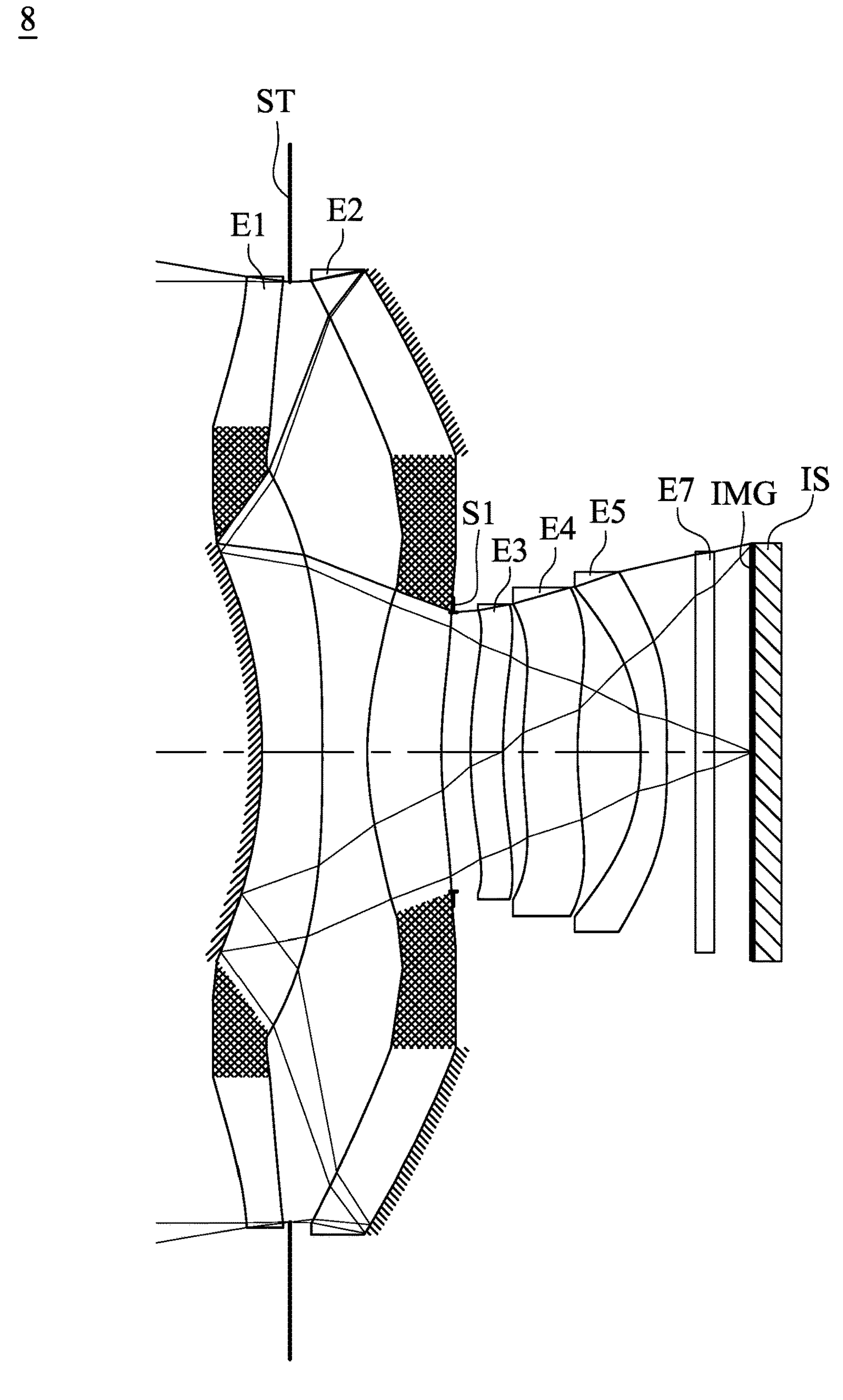
FIG. 15 is a schematic view of an imaging apparatus according to the 8th embodiment of the present disclosure.
Figure 16:
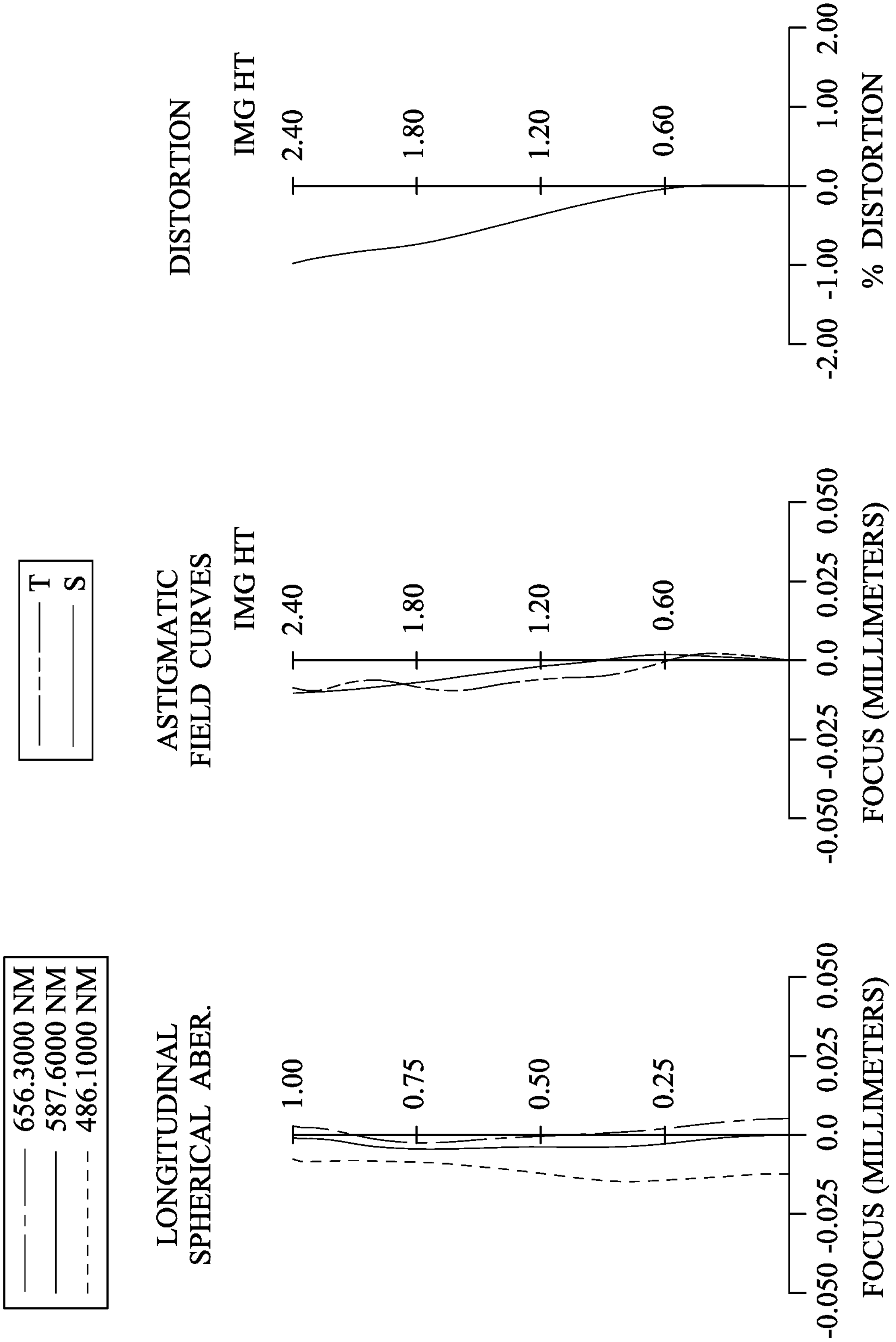
FIG. 16 shows, in order from left to right, spherical aberration curves, astigmatic field curves and a distortion curve of the imaging apparatus according to the 8th embodiment.

FIG. 15 is a schematic view of an imaging apparatus 8 according to the 8th embodiment of the present disclosure. FIG. 16 shows, in order from left to right, spherical aberration curves, astigmatic field curves and a distortion curve of the imaging apparatus 8 according to the 8th embodiment. As shown in FIG. 15, the imaging apparatus 8 according to the 8th embodiment includes an imaging system lens assembly (reference number is omitted) and an image sensor IS. The imaging system lens assembly includes, in order from an object side to an image side, a first lens element E1, an aperture stop ST, a second lens element E2, a stop S1, a third lens element E3, a fourth lens element E4, a fifth lens element E5, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5. The first lens element E1 and the second lens element E2 belong to a first lens group, and the third lens element E3, the fourth lens element E4 and the fifth lens element E5 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with positive refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes one inflection point.

The fourth lens element E4 with positive refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes one inflection point, and the image-side surface of the fourth lens element E4 includes one inflection point.

The fifth lens element E5 with negative refractive power has the object-side surface being concave in a paraxial region thereof and the image-side surface being concave in a paraxial region thereof. The fifth lens element E5 is made of a plastic material, and has the object-side surface and the image-side surface being both aspheric. Further, the image-side surface of the fifth lens element E5 includes one inflection point.

The filter E7 is made of a glass material, which is located between the fifth lens element E5 and the image surface IMG in order, and will not affect the focal length of the imaging system lens assembly.

The detailed optical data of the 8th embodiment are shown in Table 8A and the aspheric surface data are shown in Table 8B below.

TABLE 8A

8th Embodiment
f = 14.39 mm, Fno = 1.83, HFOV = 9.6 deg.

| Surface # | | Curvature Radius | Thickness | Material | Index | Abbe # | Refractive/ reflective Mode | Focal Length |
|---|---|---|---|---|---|---|---|---|
| 0 | Object | Plano | Infinity | | | | Refract | |
| 1 | Lens 1 peripheral area | 9.9179 ASP | 1.052 | Plastic | 1.545 | 56.1 | Refract | — |
| 2 | | 24.0224 ASP | 0.468 | | | | Refract | |
| 3 | Ape. Stop | Plano | 1.829 | | | | Refract | |
| 4 | Lens 2 peripheral area | −8.4264 ASP | 0.710 | Plastic | 1.534 | 56.0 | Refract | — |
| 5 | | −9.2124 ASP | −0.710 | Plastic | 1.534 | 56.0 | Reflect | — |
| 6 | | −8.4264 ASP | −1.457 | | | | Refract | |
| 7 | Lens 1 central area | −39.5162 ASP | −0.693 | Plastic | 1.545 | 56.1 | Refract | — |
| 8 | | −5.5608 ASP | 0.693 | Plastic | 1.545 | 56.1 | Reflect | — |
| 9 | | −39.5162 ASP | 0.517 | | | | Refract | |
| 10 | Lens 2 central area | 3.8129 ASP | 0.854 | Plastic | 1.534 | 56.0 | Refract | |
| 11 | | 6.5730 ASP | 0.138 | | | | Refract | — |
| 12 | Stop | Plano | 0.191 | | | | Refract | |
| 13 | Lens 3 | 5.7461 ASP | 0.374 | Plastic | 1.566 | 37.4 | Refract | 487.24 |
| 14 | | 5.7303 ASP | 0.225 | | | | Refract | |
| 15 | Lens 4 | 4.8030 ASP | 0.633 | Plastic | 1.669 | 19.5 | Refract | 97.34 |
| 16 | | 4.9115 ASP | 0.726 | | | | Refract | |
| 17 | Lens 5 | −3.9566 ASP | 0.300 | Plastic | 1.544 | 56.0 | Refract | −7.08 |
| 18 | | 153.3814 ASP | 0.333 | | | | Refract | |
| 19 | Filter | Plano | 0.210 | Glass | 1.517 | 64.2 | Refract | — |
| 20 | | Plano | 0.438 | | | | Refract | |
| 21 | Image | Plano | — | | | | | |

Reference wavelength is 587.6 nm (d-line).

Effective radius of Surface 12 (stop S1) is 1.605 mm.

TABLE 8B

| Aspheric Coefficients | | | | | |
|---|---|---|---|---|---|
| Surface # | 1 | 2 | 4 | 5 | 6 |
| k= | 8.330030E−01 | −1.100330E−01 | −8.259380E−01 | −5.794910E−01 | −8.259380E−01 |
| A4= | −2.996685E−04 | −4.372225E−05 | 2.978931E−04 | 6.116587E−05 | 2.978931E−04 |
| A6= | −2.547222E−05 | −3.086871E−05 | −2.236192E−05 | −2.000950E−06 | −2.236192E−05 |
| A8= | 2.355647E−07 | 1.009043E−06 | 1.450480E−06 | 1.365116E−07 | 1.450480E−06 |
| A10= | 7.313020E−09 | −3.087489E−09 | −3.468995E−08 | −2.466619E−09 | −3.468995E−08 |
| A12= | −2.824570E−10 | −1.457623E−10 | 2.764341E−10 | −4.762805E−12 | 2.764341E−10 |
| Surface # | 7 | 8 | 9 | 10 | 11 |
| k= | 1.717450E+01 | −2.067510E+00 | 1.717450E+01 | −3.344880E−01 | 7.816910E−01 |
| A4= | −8.370943E−03 | −7.129145E−04 | −8.370943E−03 | −1.465490E−02 | 5.194564E−03 |
| A6= | 8.531036E−04 | −1.198361E−04 | 8.531036E−04 | −3.235364E−03 | −2.074504E−02 |
| A8= | −7.715056E−05 | 5.660244E−05 | −7.715056E−05 | 2.163431E−03 | 8.092195E−03 |
| A10= | 4.407710E−06 | −7.567858E−06 | 4.407710E−06 | −5.754247E−04 | −2.853959E−04 |
| A12= | −1.285728E−07 | 2.536937E−07 | −1.285728E−07 | 1.006095E−04 | −7.937719E−04 |
| A14= | | | | −5.995469E−06 | 2.550387E−04 |
| A16= | | | | | −2.575676E−05 |
| Surface # | 13 | 14 | 15 | 16 | 17 |
| k= | −3.090310E+01 | −8.662370E+01 | −6.388940E+01 | 8.377460E−01 | −1.359310E+01 |
| A4= | 4.601762E−02 | 6.645248E−02 | 2.548956E−02 | −3.065712E−02 | −1.219246E−01 |
| A6= | −4.702753E−02 | −8.197941E−02 | −7.051853E−02 | −7.067515E−03 | 6.979593E−02 |
| A8= | 1.648350E−02 | 4.565315E−02 | 4.489030E−02 | 2.701437E−03 | −3.302063E−02 |
| A10= | −1.221319E−03 | −1.663483E−02 | −2.207578E−02 | −3.660065E−04 | 1.218700E−02 |
| A12= | −1.004514E−03 | 5.296705E−03 | 9.069229E−03 | 8.540290E−05 | −3.364486E−03 |
| A14= | 2.338880E−04 | −1.577961E−03 | −2.652157E−03 | −9.027860E−05 | 7.113429E−04 |
| A16= | −1.822532E−05 | 2.912109E−04 | 4.478766E−04 | 3.059682E−05 | −1.112794E−04 |
| A18= | | −2.206705E−05 | −3.213993E−05 | −3.615714E−06 | 1.092547E−05 |
| A20= | | | 2.102108E−18 | 9.676856E−08 | −4.799312E−07 |

| Surface # | 18 |
|---|---|
| k= | 1.618980E+03 |
| A4= | −1.147629E−01 |
| A6= | 6.826232E−02 |
| A8= | −3.910541E−02 |
| A10= | 1.806336E−02 |
| A12= | −6.071429E−03 |
| A14= | 1.420396E−03 |
| A16= | −2.151835E−04 |
| A18= | 1.859001E−05 |
| A20= | −6.856148E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters in Table 8C can be calculated from Table 8A and Table 8B as the following values and satisfy the following conditions:

TABLE 8C

| 8th Embodiment | | | |
|---|---|---|---|
| f [mm] | 14.39 | YM1i [mm] | 3.40 |
| Fno | 1.83 | YM2 [mm] | 2.40 |
| HFOV [deg.] | 9.6 | YRL [mm] | 1.62 |
| TL/ImgH | 2.35 | YR1o/ImgH | 2.28 |
| TL/f | 0.39 | (YR1i − YRL)/T12 | 4.08 |
| ImgH/f | 0.17 | YM2/YRL | 1.48 |
| BL/ImgH | 0.41 | (YR1o − YR1i)/(YM1o − YM1i) | 0.81 |
| (R8 − R9)/(R8 + R9) | 1.21 | YR1o/YR1i | 1.46 |
| (RM2 + R11)/(RM2 − R11) | −0.02 | YM1o/YM1i | 1.63 |
| RM2/R9 | −1.46 | SagLNR1/CTN | −2.53 |
| CT1/TL | 0.12 | Vmin | 19.5 |

TABLE 8C-continued

| 8th Embodiment | | | |
|---|---|---|---|
| (CT1 + CT2)/TL | 0.27 | V1/N1 | 36.31 |
| TRLI/ImgH | 1.49 | V2/N2 | 36.51 |
| YR1o [mm] | 5.46 | V3/N3 | 23.88 |
| YR1i [mm] | 3.73 | V4/N4 | 11.68 |
| YM1o [mm] | 5.55 | V5/N5 | 36.27 |

9th Embodiment

Figure 17:
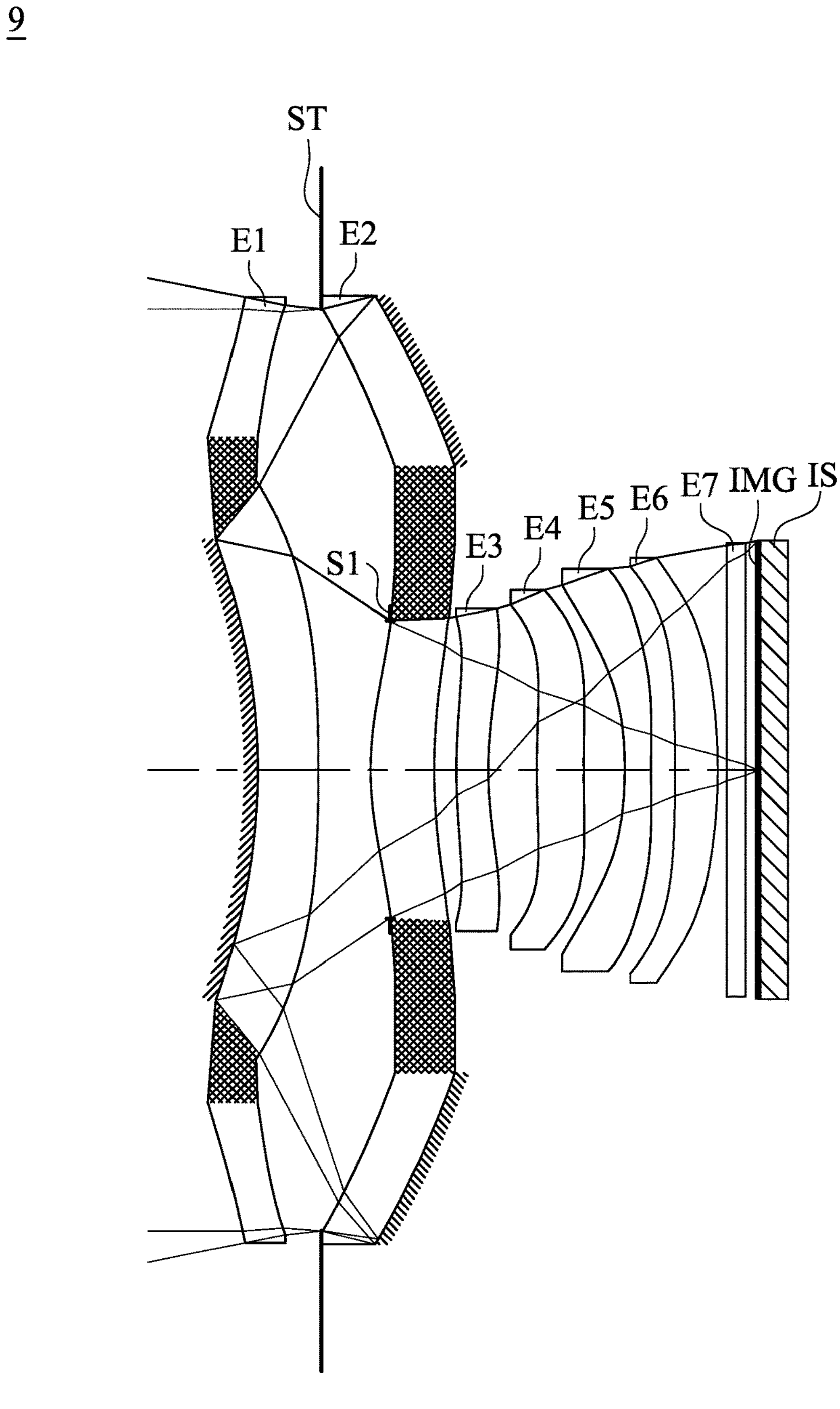
FIG. 17 is a schematic view of an imaging apparatus according to the 9th embodiment of the present disclosure.
Figure 18:
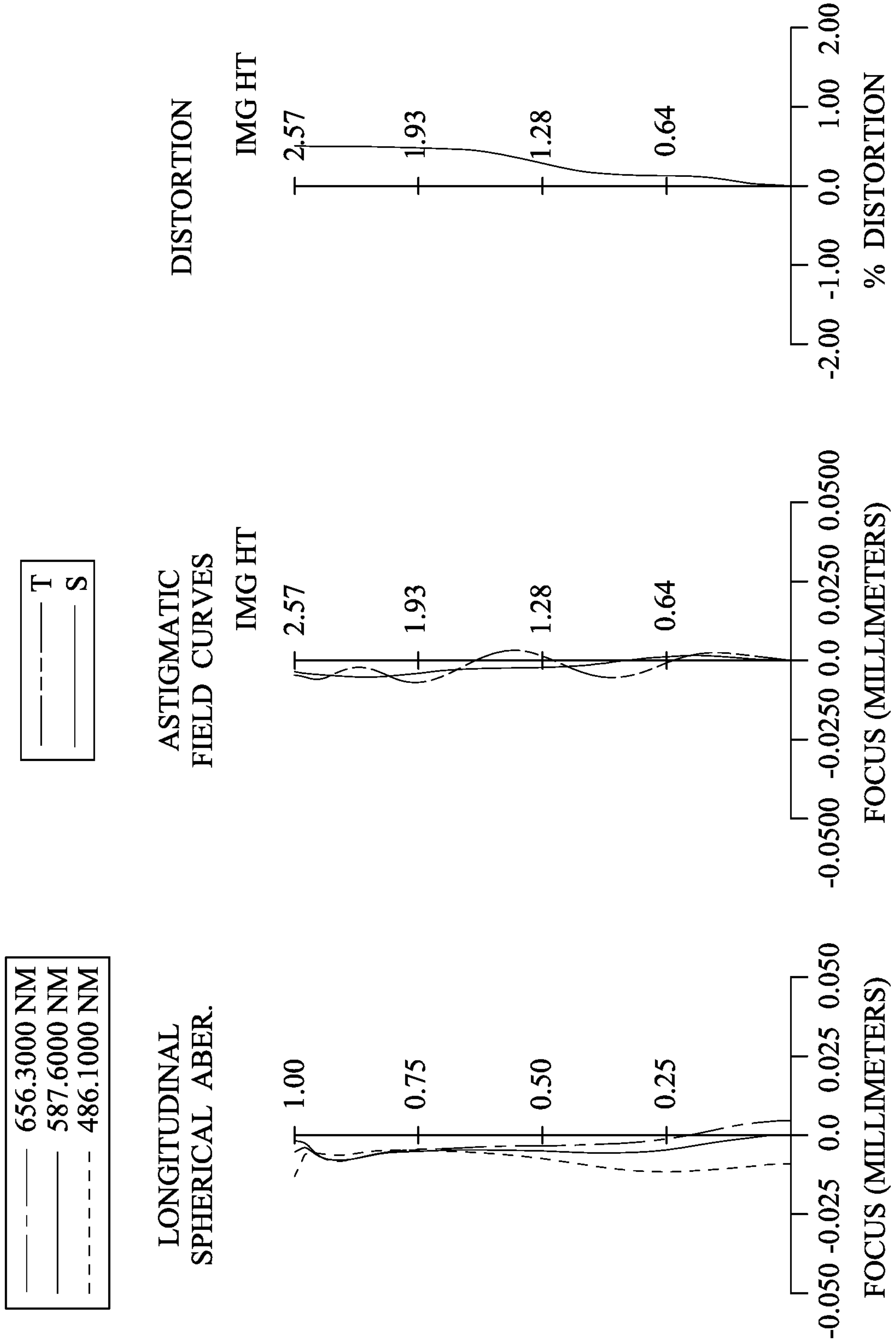
FIG. 18 shows, in order from left to right, spherical aberration curves, astigmatic field curves and a distortion curve of the imaging apparatus according to the 9th embodiment.

FIG. 17 is a schematic view of an imaging apparatus 9 according to the 9th embodiment of the present disclosure. FIG. 18 shows, in order from left to right, spherical aberration curves, astigmatic field curves and a distortion curve of the imaging apparatus 9 according to the 9th embodiment. As shown in FIG. 17, the imaging apparatus 9 according to the 9th embodiment includes an imaging system lens assembly (reference number is omitted) and an image sensor IS. The imaging system lens assembly includes, in order from an object side to an image side, a first lens element E1, an aperture stop ST, a stop S1, a second lens element E2, a third lens element E3, a fourth lens element E4, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6. The first lens element E1 and the second lens element E2 belong to a first lens group, and the third lens element E3, the fourth lens element E4, the fifth lens element E5 and the sixth lens element E6 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with negative refractive power has the object-side surface being convex in a paraxial region thereof and the image-side surface being concave in a paraxial region thereof. The third lens element E3 is made of a plastic material, and has the object-side surface and the image-side surface being both aspheric. Further, the object-side surface of the third lens element E3 includes one inflection point, and the image-side surface of the third lens element E3 includes three inflection points.

The fourth lens element E4 with positive refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes two inflection points, and the image-side surface of the fourth lens element E4 includes two inflection points.

The fifth lens element E5 with negative refractive power has the object-side surface being concave in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes one inflection point, and the image-side surface of the fifth lens element E5 includes one inflection point.

The sixth lens element E6 with positive refractive power has the object-side surface being concave in a paraxial region thereof and the image-side surface being convex in a paraxial region thereof. The sixth lens element E6 is made of a glass material, and has the object-side surface and the image-side surface being both aspheric. Further, the image-side surface of the sixth lens element E6 includes two inflection points.

The filter E7 is made of a glass material, which is located between the sixth lens element E6 and the image surface IMG in order, and will not affect the focal length of the imaging system lens assembly.

The detailed optical data of the 9th embodiment are shown in Table 9A and the aspheric surface data are shown in Table 9B below.

TABLE 9A

| 9th Embodiment<br>f = 12.86 mm, Fno = 1.77, HFOV = 11.2 deg. | | | | | | | | |
|---|---|---|---|---|---|---|---|---|
| Surface # | | Curvature Radius | Thickness | Material | Index | Abbe # | Refractive/ reflective Mode | Focal Length |
| 0 | Object | Plano | Infinity | | | | Refract | |
| 1 | Lens 1 peripheral area | 9.5960 ASP | 0.941 | Plastic | 1.544 | 56.0 | Refract | — |
| 2 | | 23.4705 ASP | 0.993 | | | | Refract | |
| 3 | Ape. Stop | Plano | 1.439 | | | | Refract | |
| 4 | Lens 2 peripheral area | −9.3025 ASP | 0.645 | Plastic | 1.566 | 37.4 | Refract | — |
| 5 | | −9.9934 ASP | −0.645 | Plastic | 1.566 | 37.4 | Reflect | — |
| 6 | | −9.3025 ASP | −1.475 | | | | Refract | |
| 7 | Lens 1 central area | −23.3070 ASP | −0.680 | Plastic | 1.544 | 56.0 | Refract | — |
| 8 | | −7.0870 ASP | 0.680 | Plastic | 1.544 | 56.0 | Reflect | — |
| 9 | | −23.3070 ASP | 0.809 | | | | Refract | |
| 10 | Stop | Plano | −0.220 | | | | Refract | |
| 11 | Lens 2 central area | 3.8686 ASP | 0.714 | Plastic | 1.566 | 37.4 | Refract | — |
| 12 | | 6.7741 ASP | 0.247 | | | | Refract | |
| 13 | Lens 3 | 6.5472 ASP | 0.355 | Plastic | 1.686 | 18.4 | Refract | −19.43 |
| 14 | | 4.2937 ASP | 0.545 | | | | Refract | |
| 15 | Lens 4 | 11.0505 ASP | 0.528 | Plastic | 1.566 | 37.4 | Refract | 41.16 |
| 16 | | 20.6578 ASP | 0.460 | | | | Refract | |

TABLE 9A-continued

| 9th Embodiment f = 12.86 mm, Fno = 1.77, HFOV = 11.2 deg. | | | | | | | | |
|---|---|---|---|---|---|---|---|---|
| Surface # | | Curvature Radius | Thickness | Material | Index | Abbe # | Refractive/ reflective Mode | Focal Length |
| 17 | Lens 5 | −5.6080 ASP | 0.296 | Plastic | 1.534 | 56.0 | Refract | −7.22 |
| 18 | | 12.5849 ASP | 0.272 | | | | Refract | |
| 19 | Lens 6 | −25.2914 ASP | 0.473 | Glass | 1.548 | 45.9 | Refract | 17.06 |
| 20 | | −6.8704 ASP | 0.100 | | | | Refract | |
| 21 | Filter | Plano | 0.210 | Glass | 1.517 | 64.2 | Refract | — |
| 22 | | Plano | 0.144 | | | | Refract | |
| 23 | Image | Plano | — | | | | | |

Reference wavelength is 587.6 nm (d-line).
Effective radius of Surface 10 (stop S1) is 1.672 mm.

TABLE 9B

| Aspheric Coefficients | | | | | |
|---|---|---|---|---|---|
| Surface # | 1 | 2 | 4 | 5 | 6 |
| k= | 6.356760E−01 | 3.022980E+00 | −5.275070E−01 | −4.379910E−01 | −5.275070E−01 |
| A4= | −4.161506E−04 | −1.291088E−04 | 3.123252E−05 | −8.126578E−06 | 3.123252E−05 |
| A6= | −1.043518E−05 | −2.325585E−06 | 1.666674E−05 | 4.375549E−06 | 1.666674E−05 |
| A8= | −2.708169E−07 | −8.816315E−08 | −8.811872E−07 | −1.828347E−07 | −8.811872E−07 |
| A10= | 2.020759E−09 | 8.319651E−09 | 1.791410E−08 | 1.218295E−09 | 1.791410E−08 |
| A12= | 1.081772E−10 | 1.022537E−10 | −1.904107E−10 | −4.669287E−12 | −1.904107E−10 |
| Surface # | 7 | 8 | 9 | 11 | 12 |
| k= | 2.722230E+01 | −2.298880E+00 | 2.722230E+01 | −1.101830E+00 | −8.349780E+01 |
| A4= | −6.938889E−03 | −4.938359E−04 | −6.938889E−03 | −1.558733E−02 | 2.781862E−02 |
| A6= | 5.953387E−04 | −1.695557E−04 | 5.953387E−04 | −2.283444E−03 | −2.725000E−02 |
| A8= | −5.346640E−05 | 7.404684E−05 | −5.346640E−05 | 2.321150E−03 | 2.037659E−02 |
| A10= | 3.987758E−06 | −9.464417E−06 | 3.987758E−06 | −1.356306E−03 | −9.309420E−03 |
| A12= | −1.601427E−07 | 3.926558E−07 | −1.601427E−07 | 3.501491E−04 | 1.945642E−03 |
| A14= | | | | −2.957474E−05 | −1.274678E−04 |
| Surface # | 13 | 14 | 15 | 16 | 17 |
| k= | −6.999770E+01 | −3.908710E+01 | −2.162710E+00 | 8.002690E+01 | 2.938740E+00 |
| A4= | 2.250567E−03 | 2.725286E−02 | −2.531886E−02 | −2.212409E−02 | −1.096347E−01 |
| A6= | −1.735395E−02 | −4.465576E−02 | 1.017071E−02 | 1.138933E−03 | 1.219048E−01 |
| A8= | 1.127527E−02 | 3.366987E−02 | −3.100763E−02 | −1.563713E−02 | −1.133056E−01 |
| A10= | −1.044674E−03 | −1.559262E−02 | 3.021863E−02 | 1.338219E−02 | 6.765877E−02 |
| A12= | −2.877641E−03 | 3.522837E−03 | −1.606291E−02 | −5.780652E−03 | −2.361470E−02 |
| A14= | 1.239999E−03 | −2.672863E−04 | 4.752551E−03 | 1.527291E−03 | 4.678394E−03 |
| A16= | −1.468778E−04 | −7.077975E−06 | −7.361465E−04 | −2.634616E−04 | −4.866068E−04 |
| A18= | | | 4.719156E−05 | 2.832884E−05 | 2.058482E−05 |
| A20= | | | | −1.412529E−06 | |

| Surface # | 18 | 19 | 20 |
|---|---|---|---|
| k= | 2.684330E+01 | 8.467700E+01 | 6.392120E+00 |
| A4= | −1.157281E−01 | −5.862313E−03 | −2.046512E−03 |
| A6= | 9.177271E−02 | −2.675974E−03 | 1.528392E−03 |
| A8= | −6.680118E−02 | 2.258133E−04 | −1.040270E−03 |
| A10= | 3.367983E−02 | −7.890229E−06 | 1.314152E−04 |
| A12= | −1.064455E−02 | 1.483606E−06 | 9.448366E−07 |
| A14= | 2.053883E−03 | | |
| A16= | −2.346526E−04 | | |
| A18= | 1.448913E−05 | | |
| A20= | −3.698464E−07 | | |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters in Table 9C can be calculated from Table 9A and Table 9B as the following values and satisfy the following conditions:

TABLE 9C

| 9th Embodiment | | | |
|---|---|---|---|
| f [mm] | 12.86 | YM2 [mm] | 2.58 |
| Fno | 1.77 | YRL [mm] | 1.70 |
| HFOV [deg.] | 11.2 | YR1o/ImgH | 2.06 |
| TL/ImgH | 2.18 | (YR1i − YRL)/T12 | 3.45 |
| TL/f | 0.44 | YM2/YRL | 1.52 |

TABLE 9C-continued

| 9th Embodiment | | | |
|---|---|---|---|
| ImgH/f | 0.20 | (YR1o − YR1i)/(YM1o − YM1i) | 0.82 |
| BL/ImgH | 0.18 | YR1o/YR1i | 1.42 |
| (R8 − R9)/(R8 + R9) | 1.40 | YM1o/YM1i | 1.57 |
| (RM2 + R11)/(RM2 − R11) | 0.04 | SagLNR1/CTN | −1.07 |
| RM2/R9 | −1.83 | Vmin | 18.4 |
| CT1/TL | 0.12 | V1/N1 | 36.27 |
| (CT1 + CT2)/TL | 0.25 | V2/N2 | 23.88 |
| TRLI/ImgH | 1.41 | V3/N3 | 10.91 |
| YR1o [mm] | 5.31 | V4/N4 | 23.88 |
| YR1i [mm] | 3.73 | V5/N5 | 36.51 |
| YM1o [mm] | 5.32 | V6/N6 | 29.65 |
| YM1i [mm] | 3.40 | | |

10th Embodiment

Figure 19:
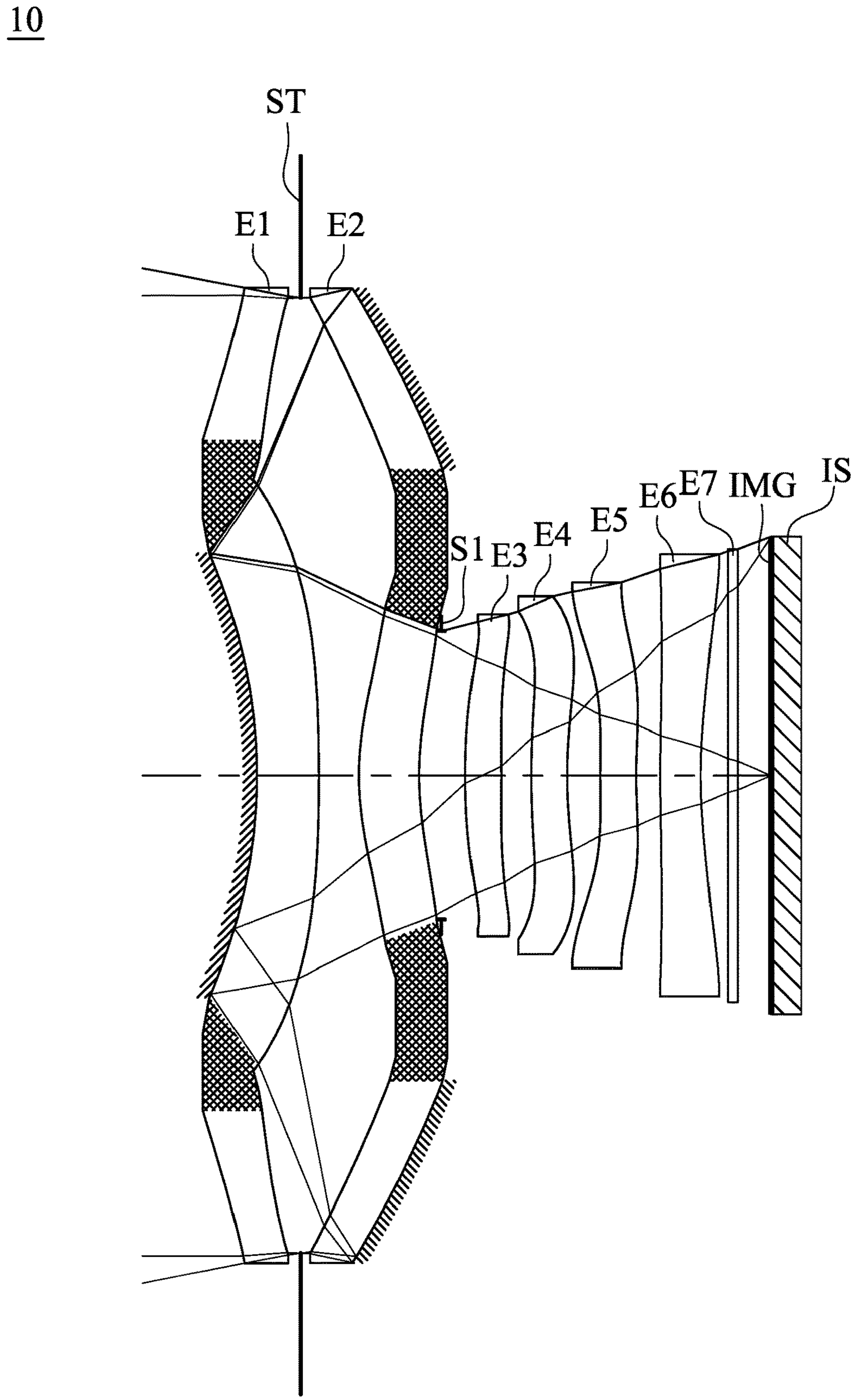
FIG. 19 is a schematic view of an imaging apparatus according to the 10th embodiment of the present disclosure.
Figure 20:
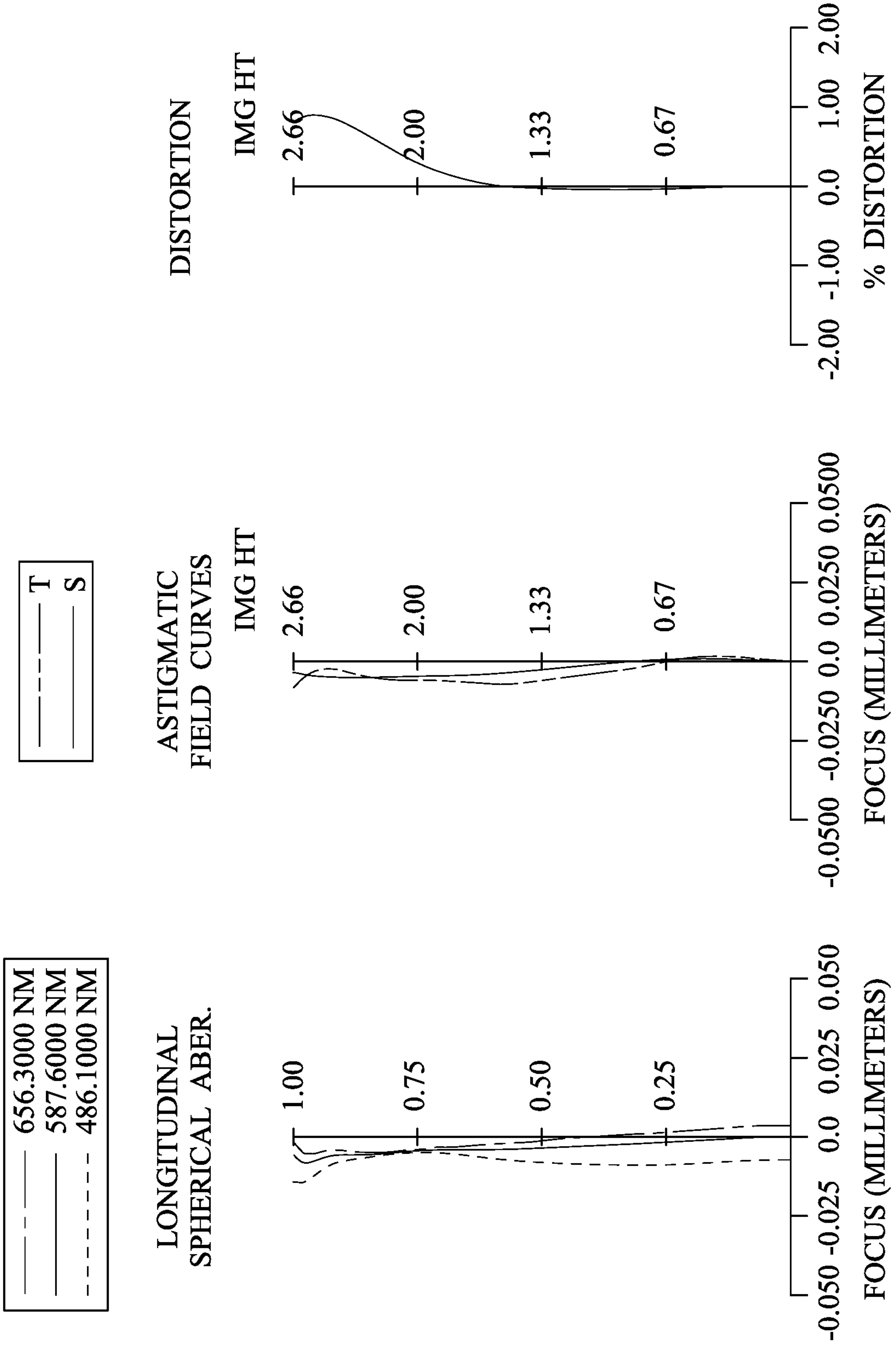
FIG. 20 shows, in order from left to right, spherical aberration curves, astigmatic field curves and a distortion curve of the imaging apparatus according to the 10th embodiment.

FIG. 19 is a schematic view of an imaging apparatus 10 according to the 10th embodiment of the present disclosure. FIG. 20 shows, in order from left to right, spherical aberration curves, astigmatic field curves and a distortion curve of the imaging apparatus 10 according to the 10th embodiment. As shown in FIG. 19, the imaging apparatus 10 according to the 10th embodiment includes an imaging system lens assembly (reference number is omitted) and an image sensor IS. The imaging system lens assembly includes, in order from an object side to an image side, a first lens element E1, an aperture stop ST, a second lens element E2, a stop S1, a third lens element E3, a fourth lens element E4, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6. The first lens element E1 and the second lens element E2 belong to a first lens group, and the third lens element E3, the fourth lens element E4, the fifth lens element E5 and the sixth lens element E6 belong to a second lens group.

The first lens element E1 is a first catadioptric lens element, and can be the same as or similar to the first lens element E1 of the 1st embodiment in FIG. 21 and will not be described again herein. The first lens element E1 is made of a plastic material, and has the peripheral region of the object-side surface (i.e. the first refracting surface) being convex, the central region of the object-side surface (i.e. the second reflecting surface) being concave, the peripheral region of the image-side surface being concave, the central region of the image-side surface being convex, and all being aspheric.

The second lens element E2 is a second catadioptric lens element, and can be the same as or similar to the second lens element E2 of the 1st embodiment in FIG. 21 and will not be described again herein. The second lens element E2 is made of a plastic material, and has the peripheral region of the object-side surface being concave, the central region of the object-side surface being convex, the peripheral region of the image-side surface (i.e. the first reflecting surface) being convex, the central region of the image-side surface (i.e. the last refracting surface) being concave, and all being aspheric.

The third lens element E3 with positive refractive power has the object-side surface being convex in a paraxial region thereof and the image-side surface being convex in a paraxial region thereof. The third lens element E3 is made of a plastic material, and has the object-side surface and the image-side surface being both aspheric. Further, the object-side surface of the third lens lens element E3 includes two inflection points.

The fourth lens element E4 with negative refractive power has the object-side surface being convex in a paraxial region thereof and the image-side surface being concave in a paraxial region thereof. The fourth lens element E4 is made of a plastic material, and has the object-side surface and the image-side surface being both aspheric. Further, the object-side surface of the fourth lens element E4 includes one inflection point, and the image-side surface of the fourth lens element E4 includes one inflection point.

The fifth lens element E5 with negative refractive power has the object-side surface being convex in a paraxial region thereof and the image-side surface being concave in a paraxial region thereof. The fifth lens element E5 is made of a plastic material, and has the object-side surface and the image-side surface being both aspheric. Further, the object-side surface of the fifth lens element E5 includes two inflection points, and the image-side surface of the fifth lens element E5 includes two inflection points.

The sixth lens element E6 with negative refractive power has the object-side surface being convex in a paraxial region thereof and the image-side surface being concave in a paraxial region thereof. The sixth lens element E6 is made of a plastic material, and has the object-side surface and the image-side surface being both aspheric. Further, the object-side surface of the sixth lens element E6 includes three inflection points, and the image-side surface of the sixth lens element E6 includes one inflection point.

The filter E7 is made of a glass material, which is located between the sixth lens element E6 and the image surface IMG in order, and will not affect the focal length of the imaging system lens assembly.

The detailed optical data of the 10th embodiment are shown in Table 10A and the aspheric surface data are shown in Table 10B below.

TABLE 10A

| 10th Embodiment f = 13.59 mm, Fno = 1.77, HFOV = 11.0 deg. | | | | | | | | |
|---|---|---|---|---|---|---|---|---|
| Surface # | | Curvature Radius | Thickness | Material | Index | Abbe # | Refractive/ reflective Mode | Focal Length |
| 0 | Object | Plano | Infinity | | | | Refract | |
| 1 | Lens 1 peripheral area | 9.5559 ASP | 1.050 | Plastic | 1.544 | 56.0 | Refract | — |

TABLE 10A-continued

| 10th Embodiment<br>f = 13.59 mm, Fno = 1.77, HFOV = 11.0 deg. | | | | | | | | |
|---|---|---|---|---|---|---|---|---|
| Surface # | | Curvature Radius | Thickness | Material | Index | Abbe # | Refractive/ reflective Mode | Focal Length |
| 2 | | 22.6034 ASP | 0.699 | | | | Refract | |
| 3 | Ape. Stop | Plano | 1.660 | | | | Refract | |
| 4 | Lens 2 peripheral area | −8.3260 ASP | 0.562 | Plastic | 1.534 | 56.0 | Refract | — |
| 5 | | −9.1256 ASP | −0.562 | Plastic | 1.534 | 56.0 | Reflect | — |
| 6 | | −8.3260 ASP | −1.458 | | | | Refract | |
| 7 | Lens 1 central area | −25.3704 ASP | −0.689 | Plastic | 1.544 | 56.0 | Refract | — |
| 8 | | −5.8359 ASP | 0.689 | Plastic | 1.544 | 56.0 | Reflect | — |
| 9 | | −25.3704 ASP | 0.447 | | | | Refract | |
| 10 | Lens 2 central area | 3.3127 ASP | 0.674 | Plastic | 1.534 | 56.0 | Refract | |
| 11 | | 4.1460 ASP | 0.247 | | | | Refract | |
| 12 | Stop | Plano | 0.264 | | | | Refract | |
| 13 | Lens 3 | 10.0139 ASP | 0.400 | Plastic | 1.587 | 28.3 | Refract | 11.18 |
| 14 | | −18.7776 ASP | 0.334 | | | | Refract | |
| 15 | Lens 4 | 14.4676 ASP | 0.400 | Plastic | 1.680 | 18.2 | Refract | −14.99 |
| 16 | | 5.9129 ASP | 0.370 | | | | Refract | |
| 17 | Lens 5 | 15.6306 ASP | 0.400 | Plastic | 1.639 | 23.5 | Refract | −14.91 |
| 18 | | 5.8573 ASP | 0.269 | | | | Refract | |
| 19 | Lens 6 | 18.1659 ASP | 0.450 | Plastic | 1.544 | 56.0 | Refract | −18.08 |
| 20 | | 6.3258 ASP | 0.300 | | | | Refract | |
| 21 | Filter | Plano | 0.110 | Glass | 1.517 | 64.2 | Refract | — |
| 22 | | Plano | 0.374 | | | | Refract | |
| 23 | Image | Plano | — | | | | | |

Reference wavelength is 587.6 nm (d-line).
Effective radius of Surface 12 (stop S1) is 1.608 mm.

TABLE 10B

| Aspheric Coefficients | | | | | |
|---|---|---|---|---|---|
| Surface # | 1 | 2 | 4 | 5 | 6 |
| k= | 5.385900E−01 | 1.705460E+00 | −9.132800E−01 | −5.596040E−01 | −9.132800E−01 |
| A4= | −2.997971E−04 | −3.815595E−05 | 3.212748E−04 | 6.004368E−05 | 3.212748E−04 |
| A6= | −2.639714E−05 | −2.938099E−05 | −2.210429E−05 | −2.625935E−06 | −2.210429E−05 |
| A8= | 3.033763E−07 | 1.083316E−06 | 1.397969E−06 | 1.366726E−07 | 1.397969E−06 |
| A10= | 8.342831E−09 | 2.078820E−09 | −3.572690E−08 | −2.268597E−09 | −3.572690E−08 |
| A12= | −2.427119E−10 | −2.610769E−10 | 3.067987E−10 | −2.666610E−12 | 3.067987E−10 |
| Surface # | 7 | 8 | 9 | 10 | 11 |
| k= | −9.000000E+01 | −2.159940E+00 | −9.000000E+01 | −1.818760E+00 | −7.383260E+00 |
| A4= | −7.998357E−03 | −6.932724E−04 | −7.998357E−03 | −1.818228E−02 | 5.288044E−03 |
| A6= | 7.832205E−04 | −1.405229E−04 | 7.832205E−04 | −4.000674E−03 | −1.790133E−02 |
| A8= | −7.941031E−05 | 5.064806E−05 | −7.941031E−05 | 2.569914E−03 | 7.056376E−03 |
| A10= | 4.783761E−06 | −6.364138E−06 | 4.783761E−06 | −6.469538E−04 | −1.349027E−04 |
| A12= | −1.509355E−07 | 2.590587E−07 | −1.509355E−07 | 1.006073E−04 | −7.937718E−04 |
| A14= | | | | −5.995510E−06 | 2.550386E−04 |
| A16= | | | | | −2.575676E−05 |
| Surface # | 13 | 14 | 15 | 16 | 17 |
| k= | 2.509700E+01 | −1.922750E+01 | 5.376270E+01 | 6.162400E+00 | −3.043040E+00 |
| A4= | 4.102305E−02 | 9.234417E−02 | 4.732025E−02 | −9.537779E−03 | −1.294287E−01 |
| A6= | −3.856974E−02 | −8.194328E−02 | −7.665045E−02 | −1.867607E−02 | 7.236746E−02 |
| A8= | 1.399857E−02 | 4.543607E−02 | 4.555298E−02 | 5.355822E−03 | −3.270929E−02 |
| A10= | −8.018276E−04 | −1.655711E−02 | −2.219199E−02 | −6.765472E−04 | 1.215692E−02 |
| A12= | −1.004522E−03 | 5.296715E−03 | 9.069214E−03 | 8.544349E−05 | −3.367285E−03 |

TABLE 10B-continued

| Aspheric Coefficients | | | | | |
|---|---|---|---|---|---|
| A14= | 2.338879E−04 | −1.577961E−03 | −2.652157E−03 | −9.027855E−05 | 7.113427E−04 |
| A16= | −1.822532E−05 | 2.912109E−04 | 4.478766E−04 | 3.059682E−05 | −1.112794E−04 |
| A18= | | −2.206705E−05 | −3.213993E−05 | −3.615714E−06 | 1.092547E−05 |
| A20= | | | | 9.676855E−08 | −4.799312E−07 |

| Surface # | 18 | 19 | 20 |
|---|---|---|---|
| k= | 4.270020E−01 | −9.000000E+01 | −4.353480E+01 |
| A4= | −1.278529E−01 | −1.777679E−02 | −2.812593E−03 |
| A6= | 7.340650E−02 | 6.119495E−03 | −2.154832E−04 |
| A8= | −3.964600E−02 | −9.118292E−04 | 3.966929E−04 |
| A10= | 1.808914E−02 | 4.565623E−05 | −7.505094E−05 |
| A12= | −6.071412E−03 | 3.172629E−08 | 3.488969E−06 |
| A14= | 1.420396E−03 | −9.669726E−10 | 1.134743E−09 |
| A16= | −2.151835E−04 | −5.494032E−12 | |
| A18= | 1.859001E−05 | | |
| A20= | −6.856148E−07 | | |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters in Table 10C can be calculated from Table 10A and Table 10B as the following values and satisfy the following conditions:

TABLE 10C

| 10th Embodiment | | | |
|---|---|---|---|
| f [mm] | 13.59 | YM2 [mm] | 2.47 |
| Fno | 1.77 | YRL [mm] | 1.63 |
| HFOV [deg.] | 11.0 | YR1o/ImgH | 2.04 |
| TL/ImgH | 2.15 | (YR1i − YRL)/T12 | 4.69 |
| TL/f | 0.42 | YM2/YRL | 1.51 |
| ImgH/f | 0.20 | (YR1o − YR1i)/(YM1o − YM1i) | 0.84 |
| BL/ImgH | 0.29 | YR1o/YR1i | 1.46 |
| (R8 − R9)/(R8 + R9) | 1.30 | YM1o/YM1i | 1.60 |
| (RM2 + R11)/(RM2 − R11) | −0.26 | SagLNR1/CTN | 0.00 |
| RM2/R9 | −1.76 | Vmin | 18.2 |
| CT1/TL | 0.12 | V1/N1 | 36.27 |
| (CT1 + CT2)/TL | 0.24 | V2/N2 | 36.51 |
| TRLI/ImgH | 1.47 | V3/N3 | 17.83 |
| YR1o [mm] | 5.43 | V4/N4 | 10.83 |
| YR1i [mm] | 3.73 | V5/N5 | 14.34 |
| YM1o [mm] | 5.43 | V6/N6 | 36.27 |
| YM1i [mm] | 3.40 | | |

11th Embodiment

Figure 23:
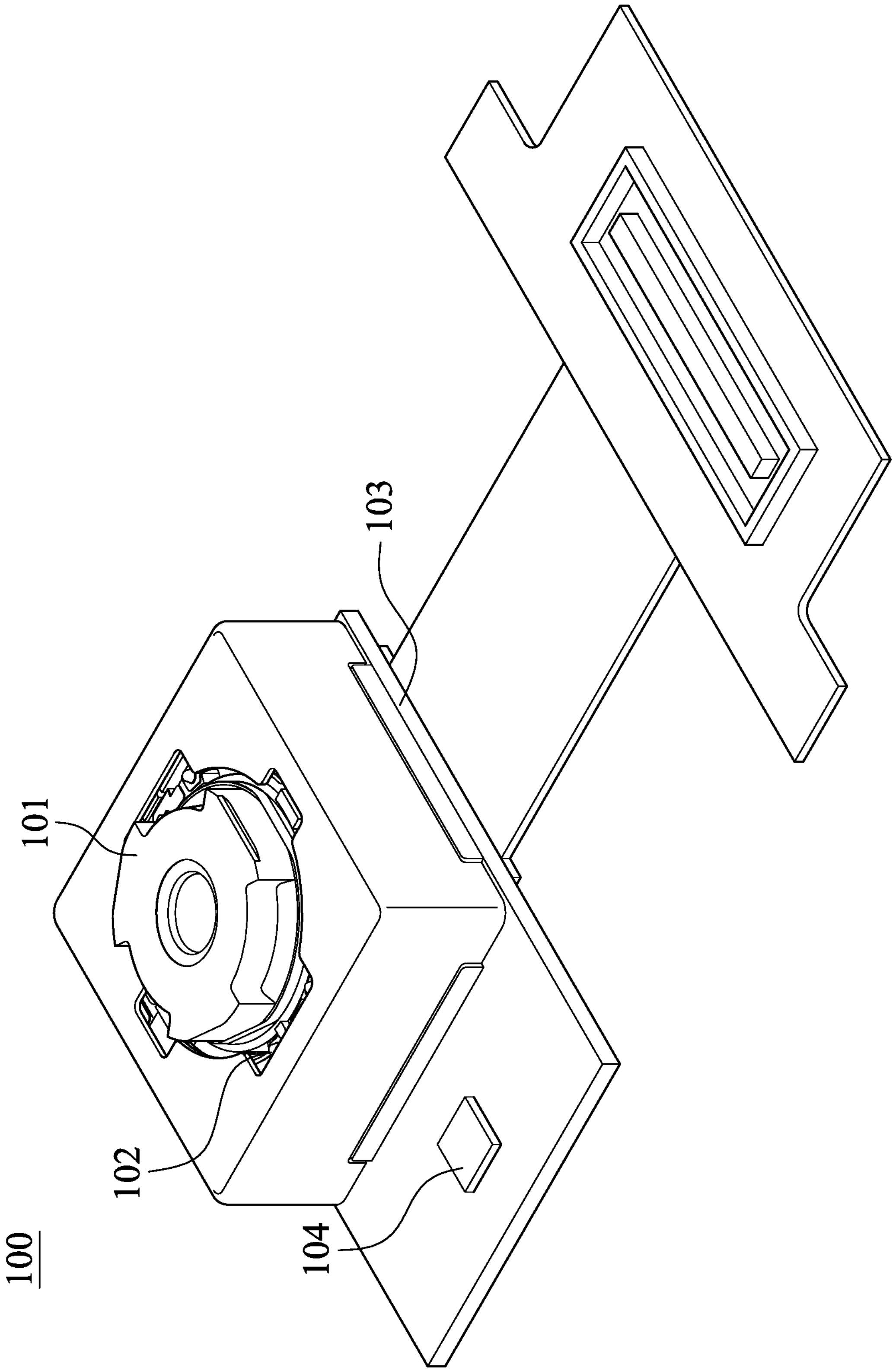
FIG. 23 is a schematic view of an imaging apparatus according to the 11th embodiment of the present disclosure.

FIG. 23 is a schematic view of an imaging apparatus 100 according to the 11th embodiment of the present disclosure. As shown in FIG. 23, the imaging apparatus 100 according to the 11th embodiment is a camera module, and the imaging apparatus 100 includes an imaging lens assembly 101, a driving apparatus 102 and an image sensor 103, wherein the imaging lens assembly 101 includes the imaging system lens assembly of the present disclosure and a lens barrel (reference number is omitted) for carrying the imaging system lens assembly. The imaging apparatus 100 can focus light from an imaged object via the imaging lens assembly 101, perform image focusing by the driving apparatus 102, and generate an image on the image sensor 103, so that the imaging information can be transmitted.

The driving apparatus 102 can be an auto-focus module, and it can be driven by driving systems, such as voice coil motors (VCM), micro electro-mechanical systems (MEMS), piezoelectric systems, and shape memory alloys etc. The imaging system lens assembly can obtain a favorable imaging position by the driving apparatus 102 so as to capture clear images when the imaged object is disposed at different object distances.

The imaging apparatus 100 can include the image sensor 103 with superior photosensitivity and low noise (such as CMOS, CCD), and the image sensor 103 is disposed on the image surface of the imaging system lens assembly. Thus, it is favorable for truly presenting the good imaging quality of the imaging system lens assembly. Further, the imaging apparatus 100 can further include an image stabilization module 104, which can be a kinetic energy sensor, such as an accelerometer, a gyro sensor, and a Hall Effect sensor, the image stabilization module 104 in the 11th embodiment is the gyro sensor, but it is not limited thereto. Therefore, the variation of different axial directions of the imaging system lens assembly can be adjusted so as to compensate the blurry image generated by motion at the moment of exposure, and it is further favorable for enhancing the image quality while photographing in motion and low light situation. Furthermore, advanced image compensation functions, such as optical image stabilizations (01S) and electronic image stabilizations (EIS) etc., can be provided.

12th Embodiment

Figure 24A:
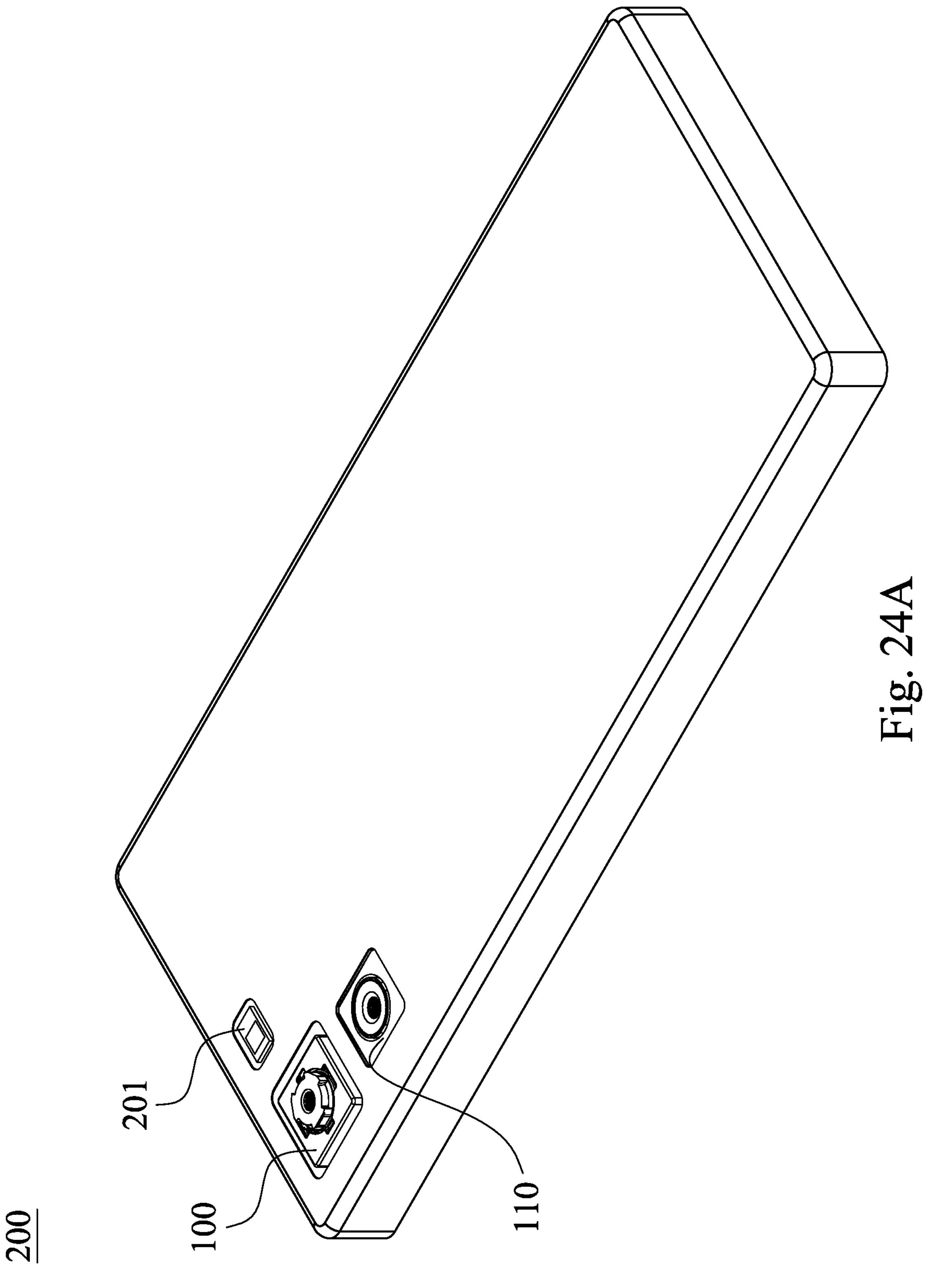
FIG. 24A is a schematic view of one side of an electronic device according to the 12th embodiment of the present disclosure.
Figure 24B:
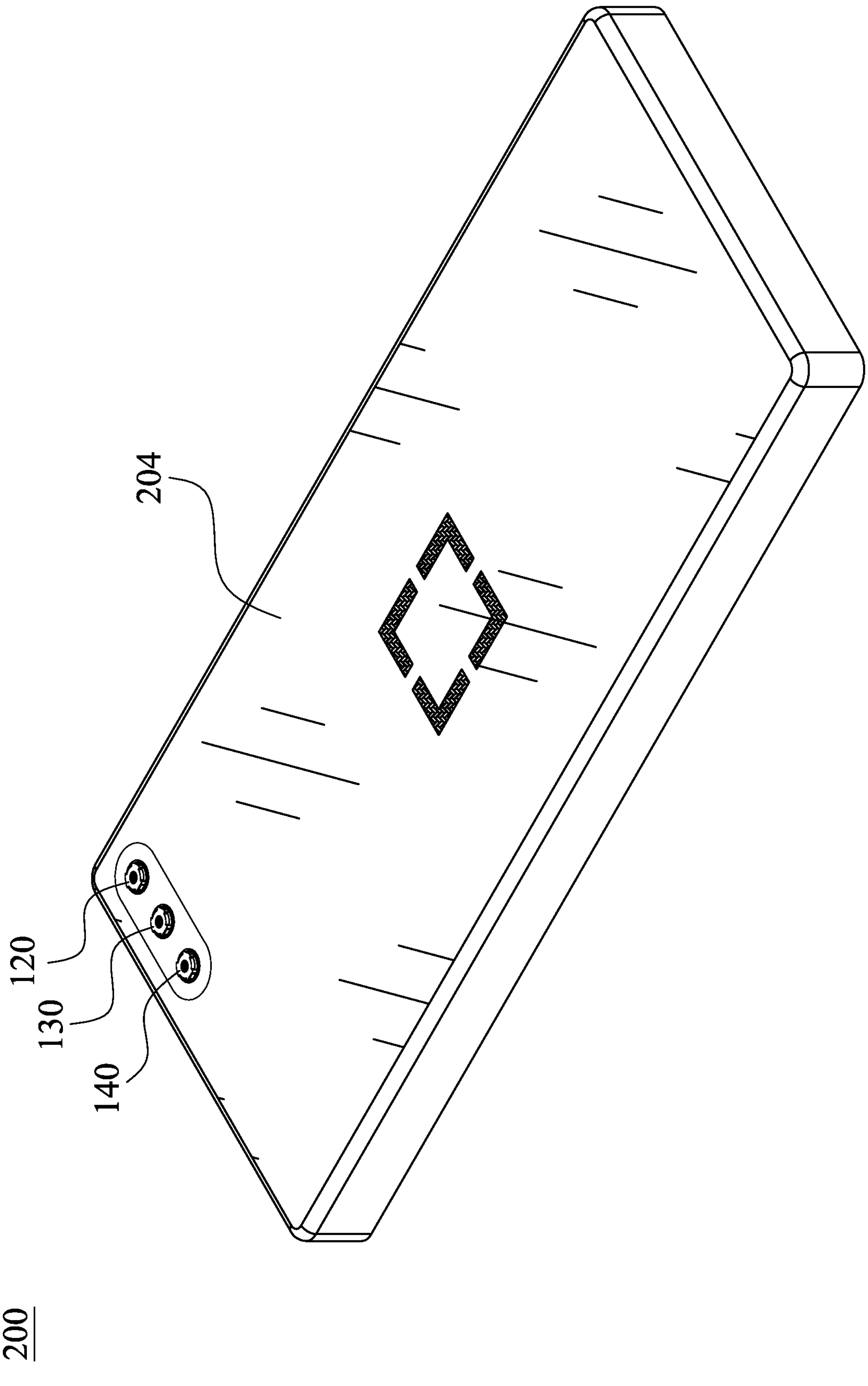
FIG. 24B is a schematic view of another side of the electronic device of FIG. 24A.
Figure 24C:
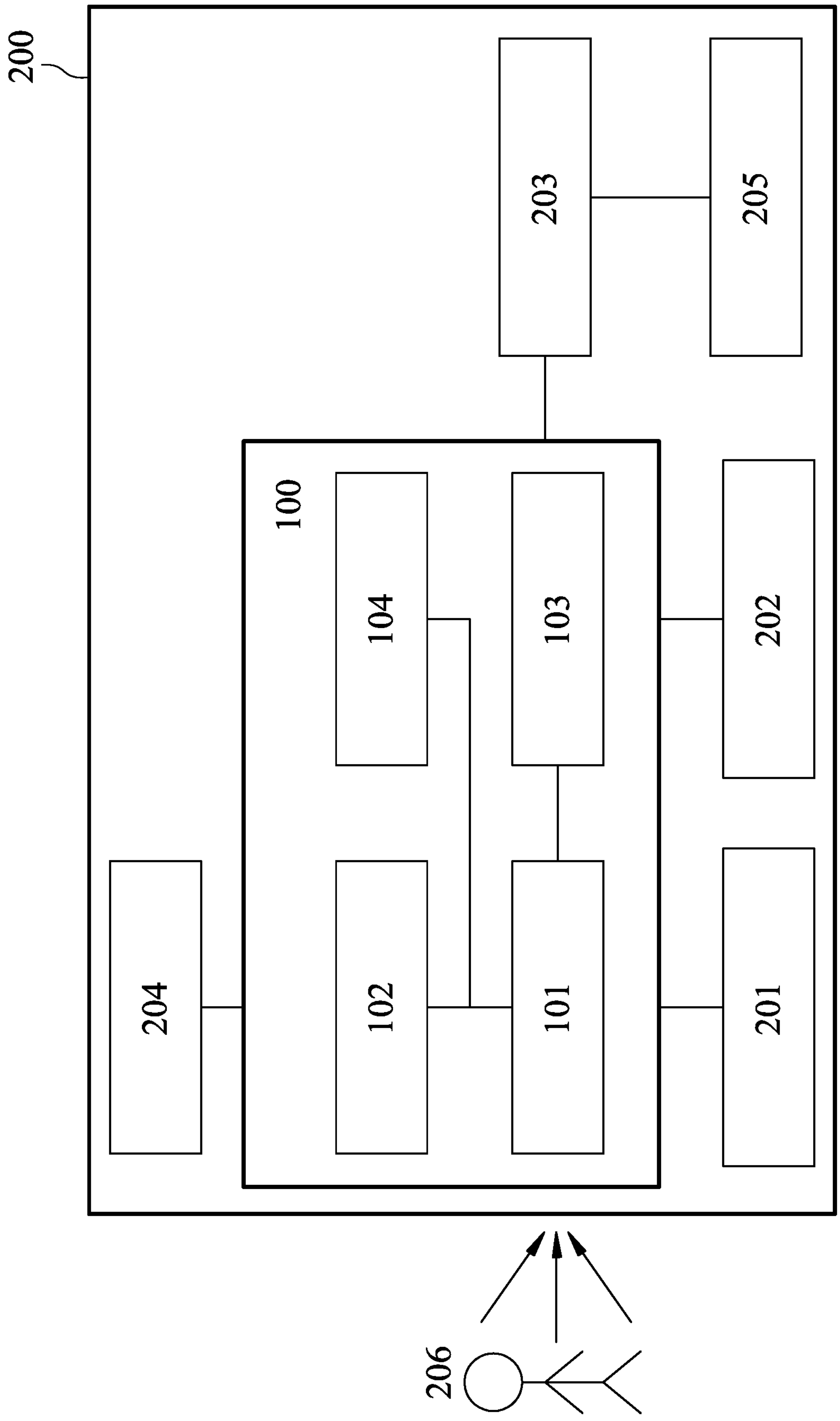
FIG. 24C is a system schematic view of the electronic device of FIG. 24A.

FIG. 24A is a schematic view of one side of an electronic device 200 according to the 12th embodiment of the present disclosure. FIG. 24B is a schematic view of another side of the electronic device 200 of FIG. 24A. FIG. 24C is a system schematic view of the electronic device 200 of FIG. 24A. As shown in FIG. 24A, FIG. 24B and FIG. 24C, the electronic device 200 in the 12th embodiment can be a smart phone, and includes the imaging apparatus 100, 110, 120, 130, 140, a flash module 201, a focusing assisting module 202, an image signal processor (ISP) 203, a user interface 204 and an image software processor 205, wherein the imaging apparatus 120, 130, 140 can be a front camera. When the user captures images of an imaged object 206 via the user interface 204, the electronic device 200 focuses and generates an image via the imaging apparatus 100, 110, 120, 130, 140, while compensating for low illumination via the flash module 201. Then, the electronic device 200 quickly focuses on the imaged object 206 according to its object distance information provided by the focusing assisting module 202 and optimizes the image via the image signal processor 203 and the image software processor 205, so that the image quality can be further enhanced. Further, the focusing assisting module 202 can adopt conventional infrared or laser for obtaining quick focusing, and the user interface 204 can utilize a touch screen or a physical button for capturing and processing the image with various functions of the image processing software.

At least one of the imaging apparatus 100, 110, 120, 130, 140 of the 12th embodiment can include the imaging system lens assembly of the present disclosure, and can be the same as or similar to the imaging apparatus 100 of the 11th embodiment, and will not be described again herein. In detail, the imaging apparatus 100, 110 can respectively be a wide-angle imaging apparatus and an ultra-wide angle imaging apparatus, also can respectively be the wide-angle imaging apparatus and a telephoto imaging apparatus. The imaging apparatus 120, 130, 140 can be the wide-angle imaging apparatus, the ultra-wide angle imaging apparatus and a TOF module (Time-Of-Flight), but it is not limited thereto. Further, the connecting relationships between the imaging apparatus 110, 120, 130, 140 and other elements can be the same as to the imaging apparatus 100 in the FIG. 24C, or can be adaptively adjusted according to the type of the imaging apparatuses, which will not be shown and detailed descripted again.

13th Embodiment

Figure 25:
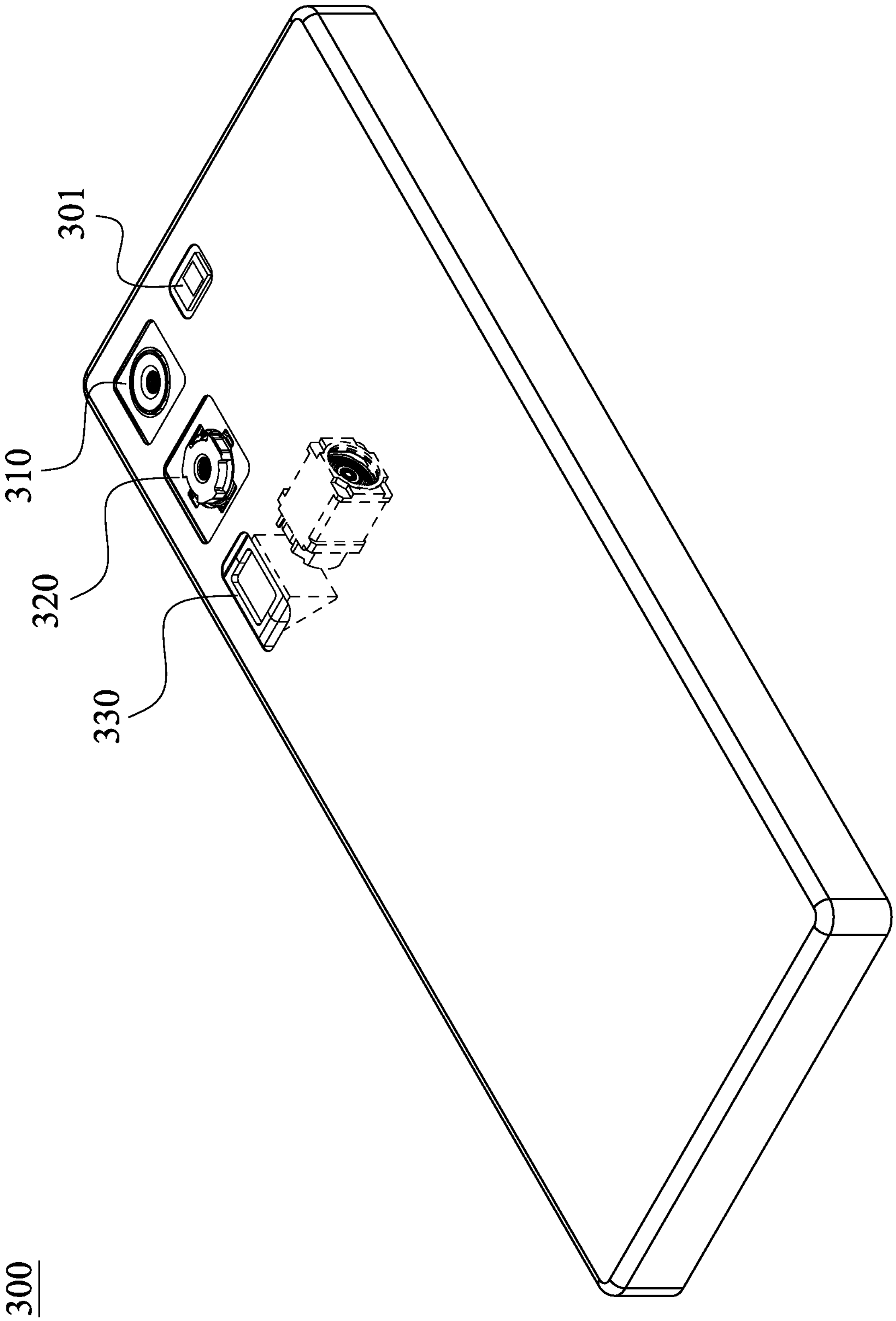
FIG. 25 is a schematic view of one side of an electronic device according to the 13th embodiment of the present disclosure.

FIG. 25 is a schematic view of one side of an electronic device 300 according to the 13th embodiment of the present disclosure. The electronic device 300 is a smartphone, and includes imaging apparatuses 310, 320, 330 and a flash module 301.

The electronic device 300 of the 13th embodiment can include the element same as or similar in the 12th embodiment, and the connecting relationships between the imaging apparatuses 310, 320, 330 and other elements can be the same as or similar to the 12th embodiment, and will not be described again herein. The imaging apparatuses 310, 320, 330 of the 13th embodiment can include the imaging system lens assembly of the present disclosure, and can be the same as or similar to the imaging apparatus 100 of the 11th embodiment, and will not be described again herein. In detail, the imaging apparatus 310 can be an ultra-wide angle imaging apparatus, the imaging apparatus 320 can be an wide-angle imaging apparatus, the imaging apparatus 330 can be a telephoto imaging apparatus (which can include light path folding elements), or can be adaptively adjusted according to the type of the imaging apparatuses, and the present disclosure will not be limited to the aforementioned arrangement.

14th Embodiment

Figure 26:
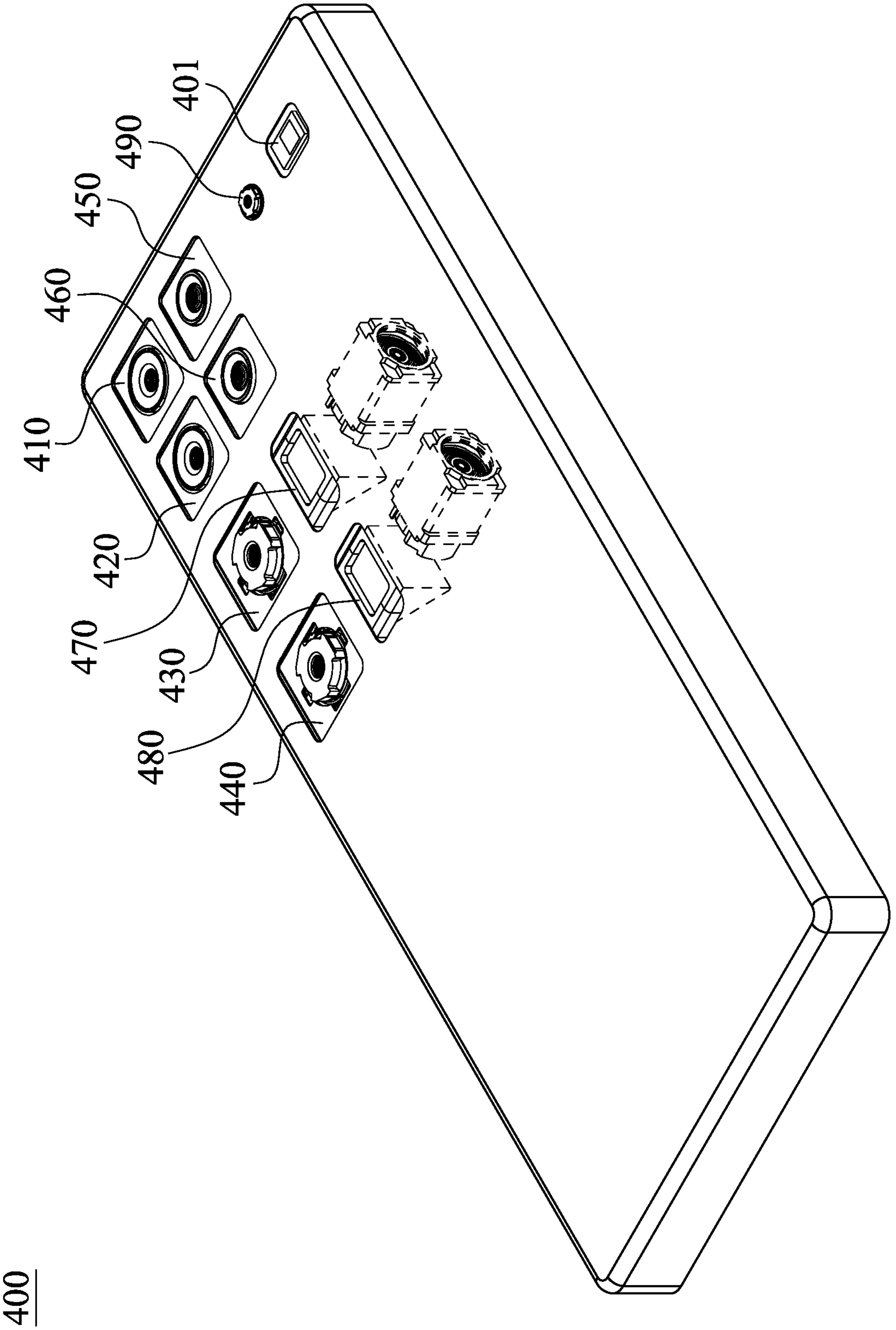
FIG. 26 is a schematic view of one side of an electronic device according to the 14th embodiment of the present disclosure.

FIG. 26 is a schematic view of one side of an electronic device 400 according to the 14th embodiment of the present disclosure. The electronic device 400 is a smartphone, and includes imaging apparatuses 410, 420, 430, 440, 450, 460, 470, 480, 490 and a flash module 401.

The electronic device 400 of the 14th embodiment can include the element same as or similar in the 12th embodiment, and the connecting relationships between the imaging apparatuses 410, 420, 430, 440, 450, 460, 470, 480, 490, the flash module 401 and other elements can be the same as or similar to the 12th embodiment, and will not be described again herein. The imaging apparatuses 410, 420, 430, 440, 450, 460, 470, 480, 490 of the 14th embodiment can include the imaging system lens assembly of the present disclosure, and can be the same as or similar to the imaging apparatus 100 of the 11th embodiment, and will not be described again herein.

In detail, each of the imaging apparatuses 410, 420 can be an ultra-wide angle imaging apparatus, each of the imaging apparatuses 430, 440 can be a wide-angle imaging apparatus, each of the imaging apparatuses 450, 460 can be a telephoto imaging apparatus, each of the imaging apparatuses 470, 480 can be a telephoto imaging apparatus (which can include light path folding elements), the imaging apparatus 490 can be a TOF module, or can be adaptively adjusted according to the type of the imaging apparatuses, and the present disclosure will not be limited to the aforementioned arrangement.

15th Embodiment

Figure 27B:
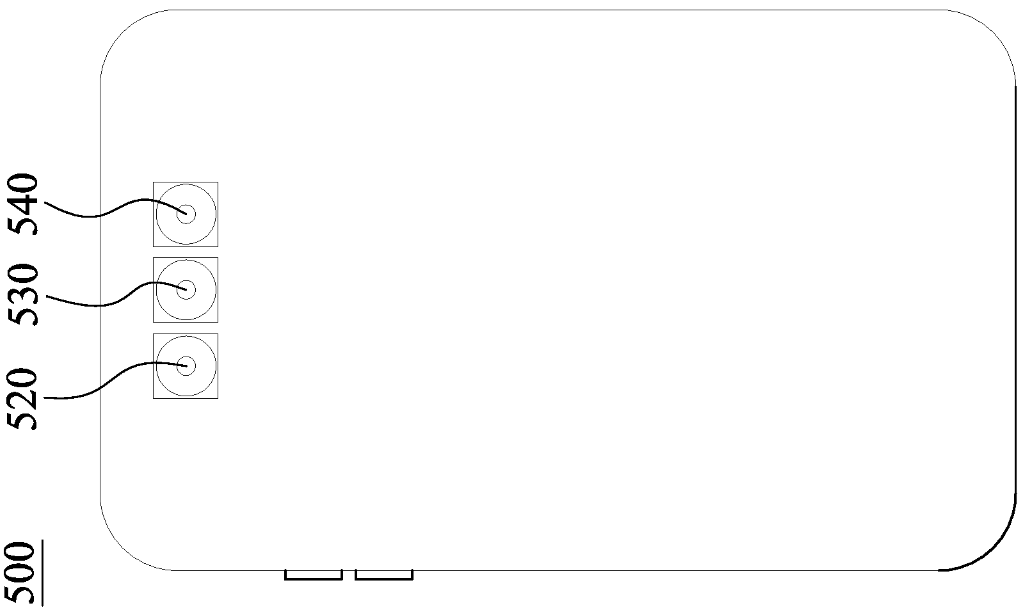
FIG. 27B is a schematic view of another side of the electronic device of FIG. 27A.
Figure 27A:
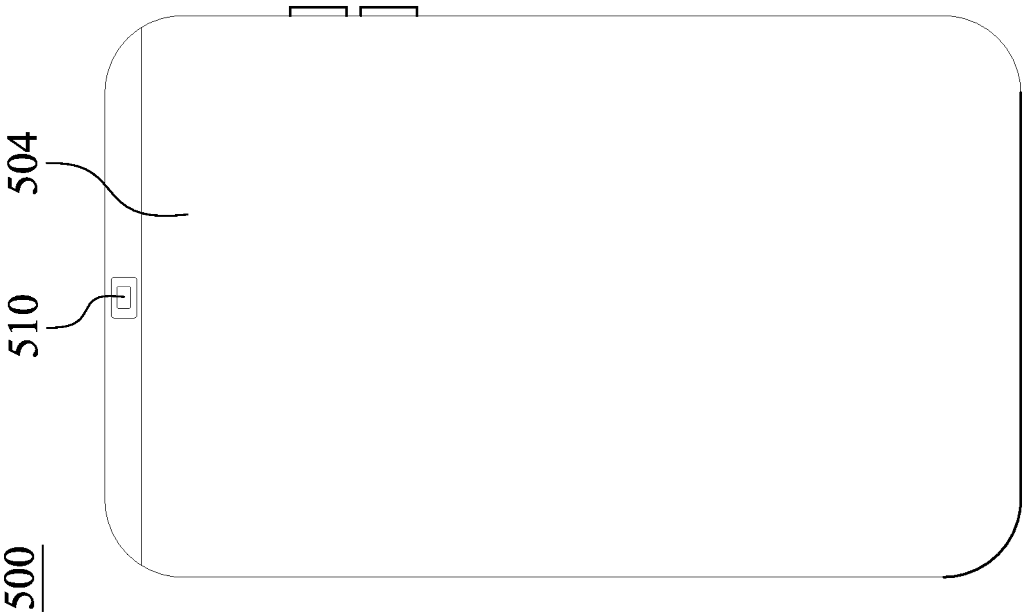
FIG. 27A is a schematic view of one side of an electronic device according to the 15th embodiment of the present disclosure.

FIG. 27A is a schematic view of one side of an electronic device 500 according to the 15th embodiment of the present disclosure. FIG. 27B is a schematic view of another side of the electronic device 500 of FIG. 27A. As shown in FIG. 27A and FIG. 27B, the electronic device 500 is a smartphone, and includes imaging apparatuses 510, 520, 530, 540 and a user interface 504.

The electronic device 500 of the 15th embodiment can include the element same as or similar in the 12th embodiment, and the connecting relationships between the imaging apparatuses 510, 520, 530, 540, the user interface 504 and other elements can be the same as or similar to the 12th embodiment, and will not be described again herein. In detail, the imaging apparatus 510 corresponds to a non-circular opening located on an outer side of the electronic device 500 for capturing the image. The imaging apparatuses 520, 530, 540 can respectively be a telephoto imaging apparatus, a wide angle imaging apparatus and an ultra-wide angle imaging apparatus, or can be adaptively adjusted according to the type of the imaging apparatuses, and the present disclosure will not be limited to the aforementioned arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly, comprising two lens groups, the two lens groups being, in order from an object side to an image side along a light path, a first lens group and a second lens group;

wherein the first lens group comprises a first catadioptric lens element and a second catadioptric lens element;

wherein the second lens group comprises at least two lens elements;

wherein each of the first catadioptric lens element and the second catadioptric lens element has an object-side surface facing towards the object side and an image-side surface facing towards the image side;

wherein the object-side surface of the first catadioptric lens element comprises a central region and a peripheral region, and the image-side surface of the first catadioptric lens element comprises a central region and a peripheral region;

wherein the object-side surface of the second catadioptric lens element comprises a central region and a peripheral region, and the image-side surface of the second catadioptric lens element comprises a central region and a peripheral region;

wherein the peripheral region of the object-side surface of the first catadioptric lens element comprises a first refracting surface, the peripheral region of the image-side surface of the second catadioptric lens element comprises a first reflecting surface, the central region of the object-side surface of the first catadioptric lens element comprises a second reflecting surface, the central region of the image-side surface of the second catadioptric lens element comprises a last refracting surface;

wherein an axial distance between the second reflecting surface and an image surface is TL, a maximum image height of the imaging system lens assembly is ImgH, and the following condition is satisfied:

$$TL/\mathrm{ImgH}<6.0$$

2. The imaging system lens assembly of claim 1, wherein the axial distance between the second reflecting surface and the image surface is TL, the maximum image height of the imaging system lens assembly is ImgH, and the following condition is satisfied:

$$1.0<TL/\mathrm{ImgH}<3.0.$$

3. The imaging system lens assembly of claim 1, wherein the lens element of the second lens group closest to the object side has the object-side surface being convex in a paraxial region thereof.

4. The imaging system lens assembly of claim 1, wherein the peripheral region of the object-side surface of the second catadioptric lens element has a concave shape; a central curvature radius of the second reflecting surface is RM2, a central curvature radius of the object-side surface of the second catadioptric lens element is R9, and the following condition is satisfied:

$$RM2/R9<-0.3.$$

5. The imaging system lens assembly of claim 1, wherein a central curvature radius of the second reflecting surface is RM2, a central curvature radius of the object-side surface of the lens element of the second lens group closest to the object side is R11, and the following condition is satisfied:

$$-10.0<(RM2+R11)/(RM2-R11)<-0.01.$$

6. The imaging system lens assembly of claim 1, wherein a central thickness of the first catadioptric lens element is CT1, a central thickness of the second catadioptric lens element is CT2, the axial distance between the second reflecting surface and the image surface is TL, and the following condition is satisfied:

$$0<(CT1+CT2)/TL<0.3.$$

7. The imaging system lens assembly of claim 1, wherein a half of a maximum field of view of the imaging system lens assembly is HFOV, an f-number of the imaging system lens assembly is Fno, and the following conditions are satisfied:

$$7.0\text{ degrees}<\mathrm{HFOV}<20.0\text{ degrees; and}$$

$$1.3<Fno<2.5.$$

8. The imaging system lens assembly of claim 1, wherein at least one surface of the at least one lens element of the second lens group comprises at least one inflection point; a central thickness of the first catadioptric lens element is CT1, the axial distance between the second reflecting surface and the image surface is TL, and the following condition is satisfied:

$$0.06<CT1/TL<0.15.$$

9. The imaging system lens assembly of claim 1, further comprising:

an aperture stop disposed between the first catadioptric lens element and the second catadioptric lens element, a maximum effective radius of the peripheral region of the object-side surface of the first catadioptric lens element is YR1o, a minimum effective radius of the peripheral region of the object-side surface of the first catadioptric lens element is YR1i, a maximum effective radius of the peripheral region of the image-side surface of the second catadioptric lens element is YM1o, a minimum effective radius of the peripheral region of the image-side surface of the second catadioptric lens element is YM1i, and the following condition is satisfied:

$$0.5<(YR\mathbf{10}-YR1i)/(YM1o-YM1i)<1.2.$$

10. The imaging system lens assembly of claim 1, wherein a maximum effective radius of the central region of the object-side surface of the first catadioptric lens element is YM2, a maximum effective radius of the central region of the image-side surface of the second catadioptric lens element is YRL, and the following condition is satisfied:

$$1.0<YM2/YRL<2.0.$$

11. The imaging system lens assembly of claim 1, wherein a minimum effective radius of the peripheral region of the object-side surface of the first catadioptric lens element is YR1i, a maximum effective radius of the central region of the image-side surface of the second catadioptric lens element is YRL, an axial distance between the image-side surface of the first catadioptric lens element and the object-side surface of the second catadioptric lens element is T12, and the following condition is satisfied:

$$0.60<(YR1i-YRL)/T12<8.0.$$

12. The imaging system lens assembly of claim 1, wherein the first catadioptric lens element is made of plastic material; an Abbe number of a lens element is V, a refractive index of the lens element is N, and at least one lens element of the imaging system lens assembly satisfies the following condition:

$$V/N<12.0.$$

13. The imaging system lens assembly of claim 1, wherein each of the object-side surface and the image-side surface of the first catadioptric lens element comprises a light blocking area between the central region and the peripheral region thereof.

14. The imaging system lens assembly of claim 1, wherein each of the object-side surface and the image-side surface of the second catadioptric lens element comprises a light blocking area between the central region and the peripheral region thereof.

15. An imaging apparatus, comprising:

the imaging system lens assembly of claim 1; and an image sensor disposed on the image surface of the imaging system lens assembly.

16. An electronic device, comprising:

the imaging apparatus of claim 15.

17. An imaging system lens assembly, comprising two lens groups, the two lens groups being, in order from an object side to an image side along a light path, a first lens group and a second lens group;

wherein the first lens group comprises a first catadioptric lens element and a second catadioptric lens element, the second lens group comprises at least one lens element;

wherein each of the first catadioptric lens element and the second catadioptric lens element has an object-side surface facing towards the object side and an image-side surface facing towards the image side;

wherein the object-side surface of the first catadioptric lens element comprises a central region and a peripheral region, and the image-side surface of the first catadioptric lens element comprises a central region and a peripheral region;

wherein the object-side surface of the second catadioptric lens element comprises a central region and a peripheral region, and the image-side surface of the second catadioptric lens element comprises a central region and a peripheral region;

wherein the peripheral region of the object-side surface of the first catadioptric lens element comprises a first refracting surface, the peripheral region of the image-side surface of the second catadioptric lens element comprises a first reflecting surface, the central region of the object-side surface of the first catadioptric lens element comprises a second reflecting surface, the central region of the image-side surface of the second catadioptric lens element comprises a last refracting surface; the second catadioptric lens element has the object-side surface being convex in a paraxial region thereof.

18. The imaging system lens assembly of claim 17, wherein the peripheral region of the image-side surface of the first catadioptric lens element has a concave shape, the second catadioptric lens element has the image-side surface being concave in a paraxial region thereof.

19. The imaging system lens assembly of claim 17, wherein the lens element of the second lens group closest to an image surface has negative refractive power, at least one surface of the lens element of the second lens group closest to the object side comprises at least one inflection point.

20. The imaging system lens assembly of claim 17, wherein a central curvature radius of the image-side surface of the first catadioptric lens element is R8, a central curvature radius of the object-side surface of the second catadioptric lens element is R9, and the following condition is satisfied:

$$0.85<(R8-R9)/(R8+R9).$$

21. The imaging system lens assembly of claim 17, wherein a central thickness of the first catadioptric lens element is CT1, an axial distance between the second reflecting surface and an image surface is TL, and the following condition is satisfied:

$$0.06<CT1/TL<0.15.$$

22. The imaging system lens assembly of claim 17, wherein an axial distance between the last refracting surface and an image surface is TRL1, a maximum image height of the imaging system lens assembly is ImgH, and the following condition is satisfied:

$$1.0<TRLI/ImgH<2.1.$$

23. The imaging system lens assembly of claim 17, wherein an axial distance between the image-side surface of the lens element closest to an image surface of the second lens group and the image surface is BL, a maximum image height of the imaging system lens assembly is ImgH, a focal length of the imaging system lens assembly is f, an axial distance between the second reflecting surface and the image surface is TL, and the following conditions are satisfied:

$$0.01<BL/ImgH<1.0;$$

$$0.01<ImgH/f<0.30; \text{ and}$$

$$0.2<TL/f<0.7.$$

24. The imaging system lens assembly of claim 17, wherein the second lens group comprises at least two lens elements; a displacement in parallel with a central axis from an axial vertex on the object-side surface of the lens element closest to an image surface of the second lens group to a maximum optical effective radius position on the object-side surface of the lens element closest to the image surface of the second lens group is SagLNR1, a central thickness of the lens element closest to the image surface of the second lens group is CTN, and the following condition is satisfied:

$$-5.0<SagLNR1/CTN<-0.3.$$

25. The imaging system lens assembly of claim 17, wherein a maximum effective radius of the peripheral region of the object-side surface of the first catadioptric lens element is YR1o, a maximum image height of the imaging system lens assembly is ImgH, and the following condition is satisfied:

$$1.80<YR1o/ImgH<3.10.$$

26. The imaging system lens assembly of claim 17, wherein a maximum effective radius of the peripheral region of the object-side surface of the first catadioptric lens element is YR1o, a minimum effective radius of the peripheral region of the object-side surface of the first catadioptric lens element is YR1i, a maximum effective radius of the peripheral region of the image-side surface of the second catadioptric lens element is YM1o, a minimum effective radius of the peripheral region of the image-side surface of the second catadioptric lens element is YM1i, and the following conditions are satisfied:

$$1.0<YR1o/YR1i<2.0; \text{ and}$$

$$1.0<YR1o/YM1i<2.0.$$

27. The imaging system lens assembly of claim 17, wherein a minimum Abbe number of all of the lens elements of the imaging system lens assembly is Vmin, and the following condition is satisfied:

$$5.0<Vmin<24.0.$$

* * * * *